US009195684B2

(12) United States Patent
Grube et al.

(10) Patent No.: US 9,195,684 B2
(45) Date of Patent: Nov. 24, 2015

(54) REDUNDANT TASK EXECUTION IN A DISTRIBUTED STORAGE AND TASK NETWORK

(71) Applicants: Gary W. Grube, Barrington Hills, IL (US); Timothy W. Markison, Mesa, AZ (US)

(72) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 259 days.

(21) Appl. No.: 13/753,404

(22) Filed: Jan. 29, 2013

(65) Prior Publication Data
US 2013/0232184 A1 Sep. 5, 2013

Related U.S. Application Data

(60) Provisional application No. 61/605,869, filed on Mar. 2, 2012.

(51) Int. Cl.
G06F 17/30 (2006.01)
H04L 29/08 (2006.01)
G06F 9/50 (2006.01)

(52) U.S. Cl.
CPC ........ *G06F 17/30283* (2013.01); *G06F 9/5066* (2013.01); *H04L 29/08135* (2013.01)

(58) Field of Classification Search
USPC ........................................................ 709/201
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Backhean Tiv
(74) *Attorney, Agent, or Firm* — Garlick & Markison; Timothy W. Markison

(57) ABSTRACT

A method begins by a dispersed storage (DS) processing module determining data block storage redundancy among a set of distributed storage and task (DST) execution units. The method continues with the DS processing module dispersed storage error encoding a data segment of data to produce a set of encoded data slices, where a first encoded data slice of the set of encoded data slices includes at least one redundant encoded data block in common with a second encoded data slice of the set of encoded data slices. The method continues with the DS processing module assigning a first partial task and a first encoded block processing order to a first DST execution unit regarding processing the first encoded data slice and assigning a second partial task and a second encoded block processing order to a second DST execution unit regarding processing the second encoded data slice.

20 Claims, 49 Drawing Sheets

(56) References Cited

U.S. PATENT DOCUMENTS

| | | | |
|---|---|---|---|
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,496,944 B1 * | 12/2002 | Hsiao et al. | 714/15 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,296,419 B1 * | 10/2012 | Khanna et al. | 709/224 |
| 8,965,956 B2 * | 2/2015 | Palthepu et al. | 709/203 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0098447 A1 * | 5/2004 | Verbeke et al. | 709/201 |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088828 A1 * | 4/2007 | Inampudi et al. | 709/226 |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0115143 A1 * | 5/2008 | Shimizu et al. | 718/105 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0055662 A1 * | 3/2011 | Grube et al. | 714/763 |
| 2011/0066649 A1 * | 3/2011 | Berlyant et al. | 707/770 |
| 2011/0138396 A1 * | 6/2011 | Chen et al. | 718/105 |
| 2013/0198756 A1 * | 8/2013 | Grube et al. | 718/104 |
| 2013/0232184 A1 * | 9/2013 | Grube et al. | 709/201 |
| 2013/0232392 A1 * | 9/2013 | Grube et al. | 714/766 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

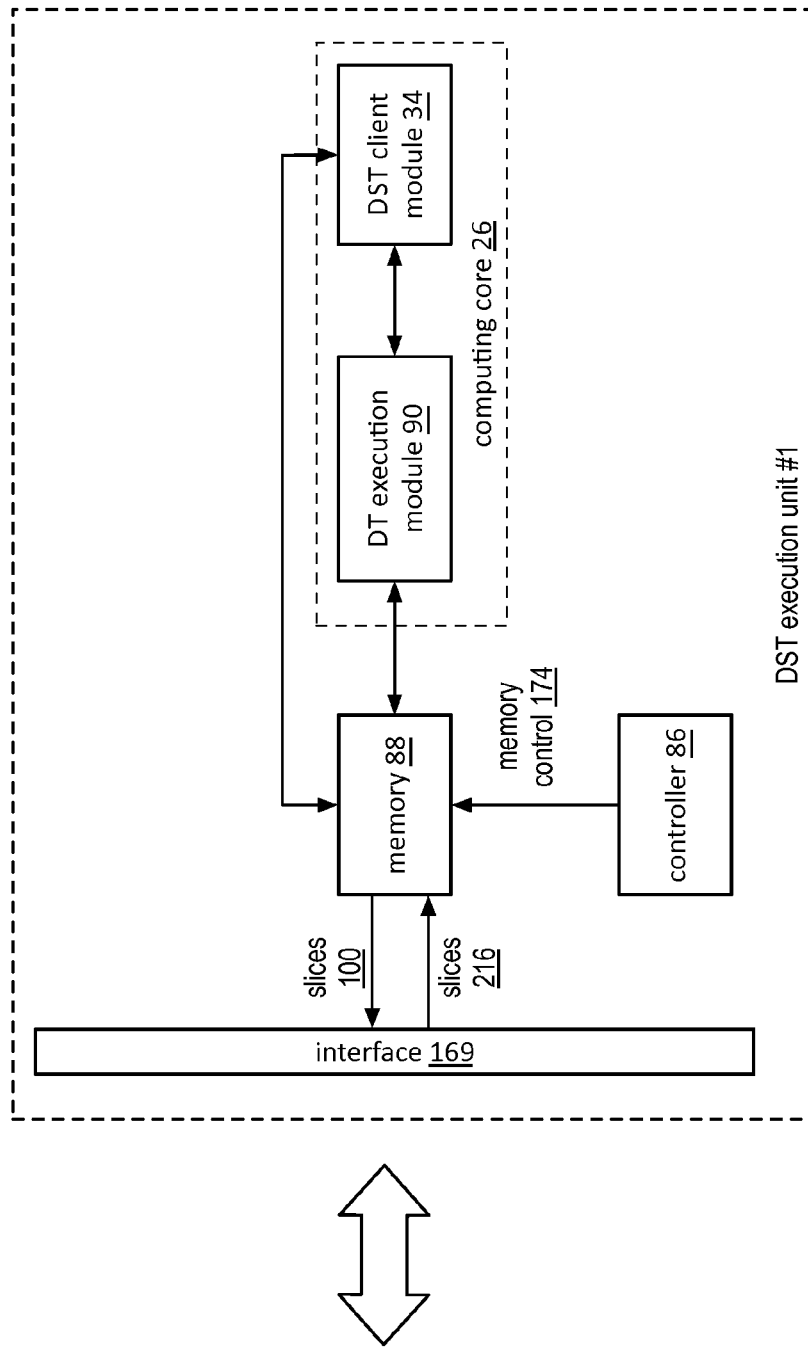
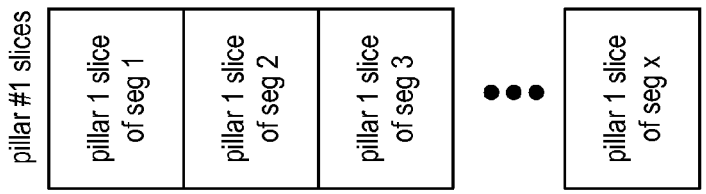
FIG. 24

FIG. 32

DST allocation info 242 | data partition info 320: ⓧdata ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 2_3, 2_4, 2_4, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 2_4, 2_4, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 2_4, 2_4, & 5_2 | R3-2 | DST unit 5 | DST unit 5 | DST units 5,6, 1-3 |

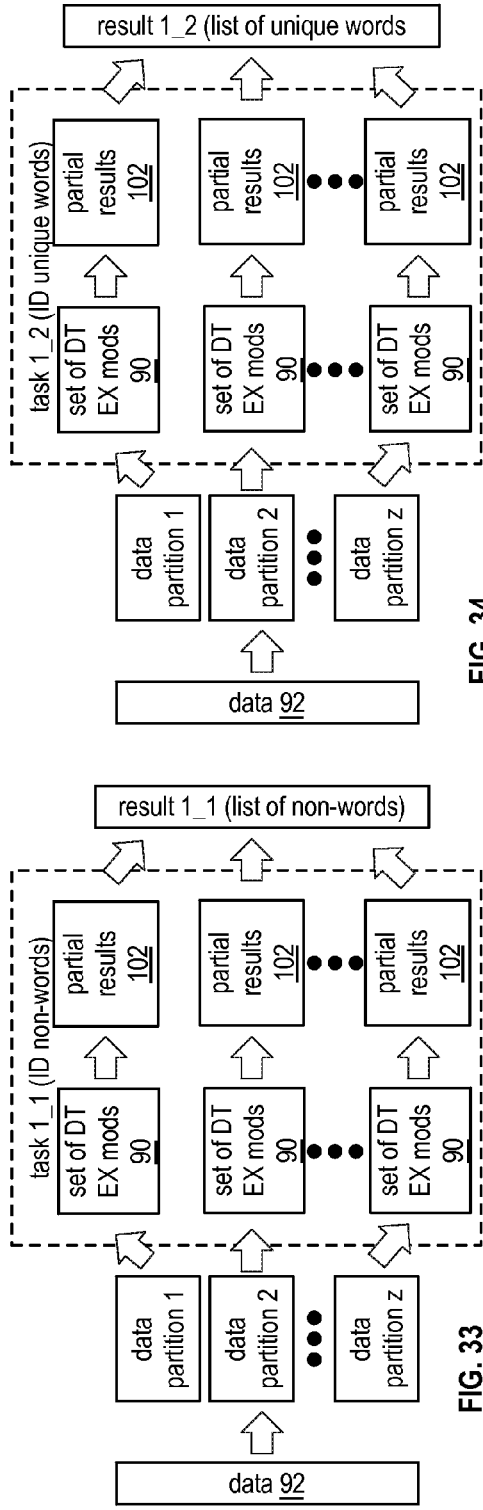
FIG. 33
FIG. 34
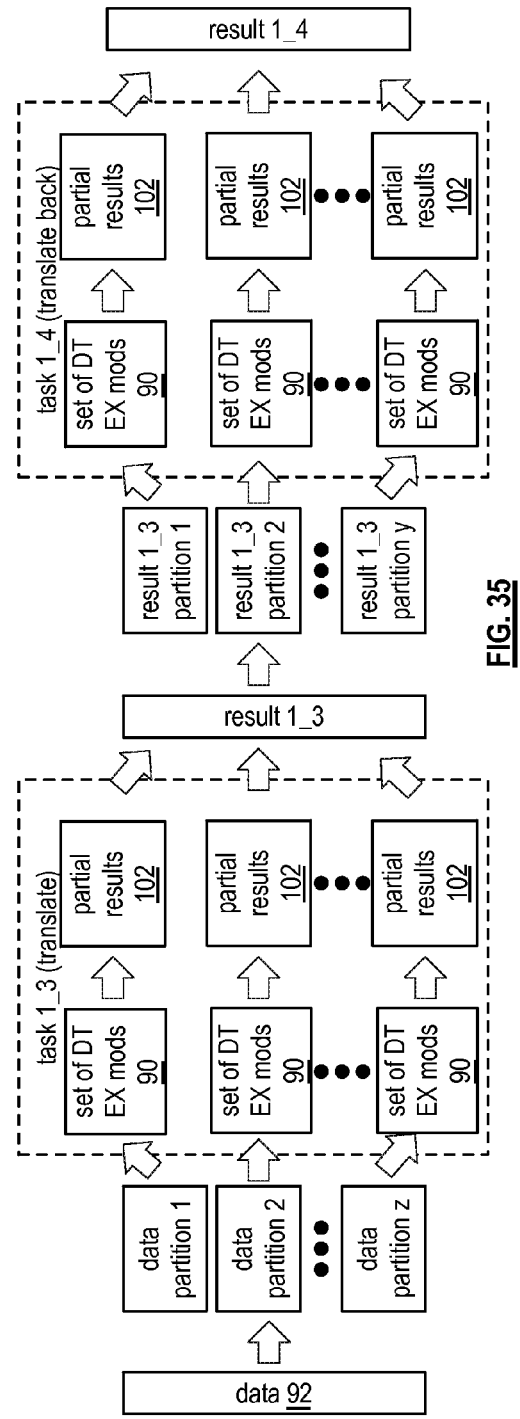
FIG. 35

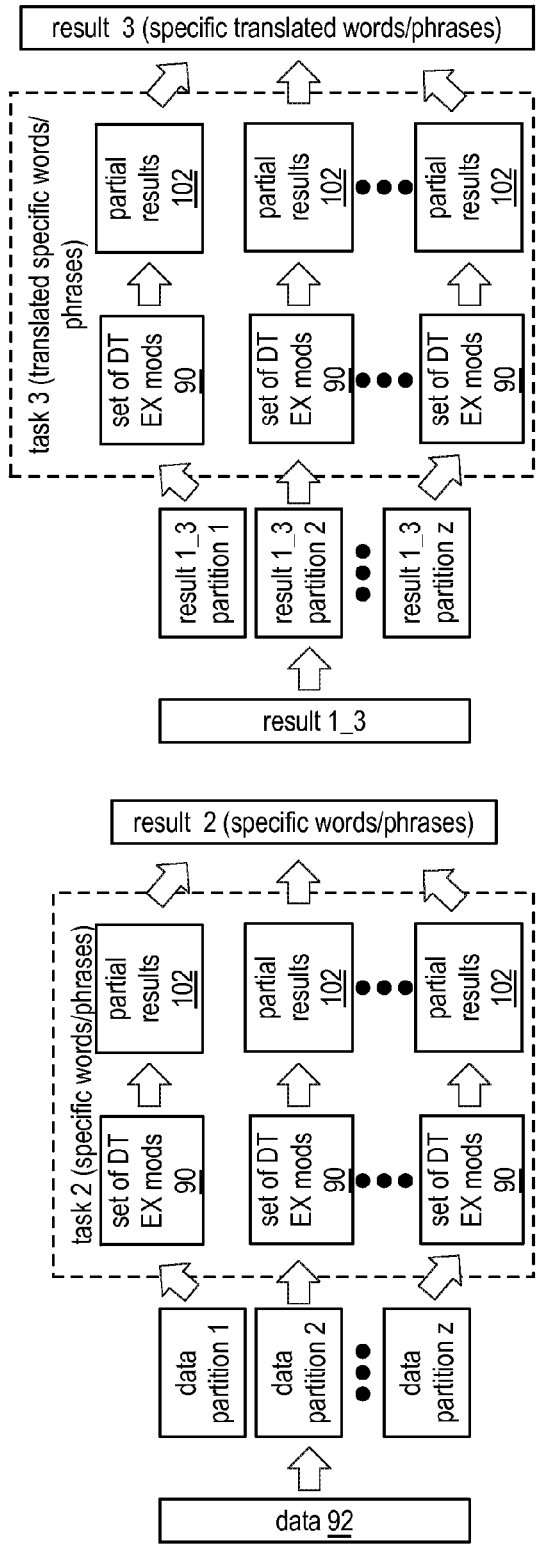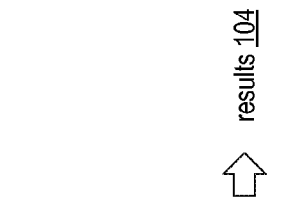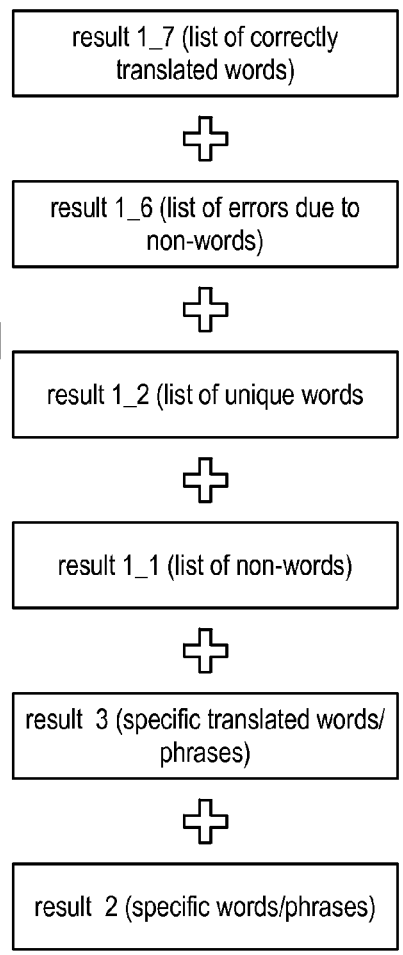

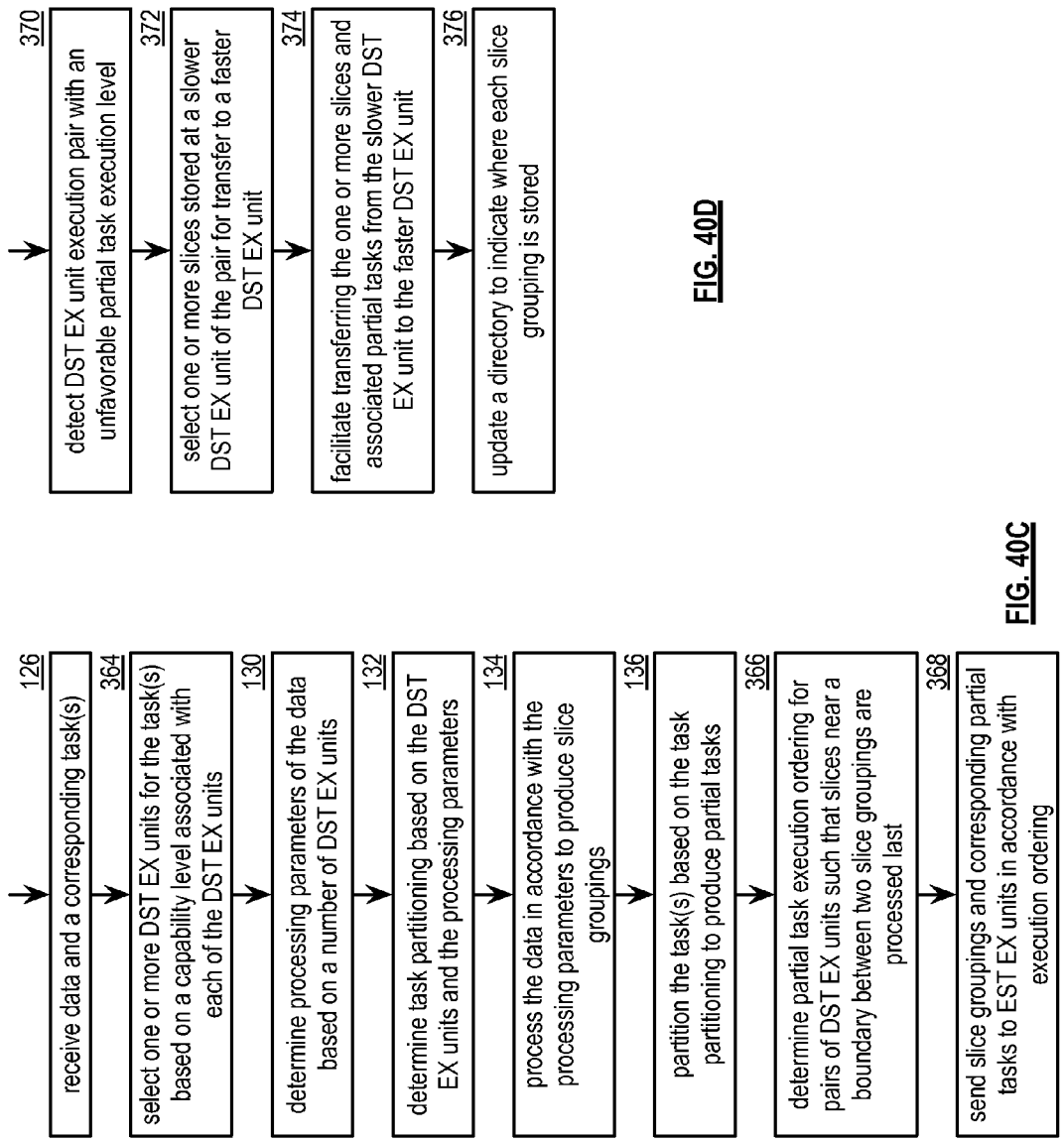

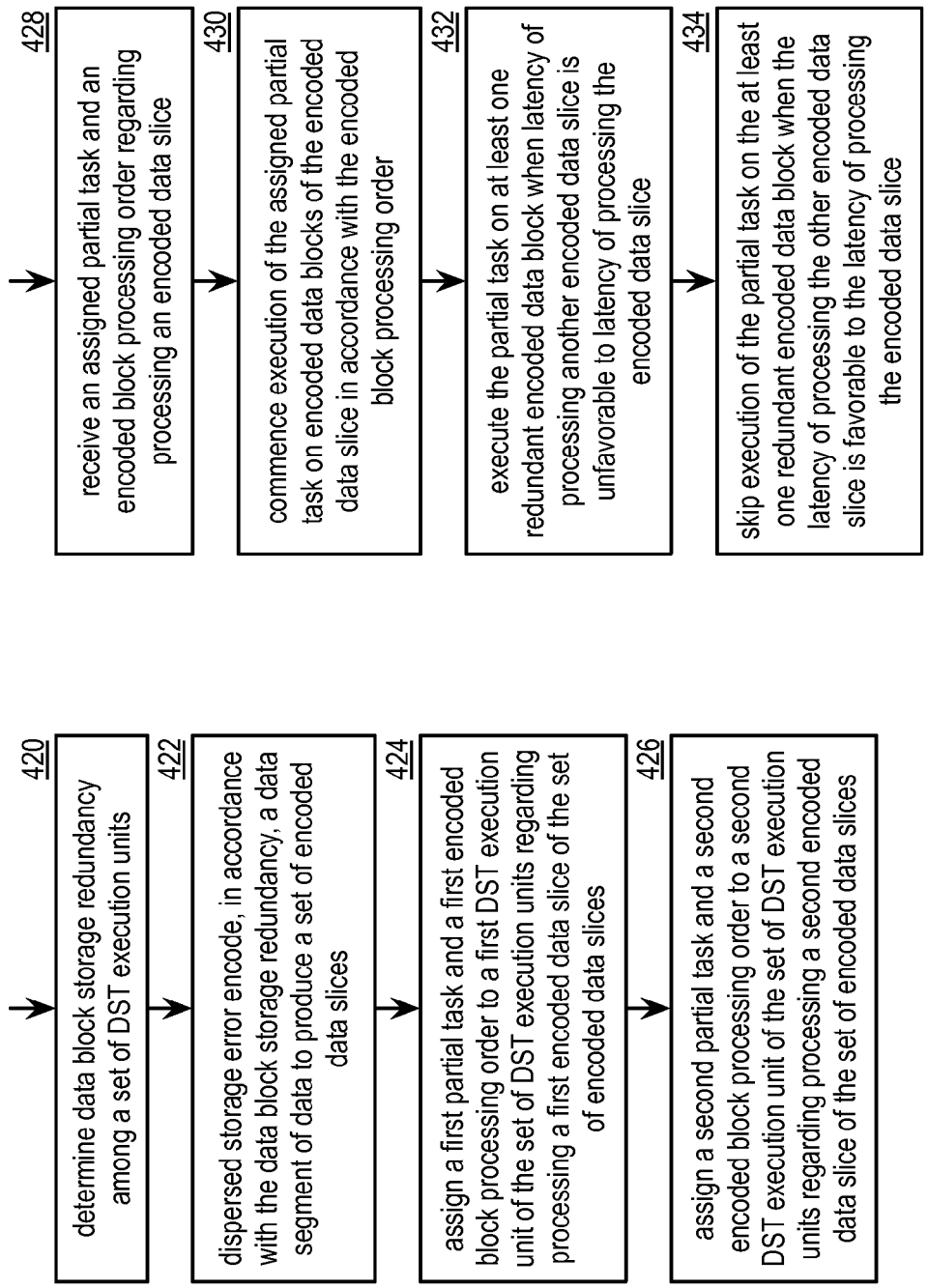

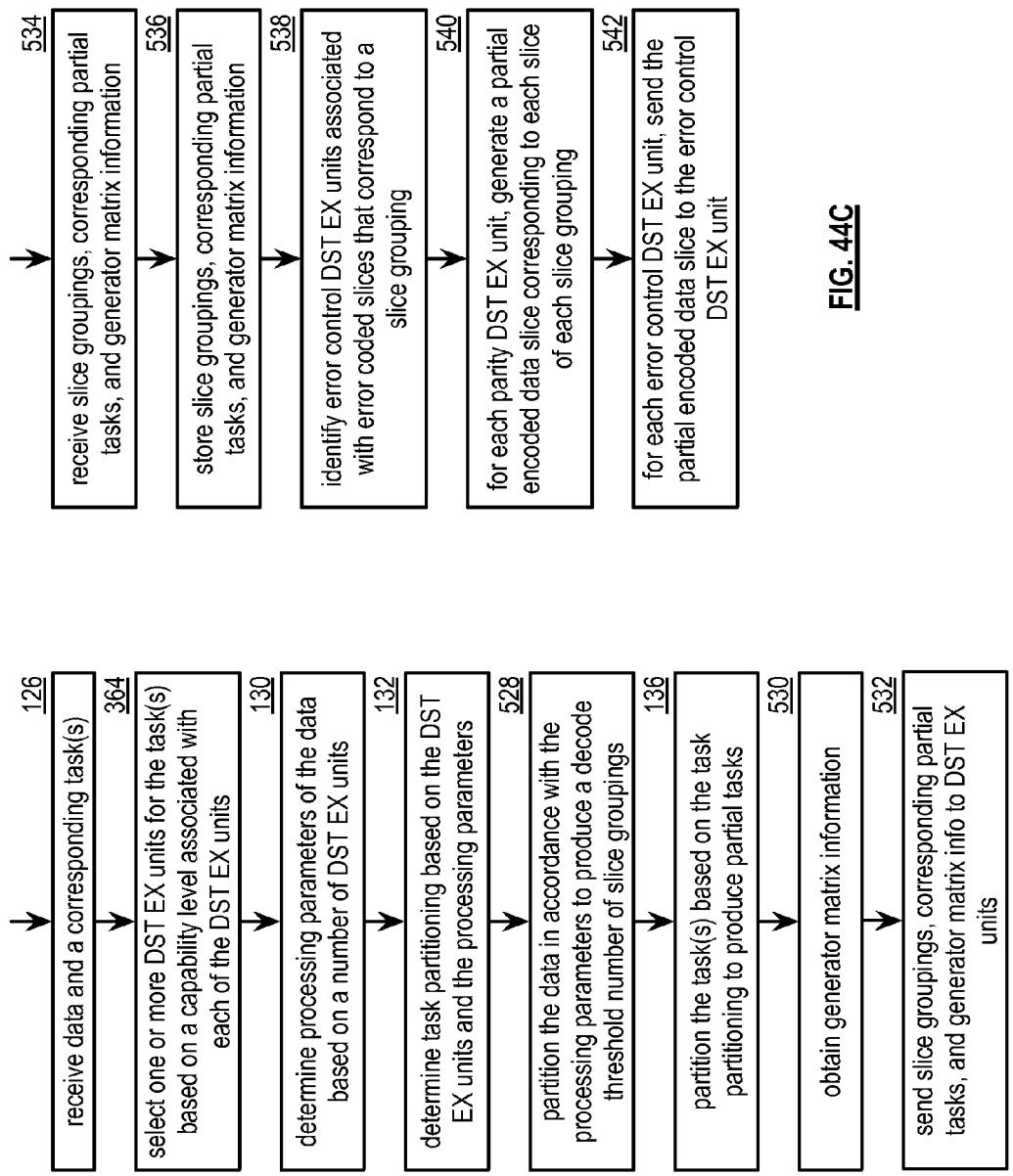

REDUNDANT TASK EXECUTION IN A DISTRIBUTED STORAGE AND TASK NETWORK

CROSS REFERENCE TO RELATED PATENTS

The present U.S. Utility patent application claims priority pursuant to 35 U.S.C. §119(e) to U.S. Provisional Application No. 61/605,869, entitled "TASK EXECUTION IN A DISTRIBUTED STORAGE AND TASK NETWORK," filed Mar. 2, 2012, which is incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40C is a flowchart illustrating an example of generating a slice grouping in accordance with the present invention;

FIG. 40D is a flowchart illustrating an example of transferring a slice in accordance with the present invention;

FIG. 41C is a flowchart illustrating an example of executing redundant tasks in accordance with the present invention;

FIG. 41D is a flowchart illustrating an example of executing redundant tasks in accordance with the present invention;

FIG. 44B is a flowchart illustrating another example of generating a slice grouping in accordance with the present invention;

FIG. 44C is a flowchart illustrating an example of generating a partially encoded data slice in accordance with the present invention.

DETAILED DESCRIPTION OF THE INVENTION

Figure 1:
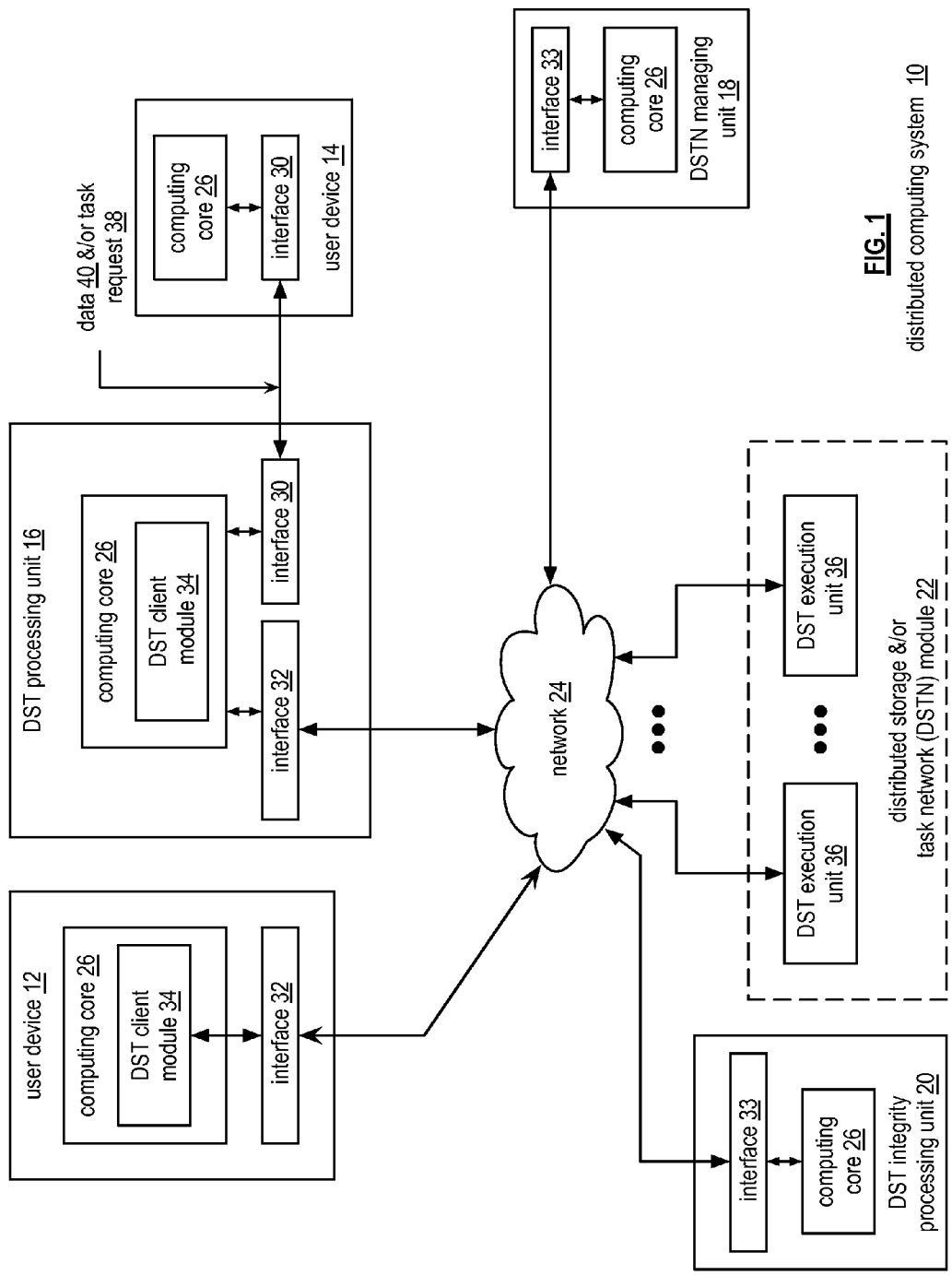
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
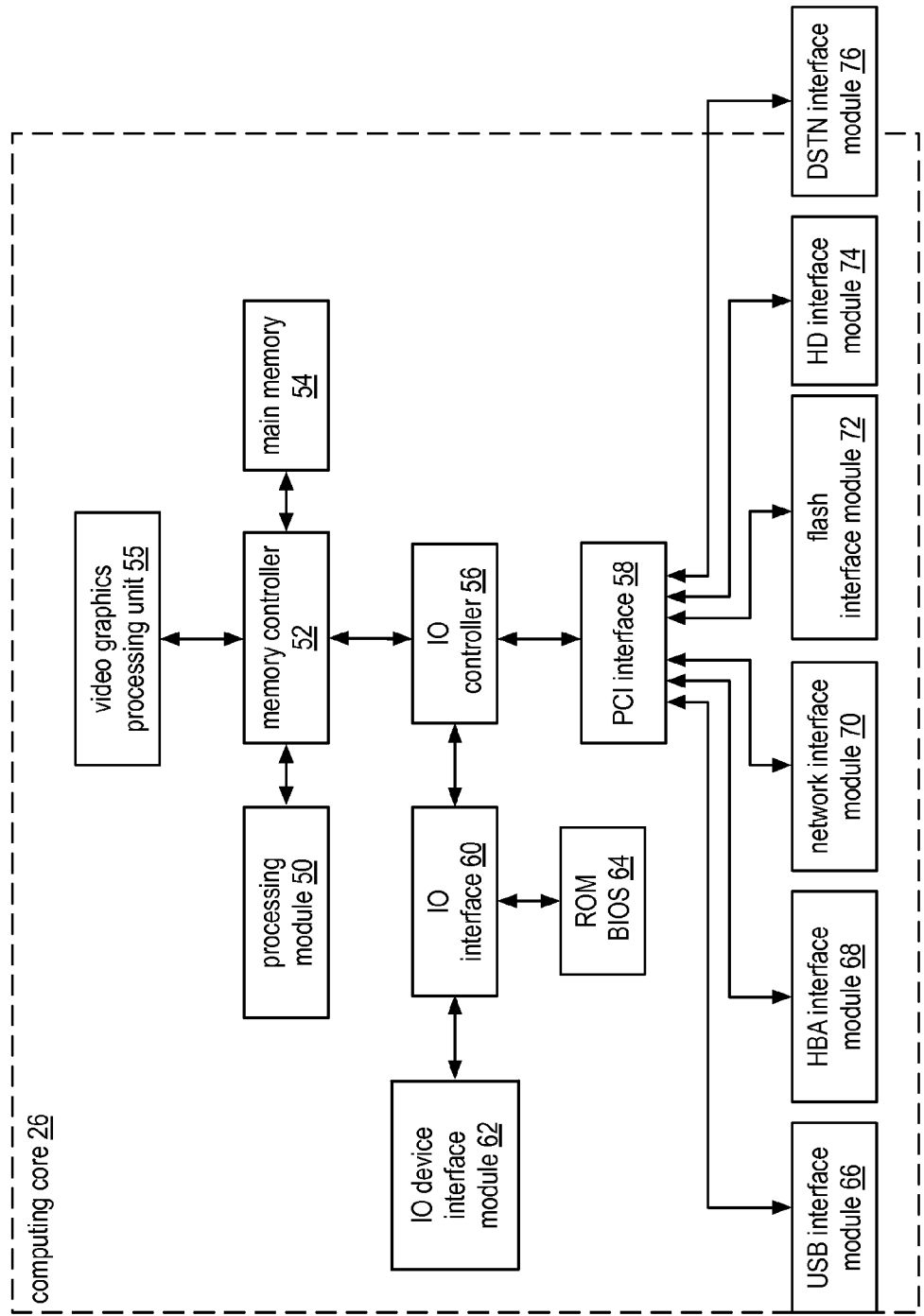
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
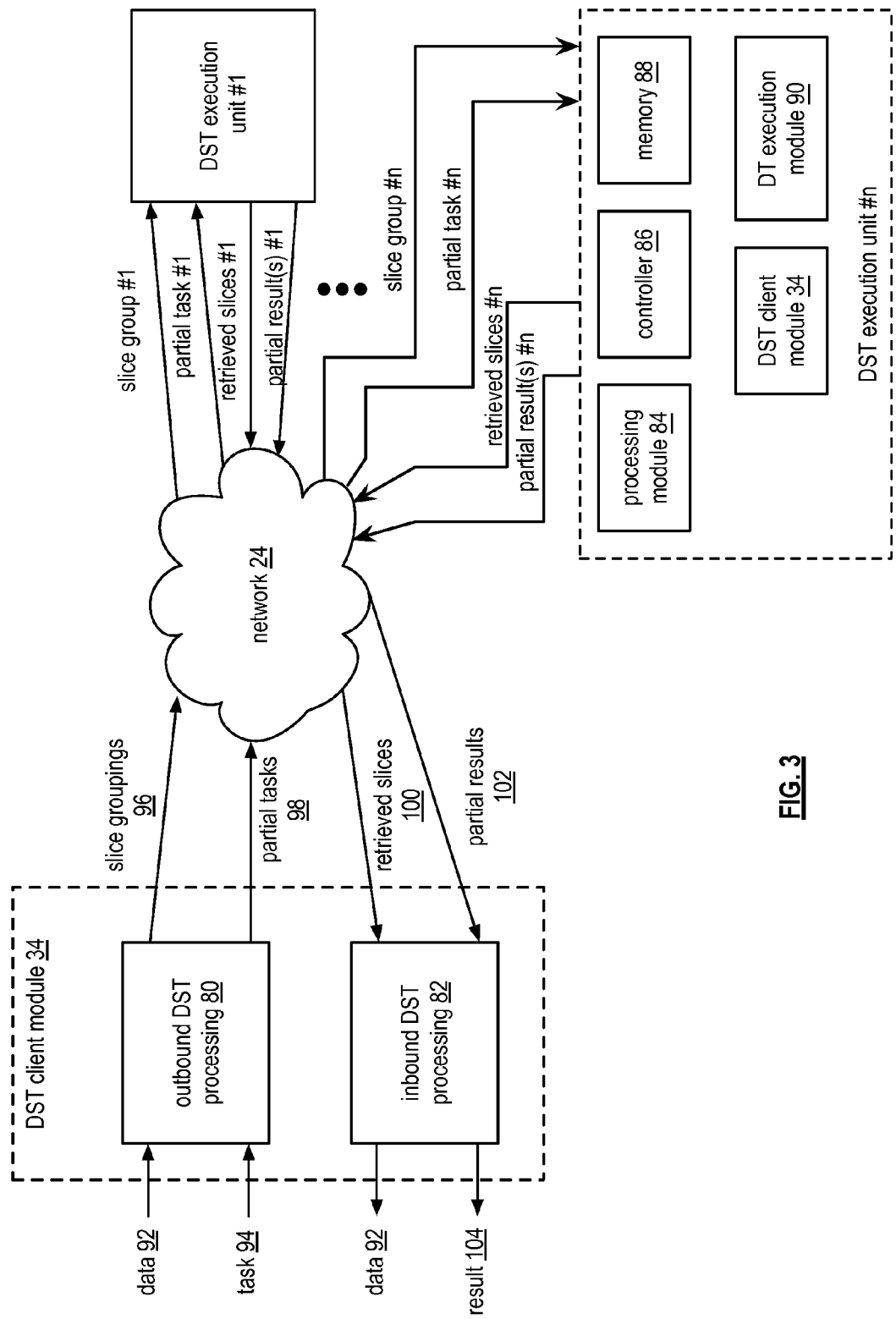
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-*n* that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-*n* includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-*n* of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
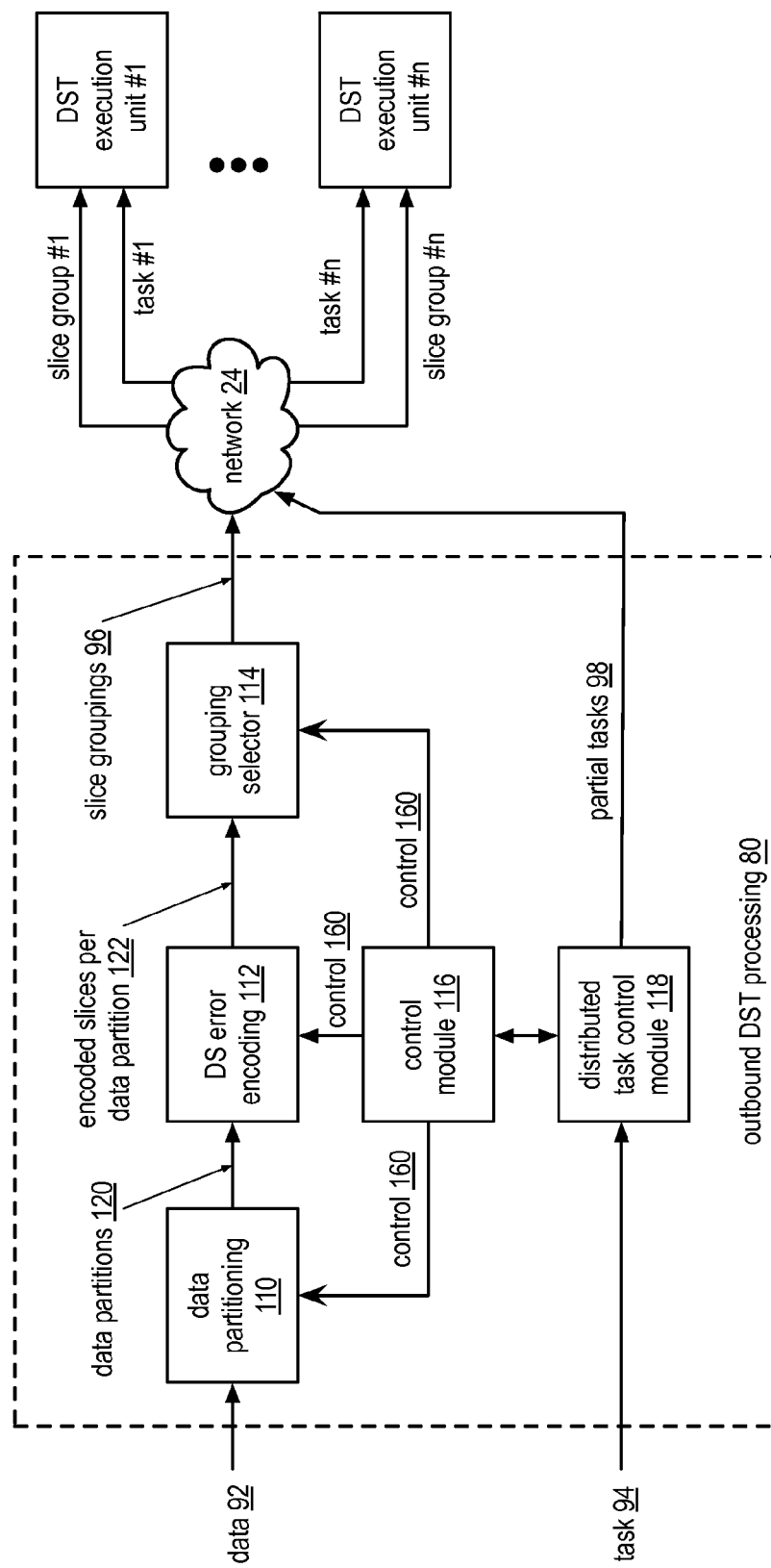
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
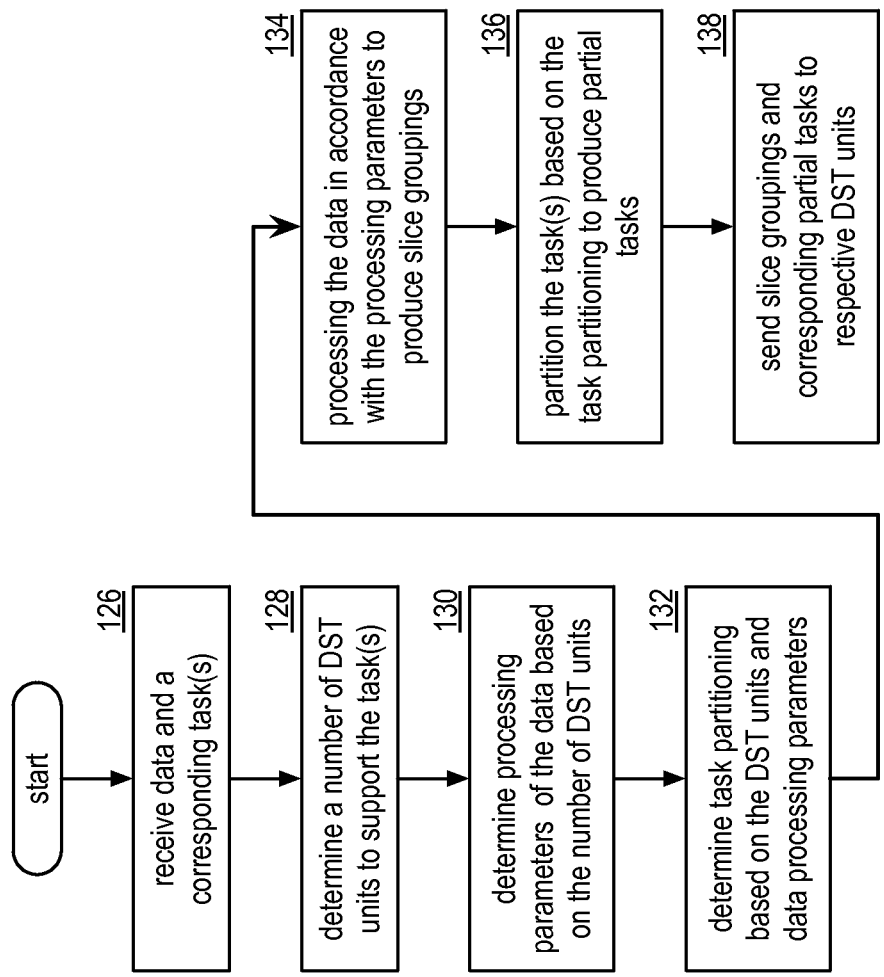
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
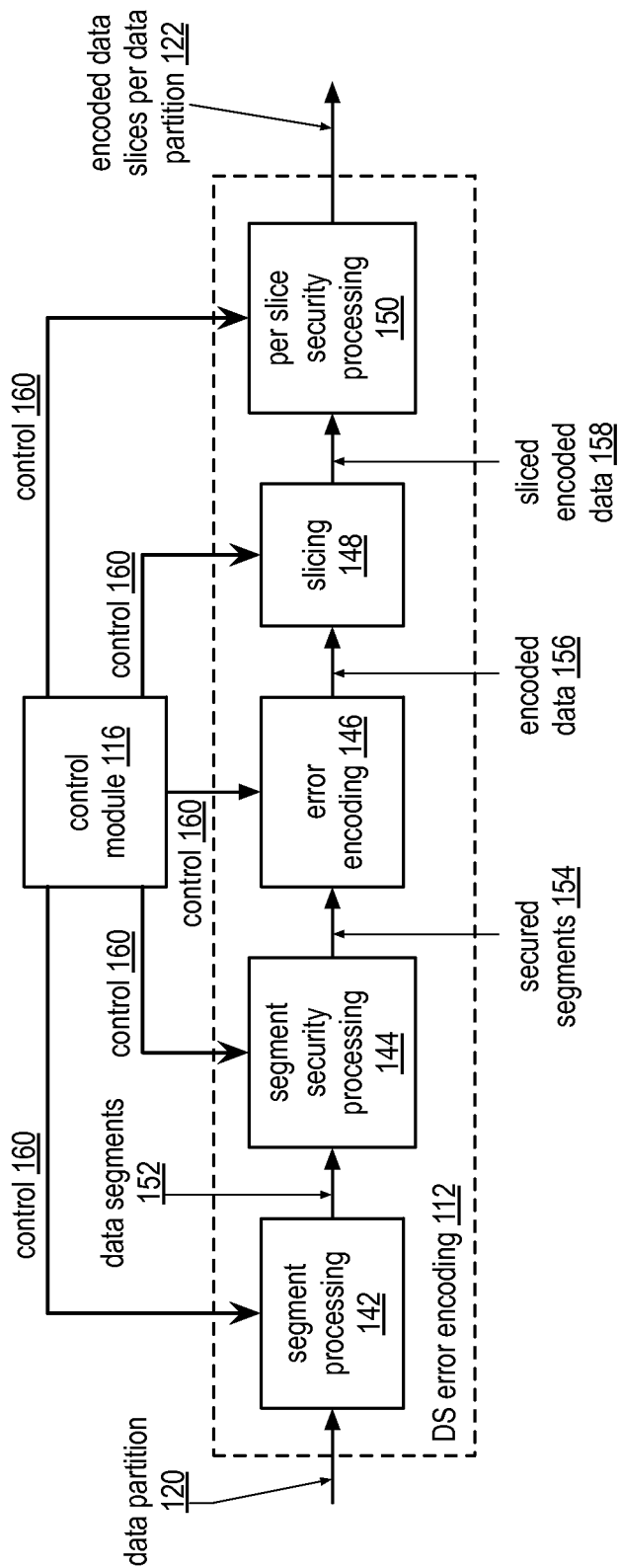
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
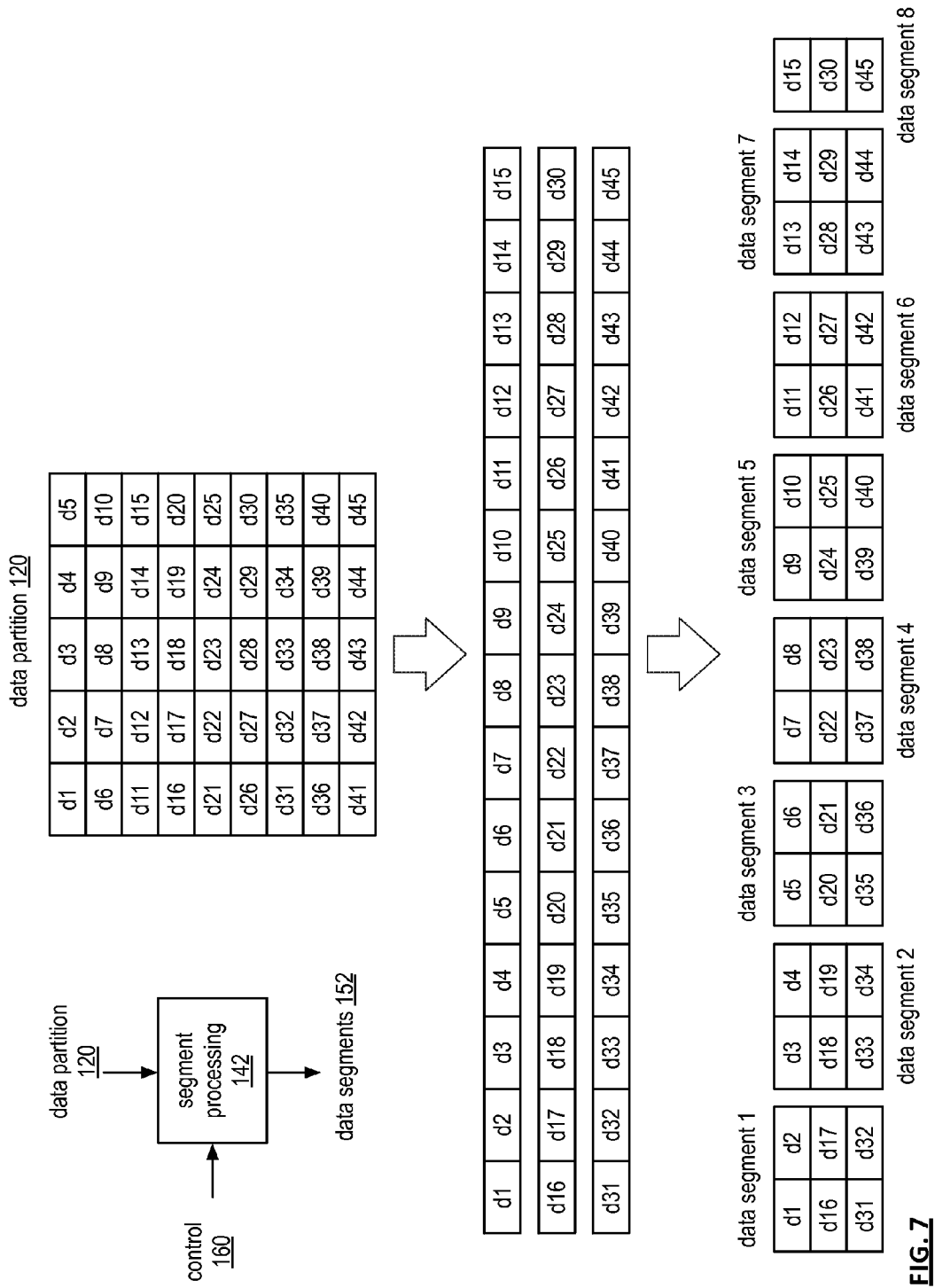
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
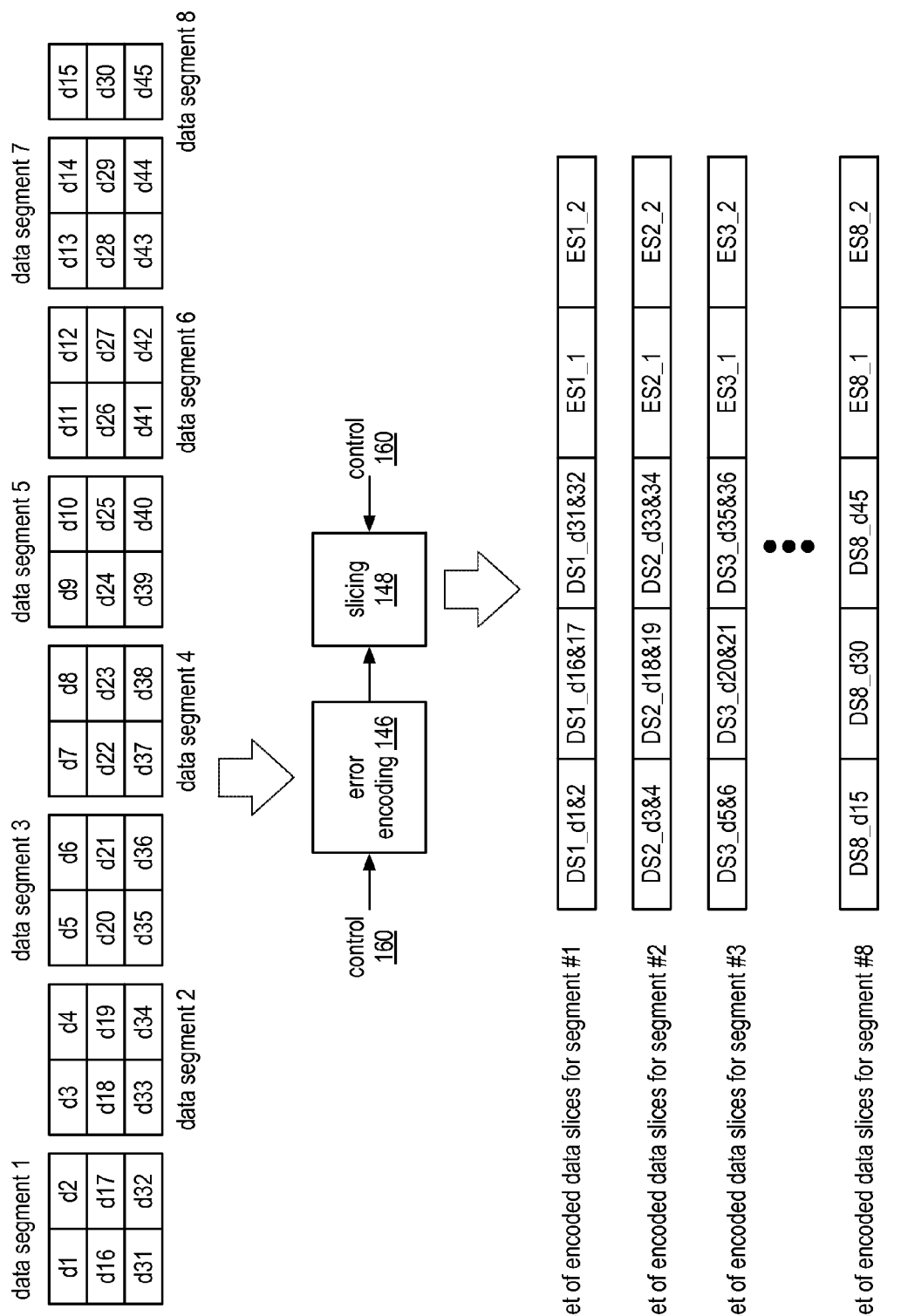
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
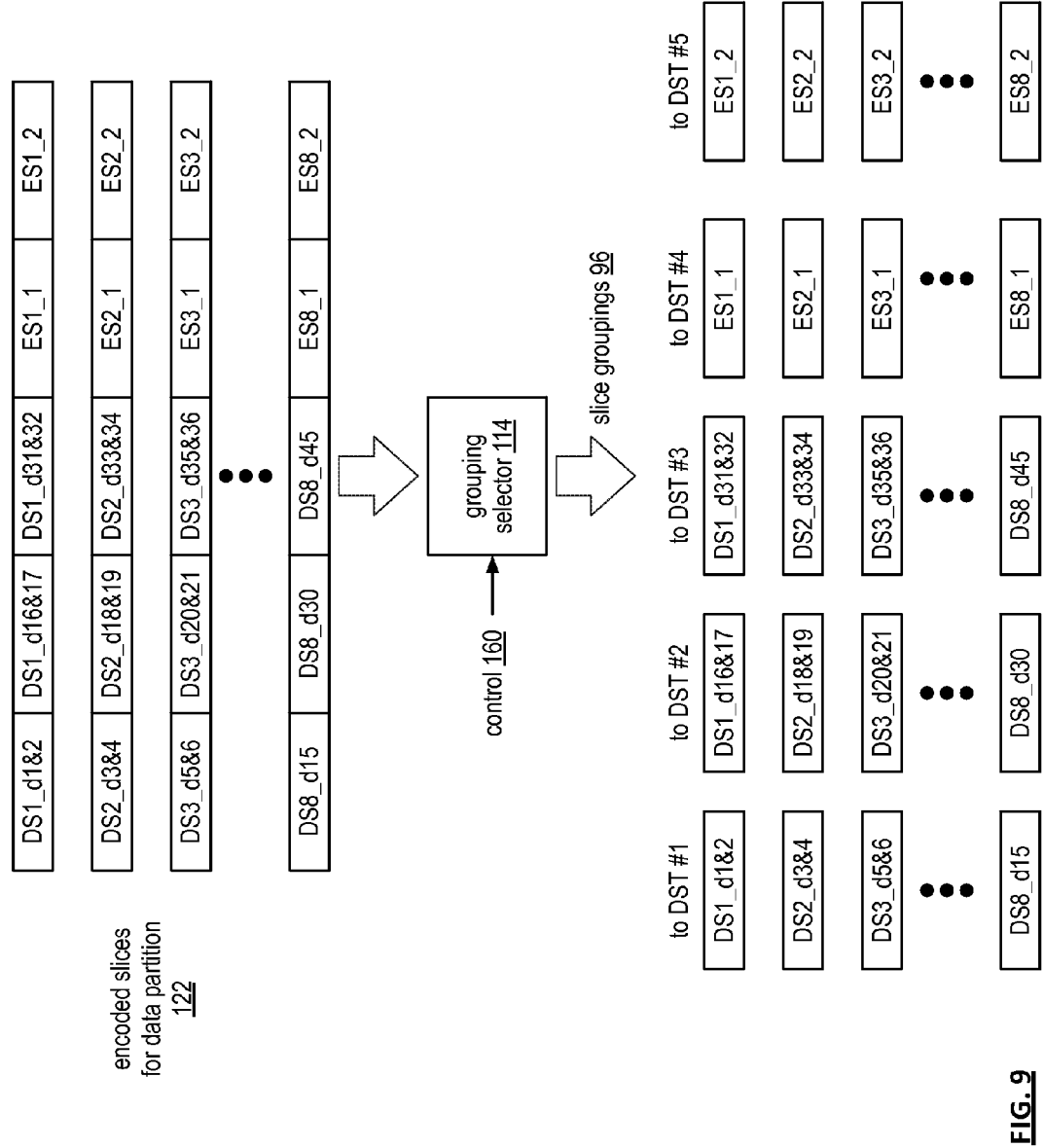
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
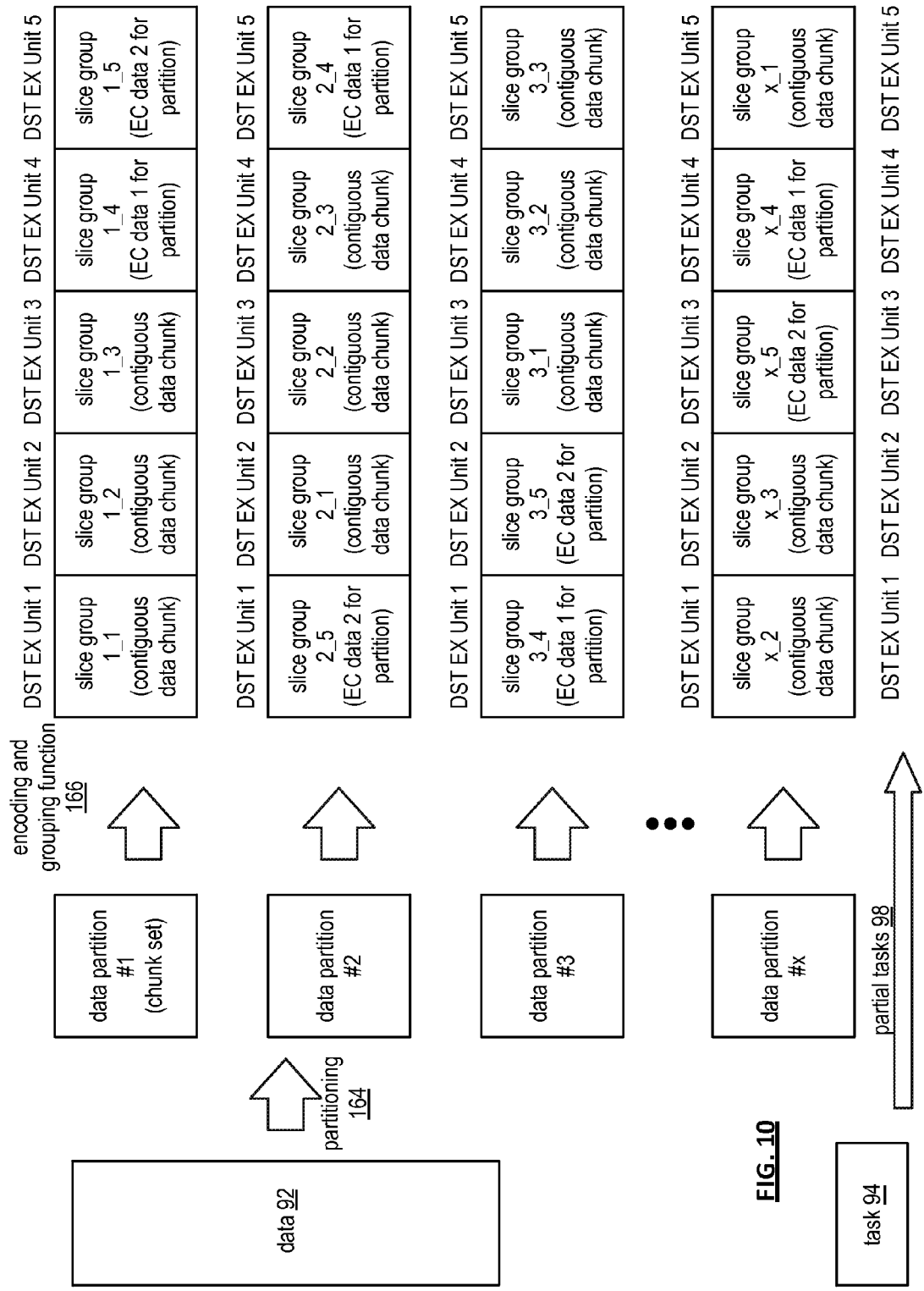
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1–x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
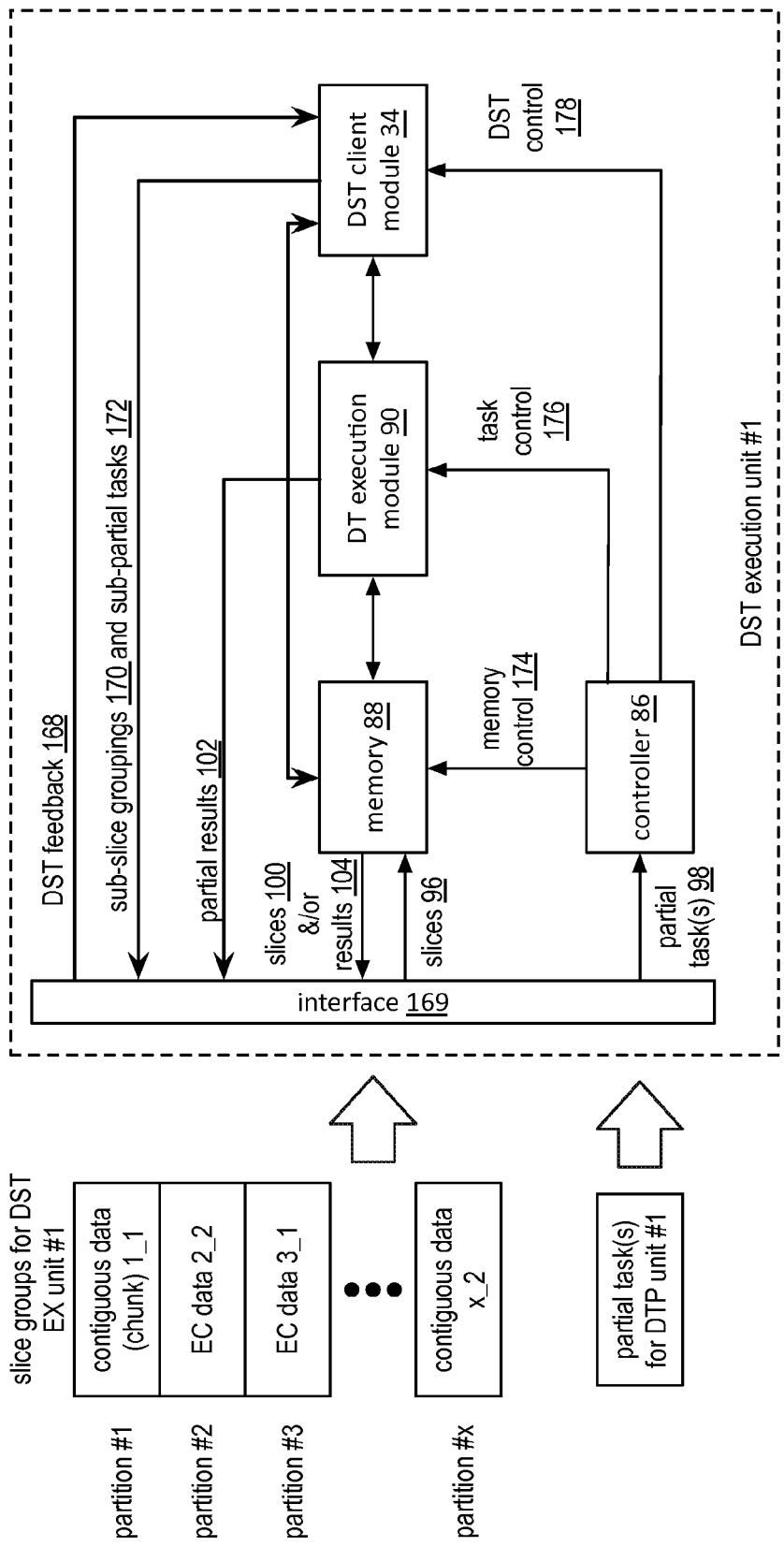
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
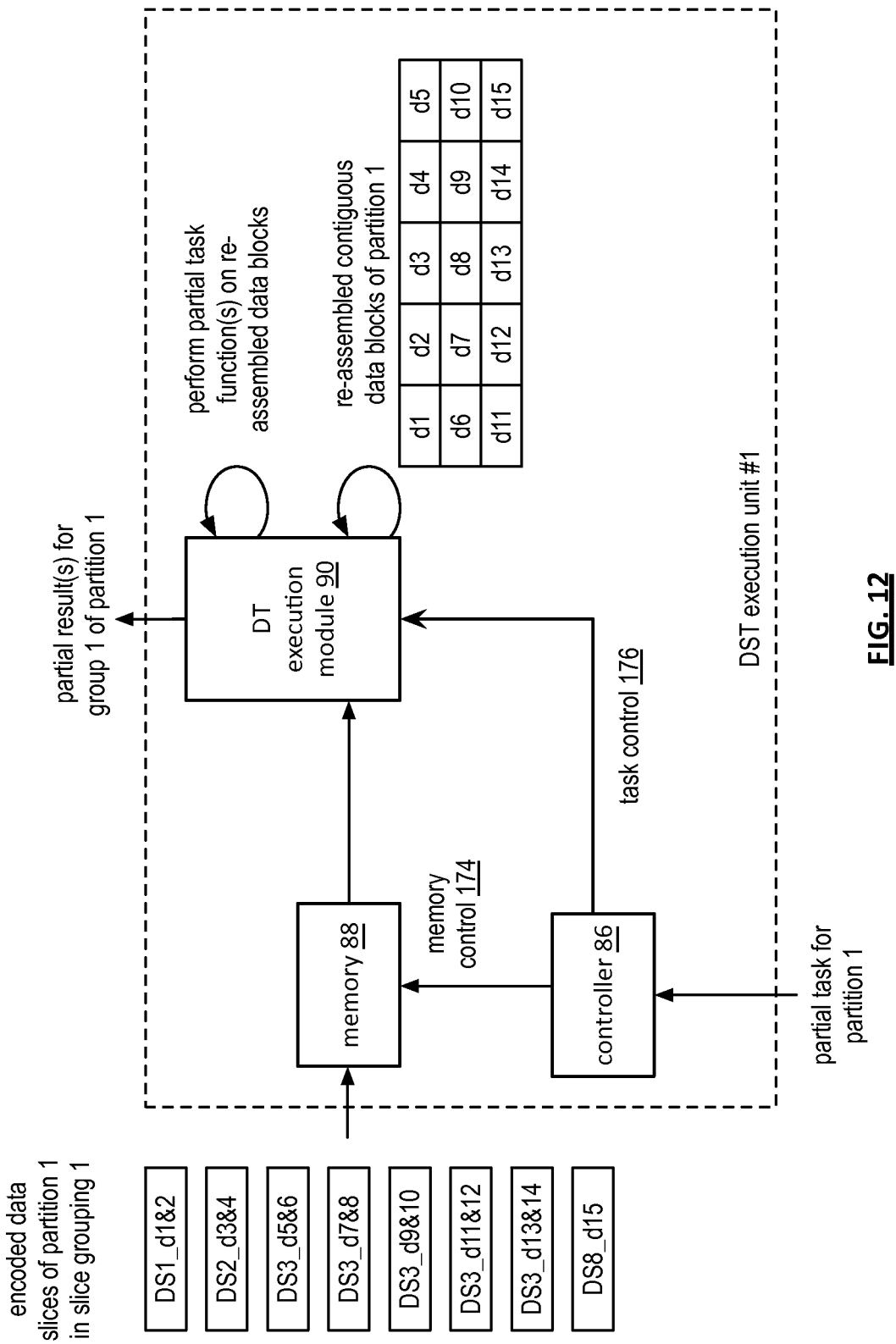
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
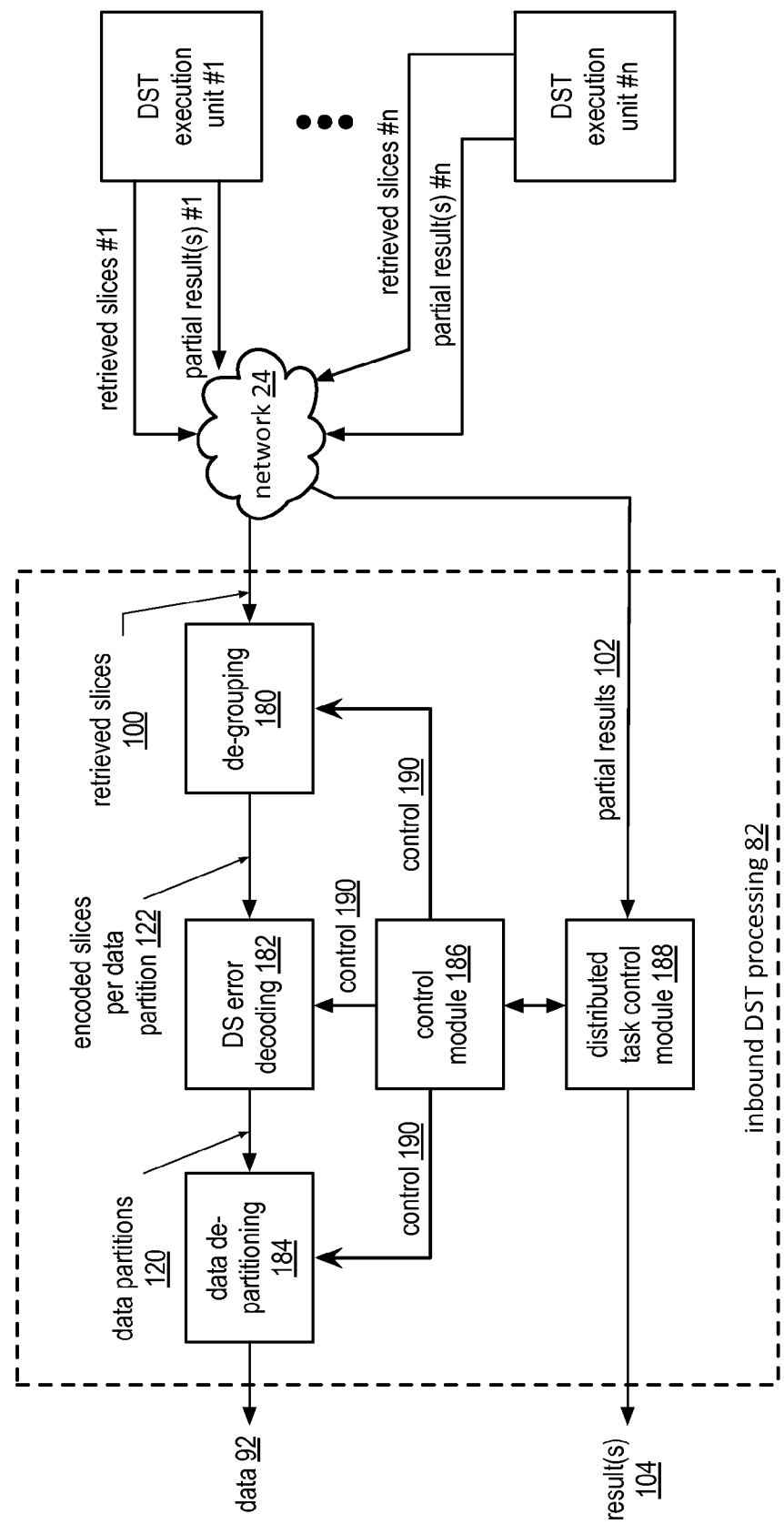
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
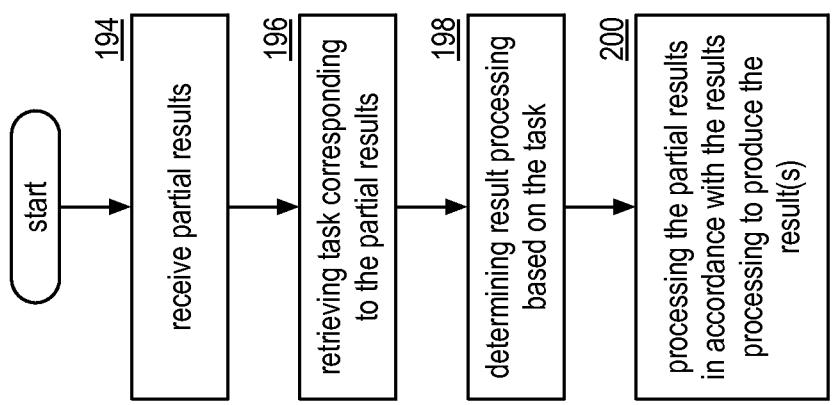
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
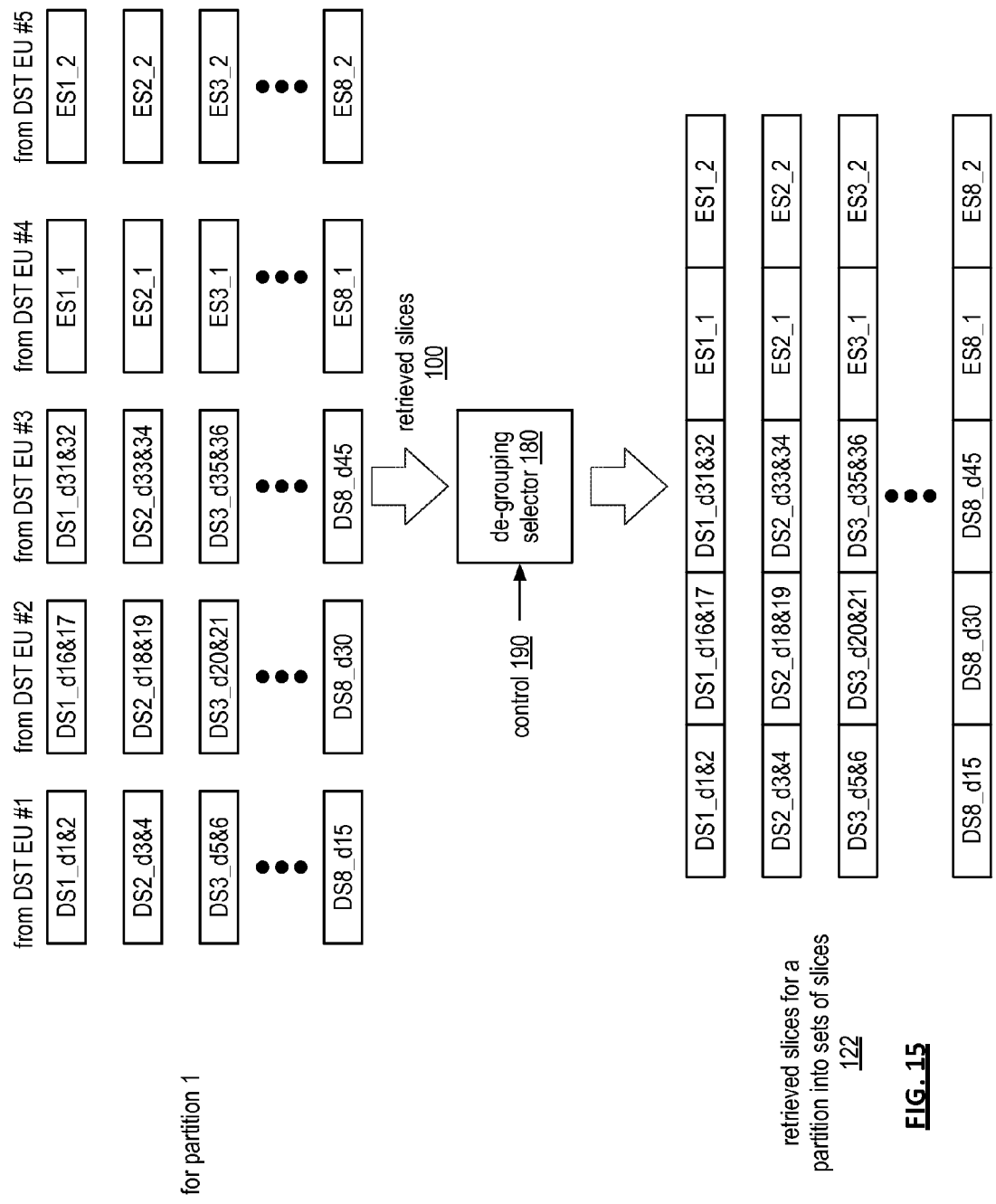
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
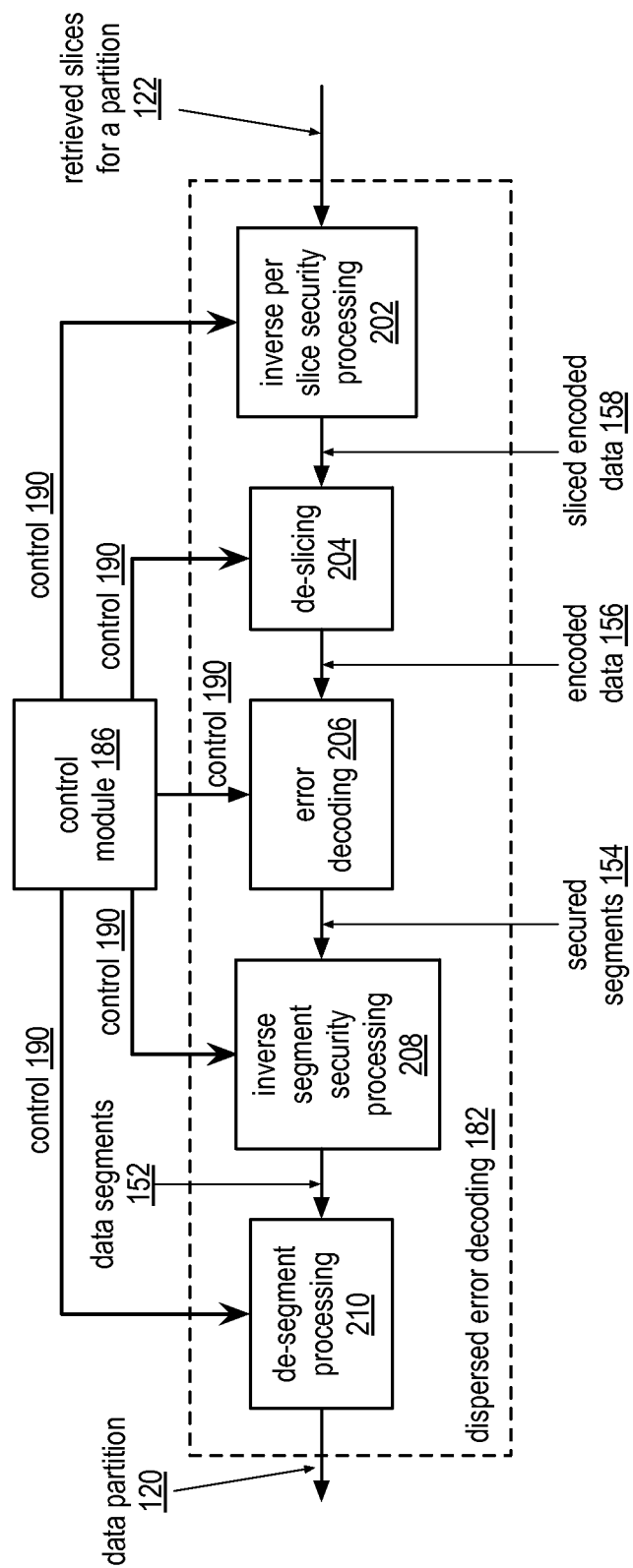
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
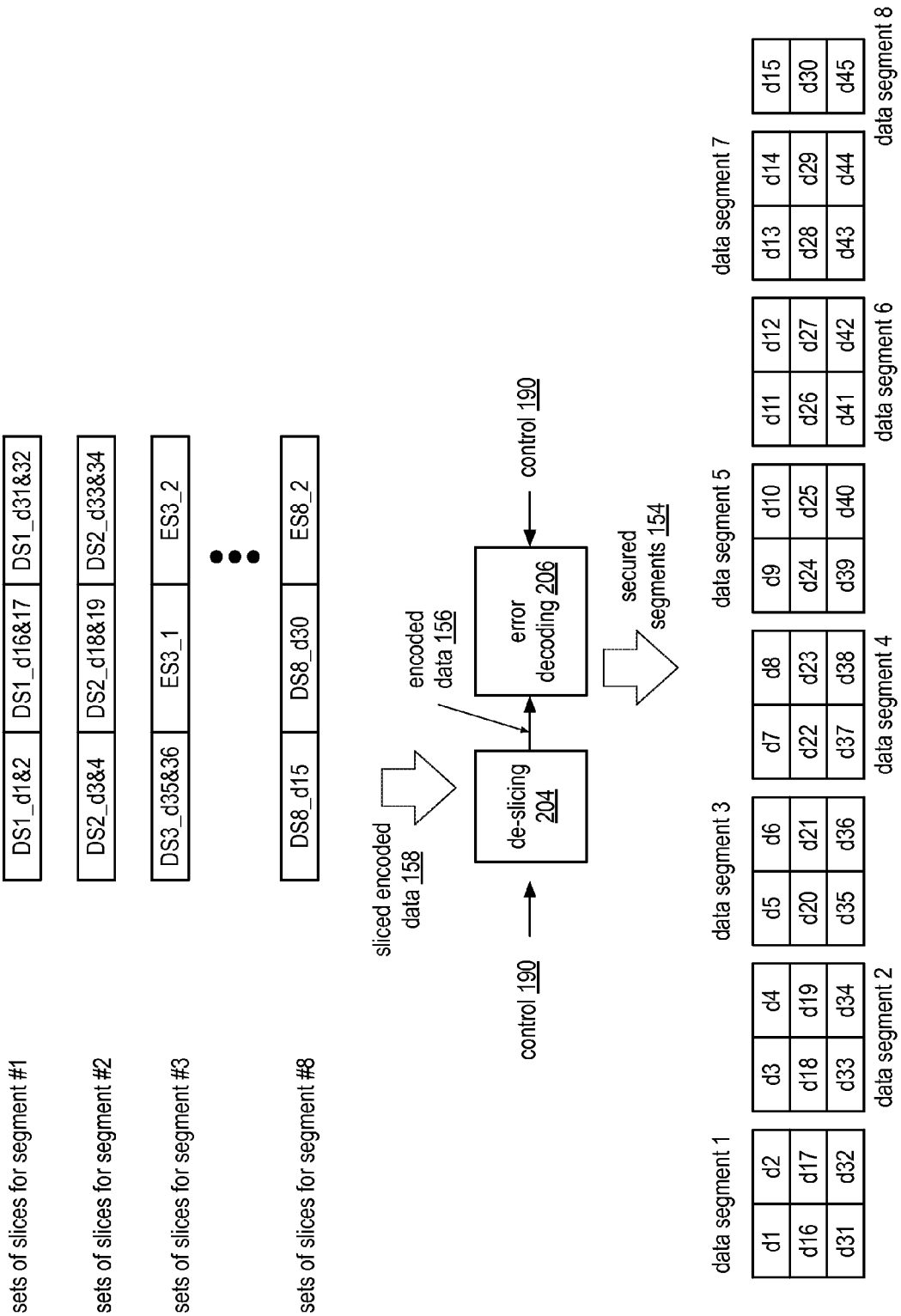
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
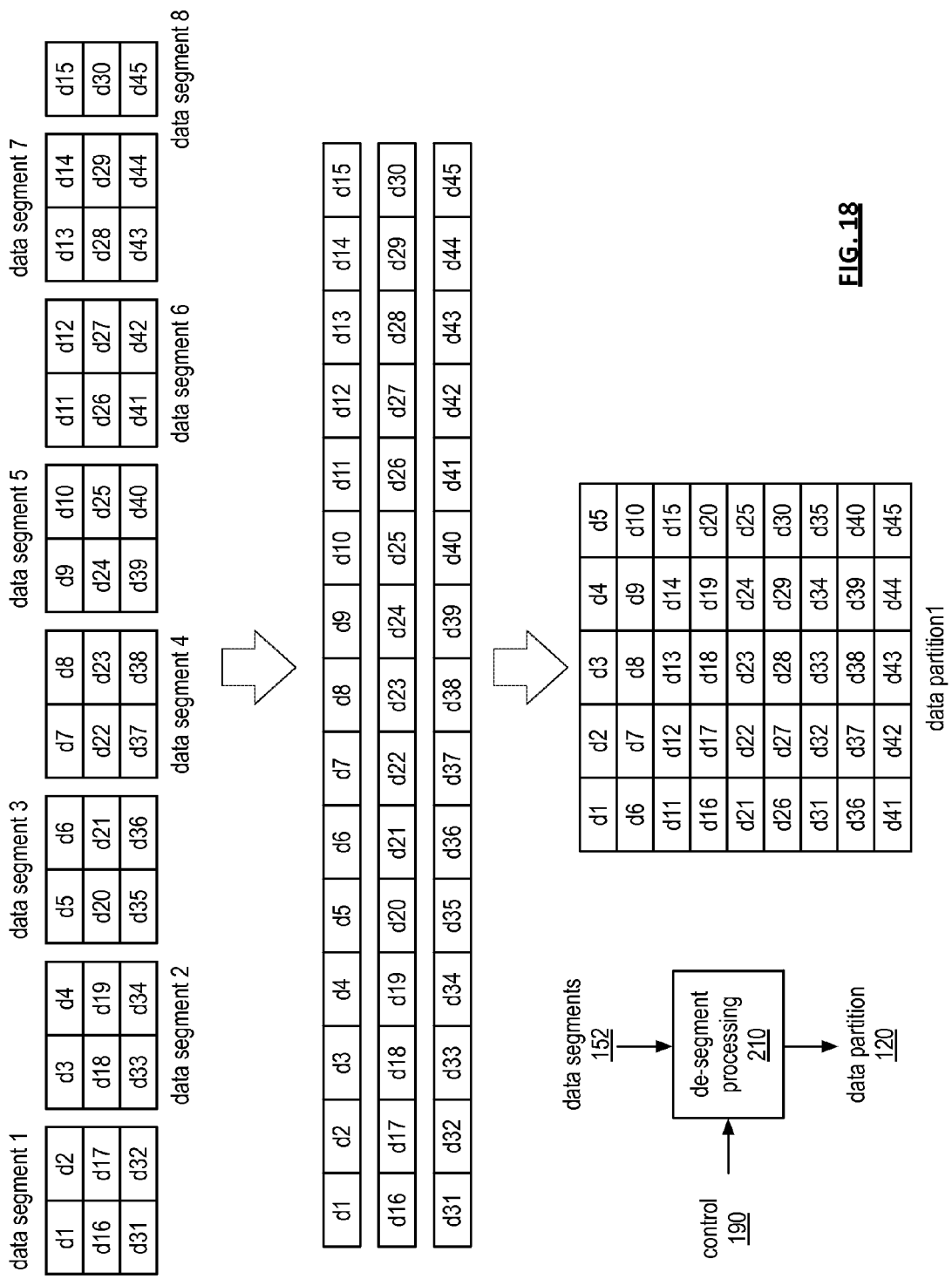
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
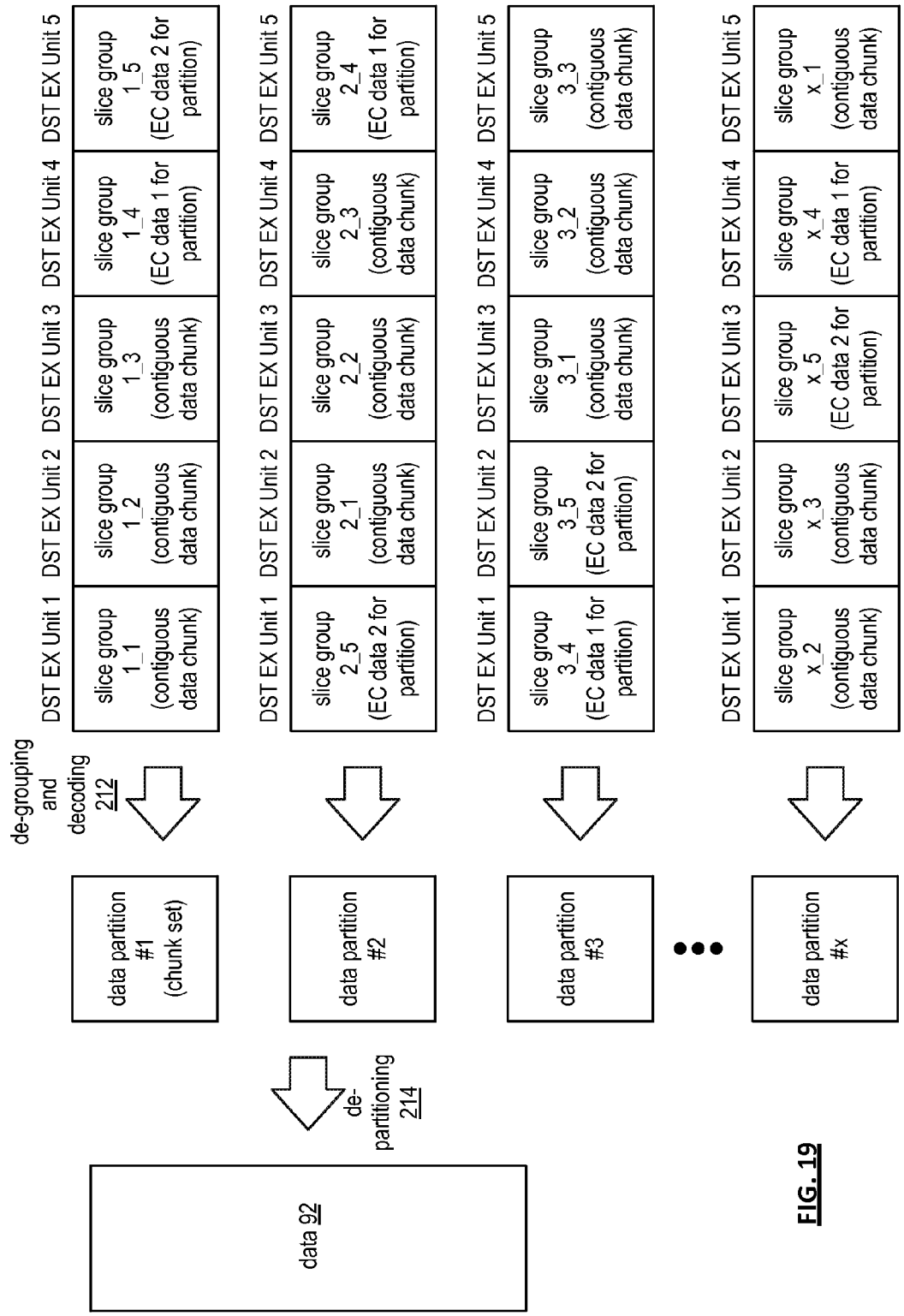
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
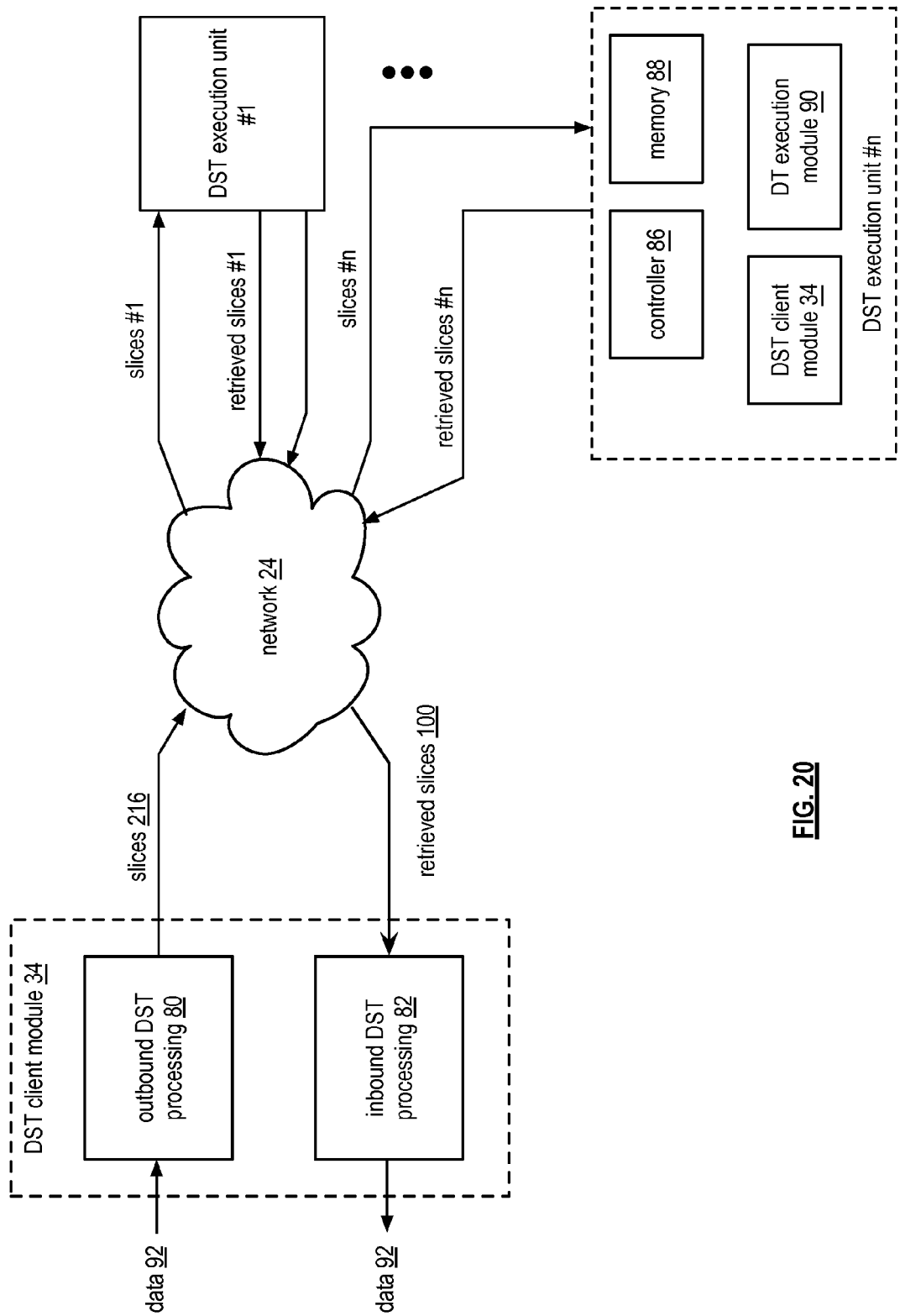
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
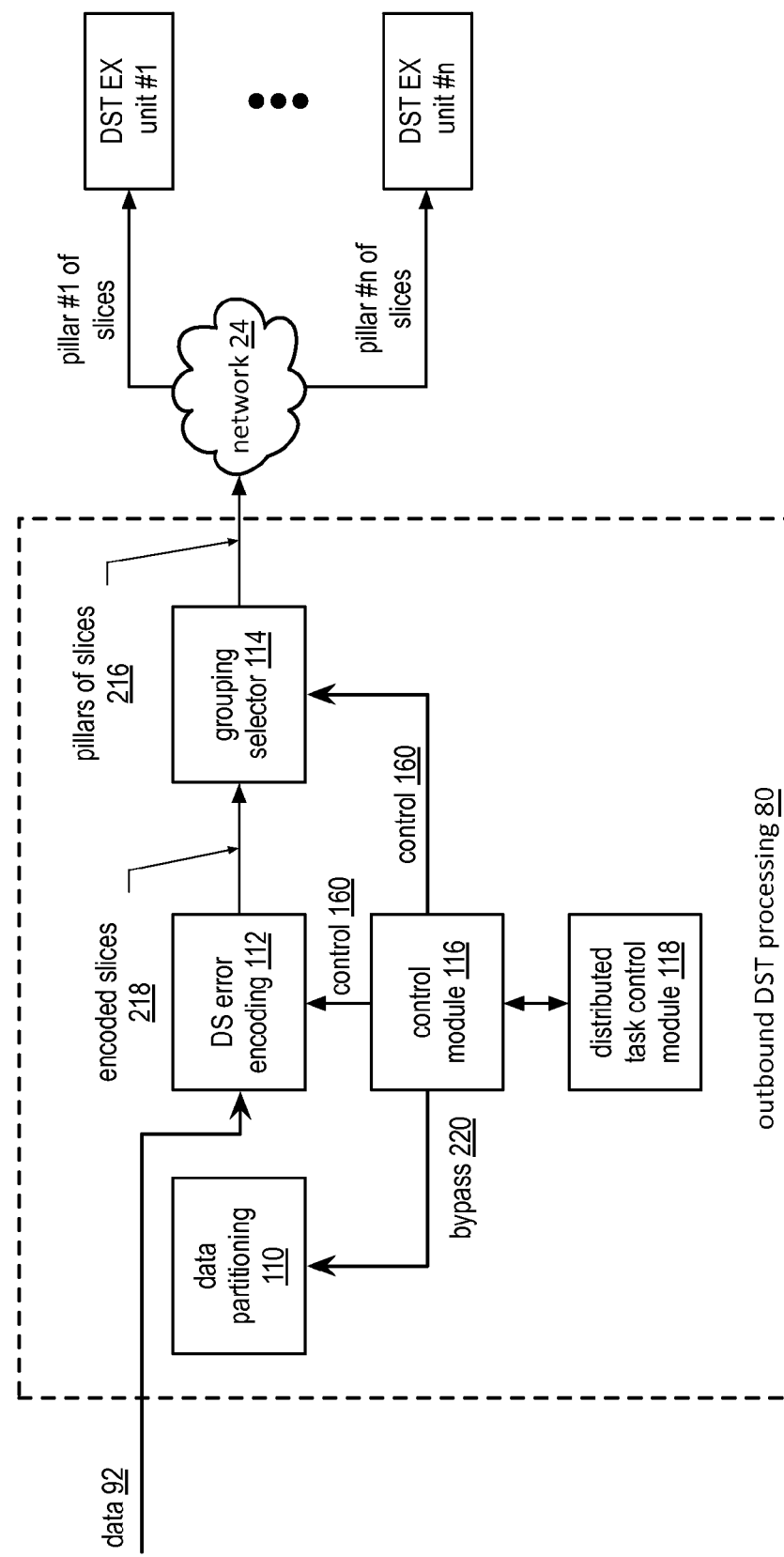
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
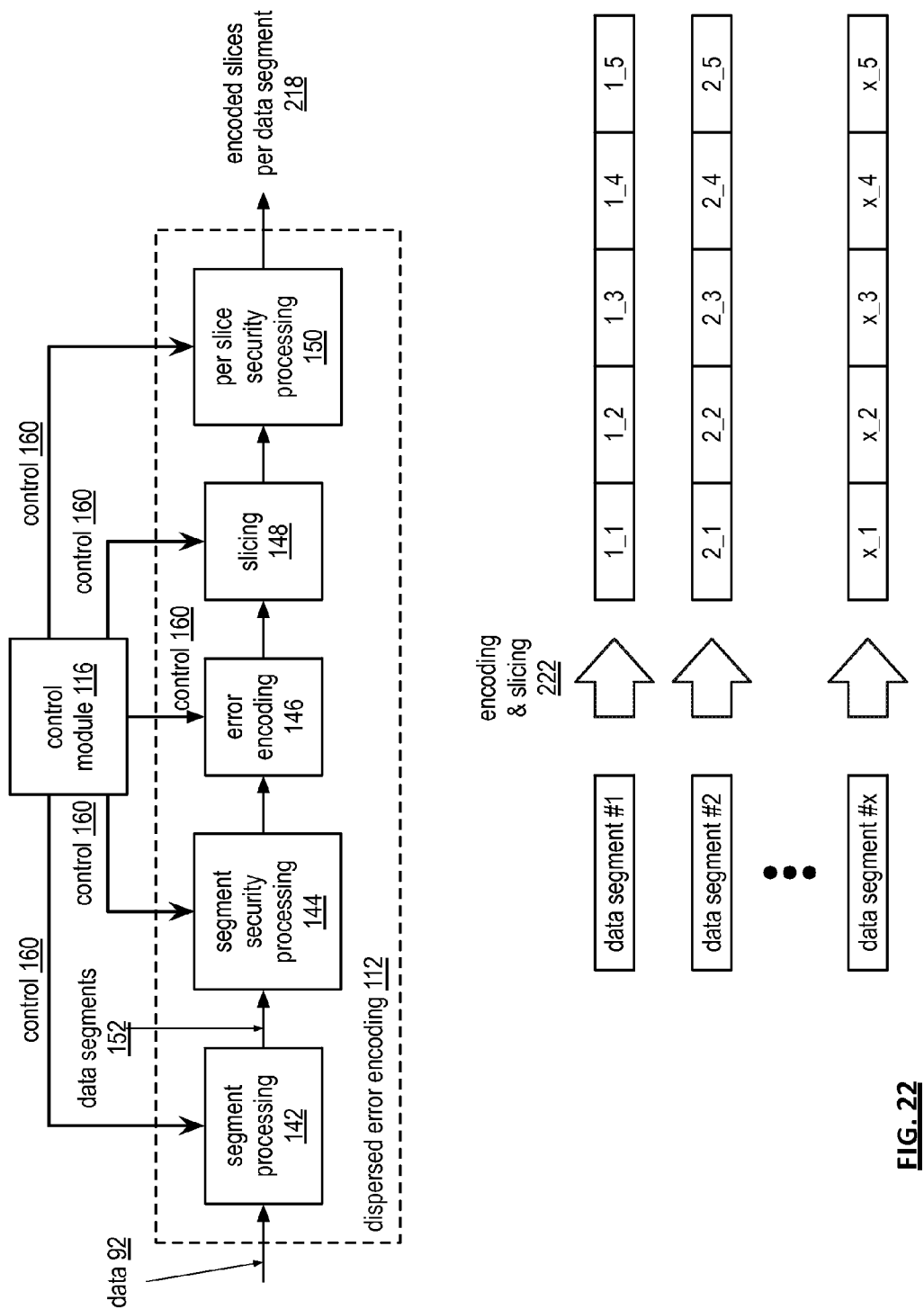
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
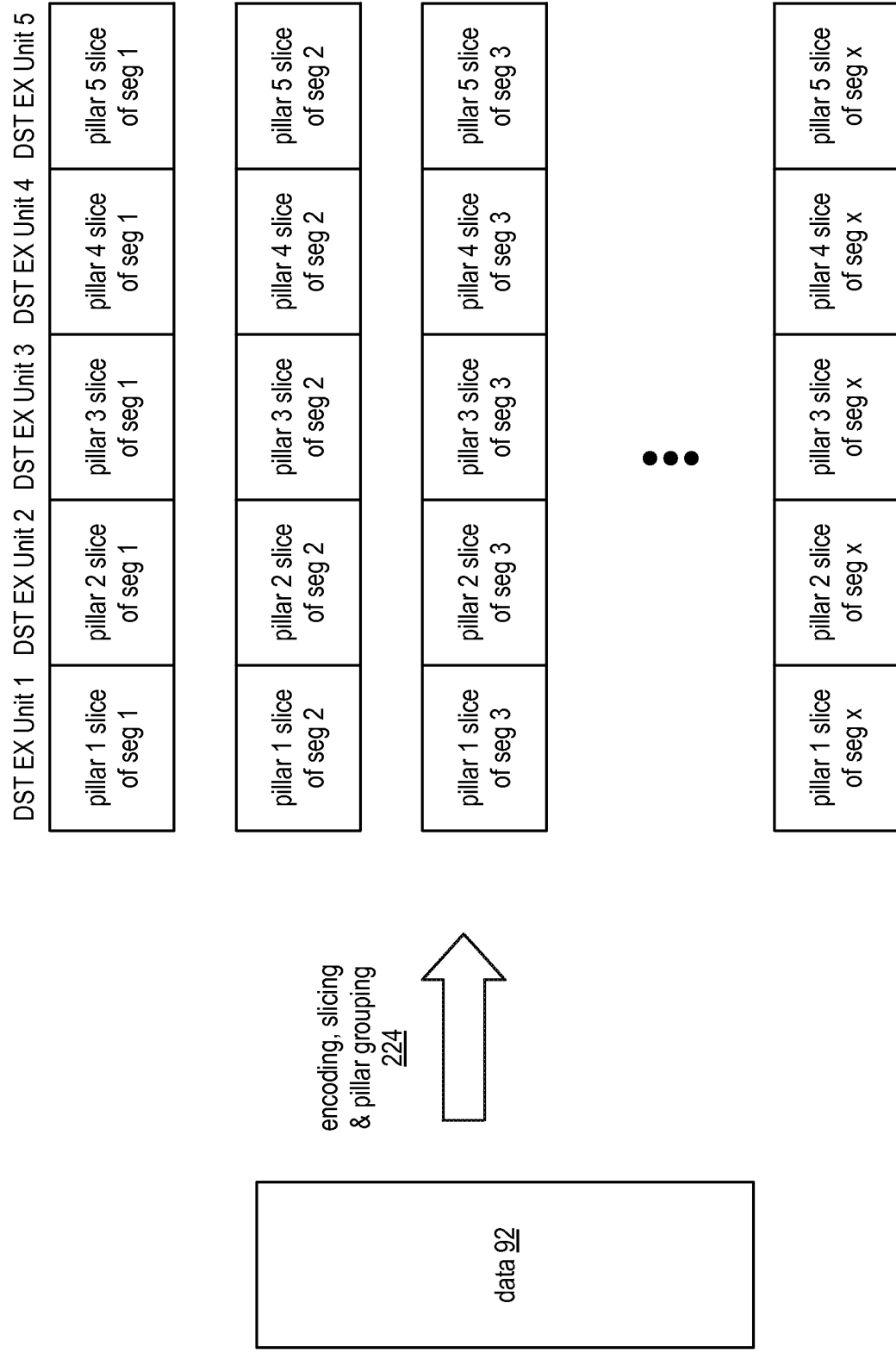
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
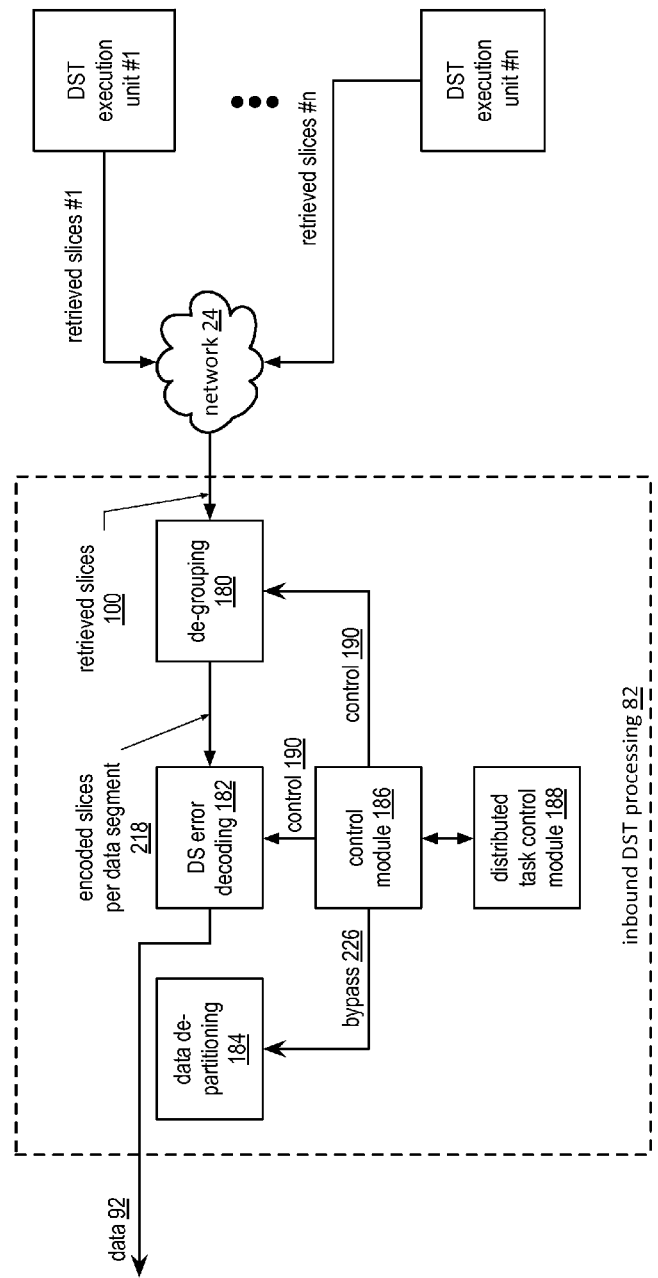
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
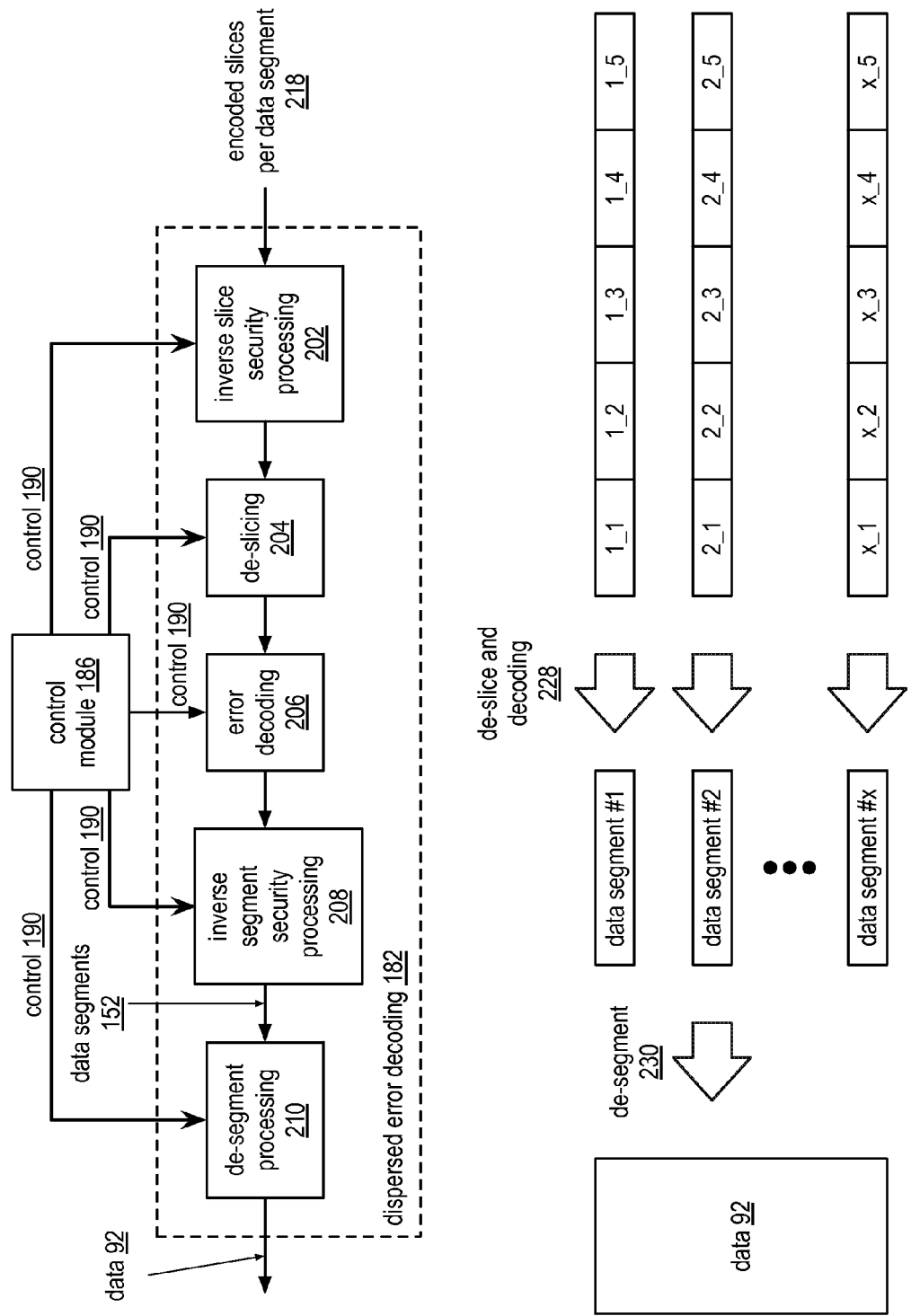
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
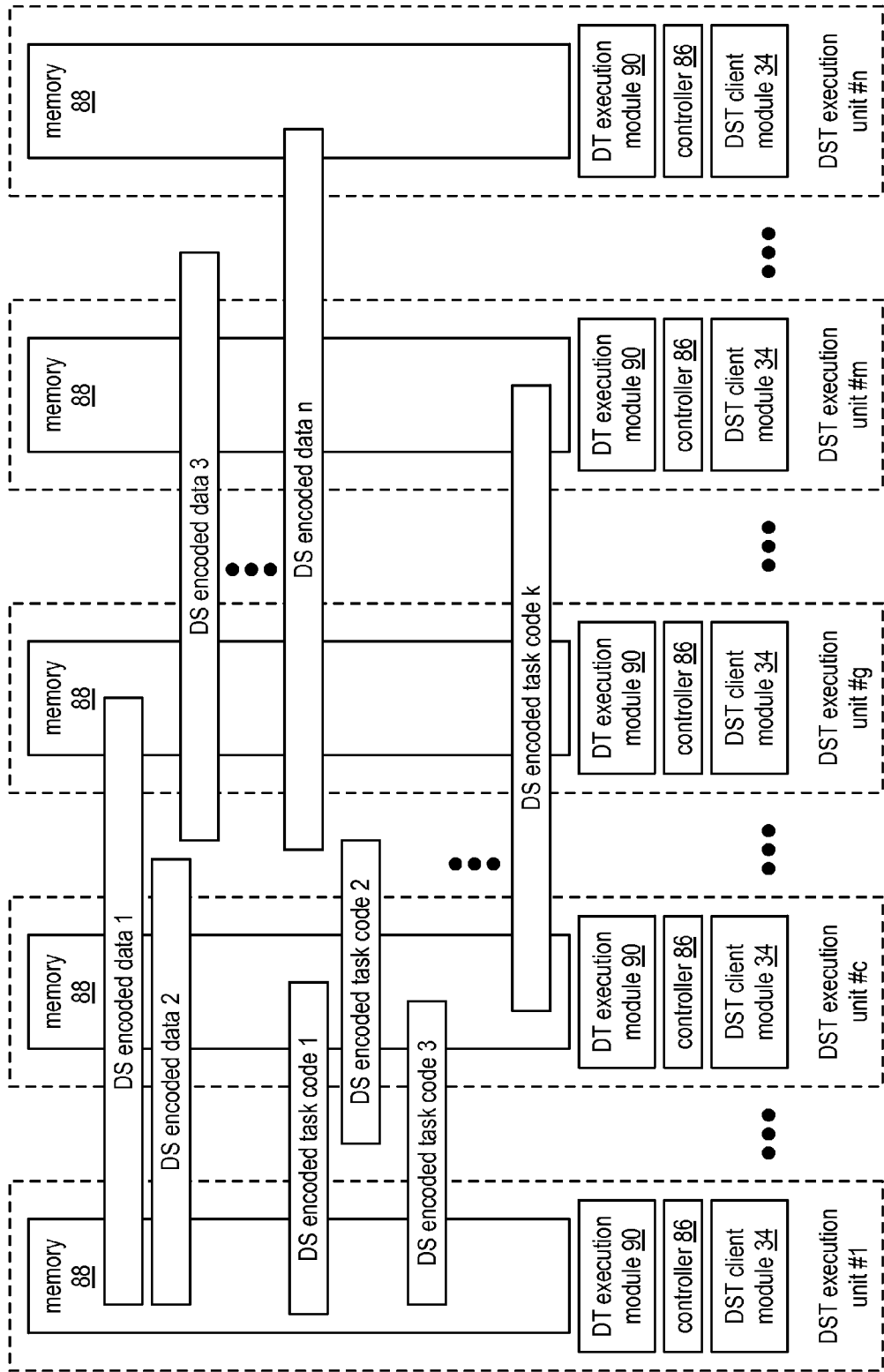
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
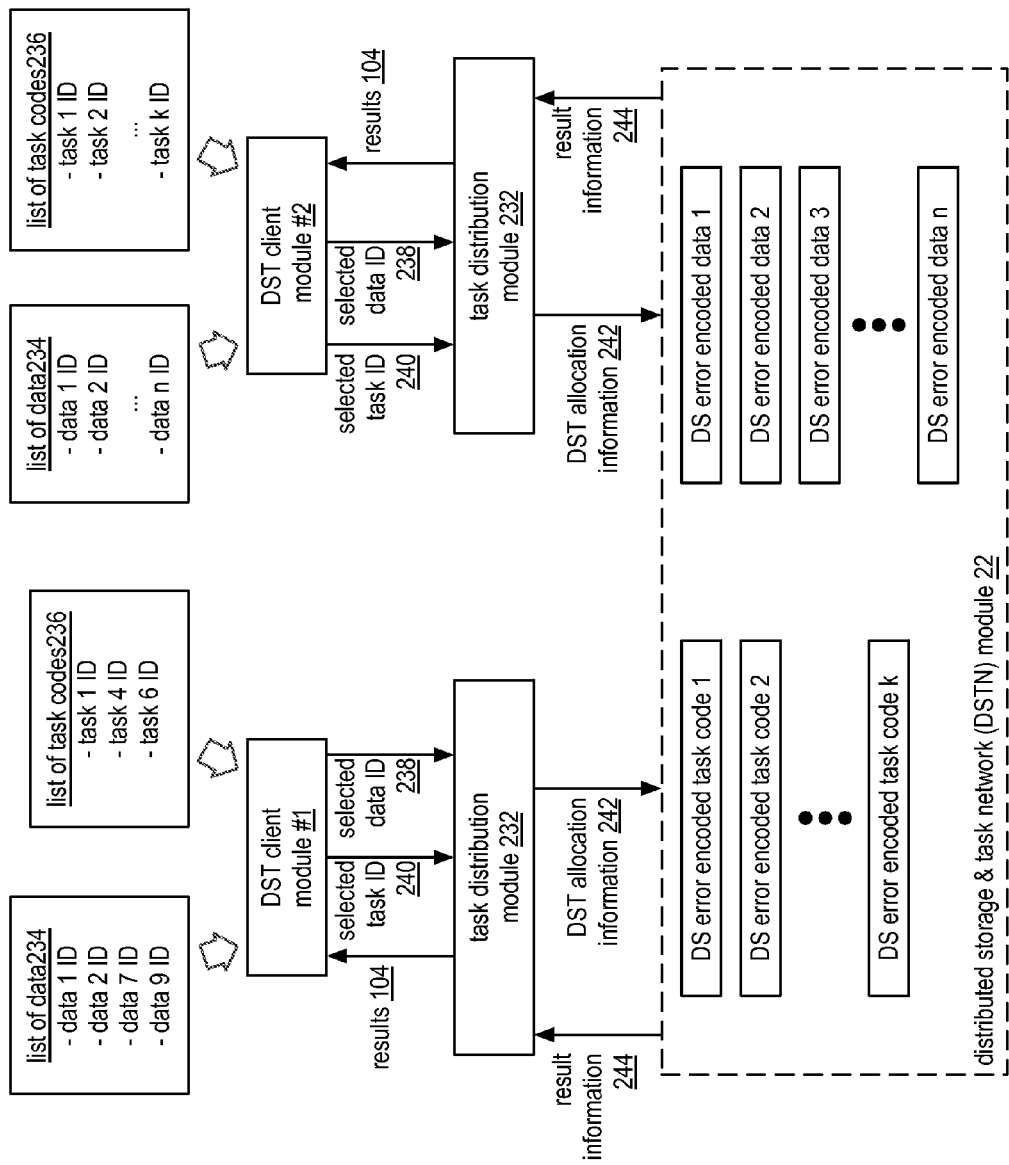
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
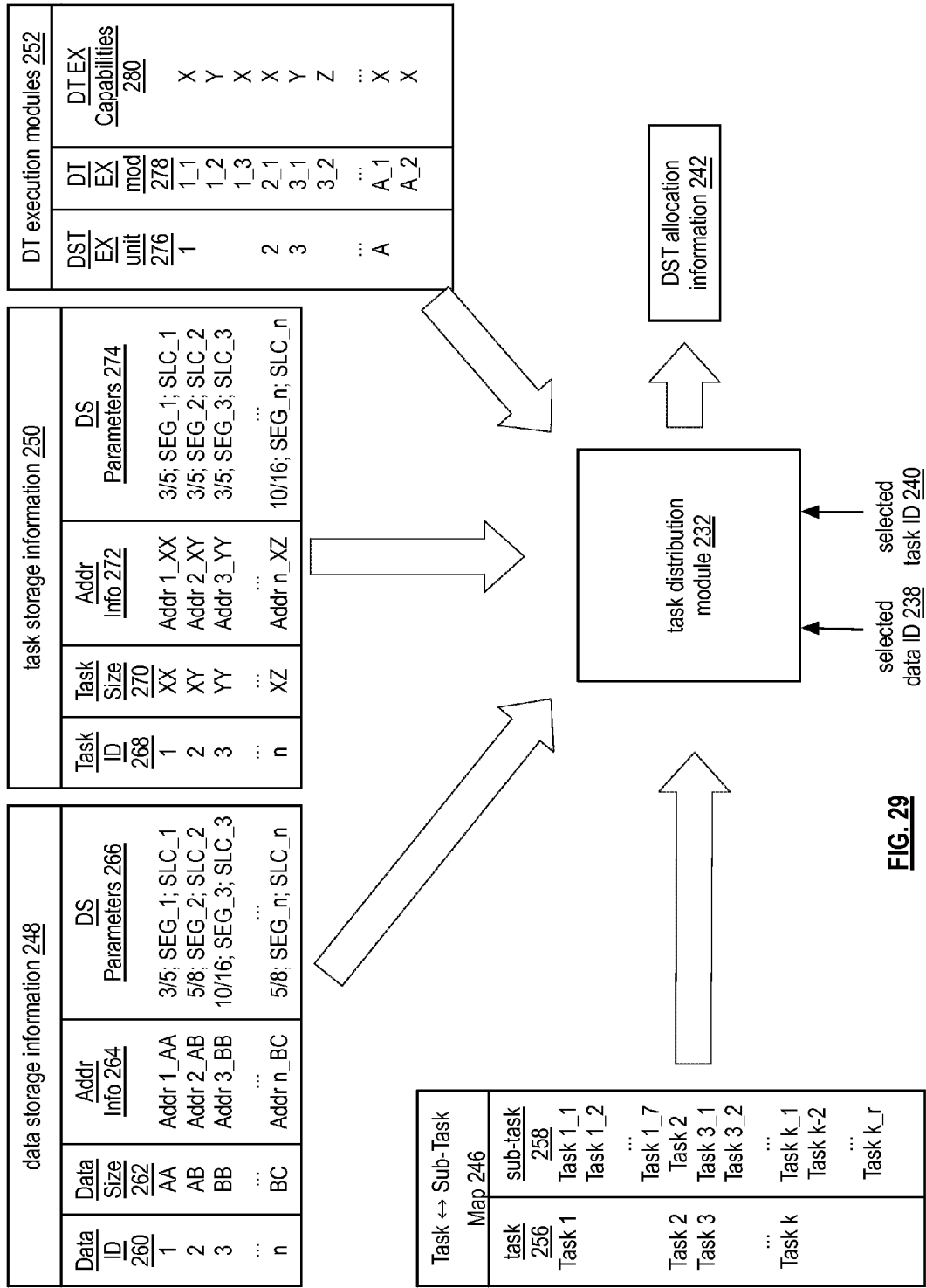
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slices names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
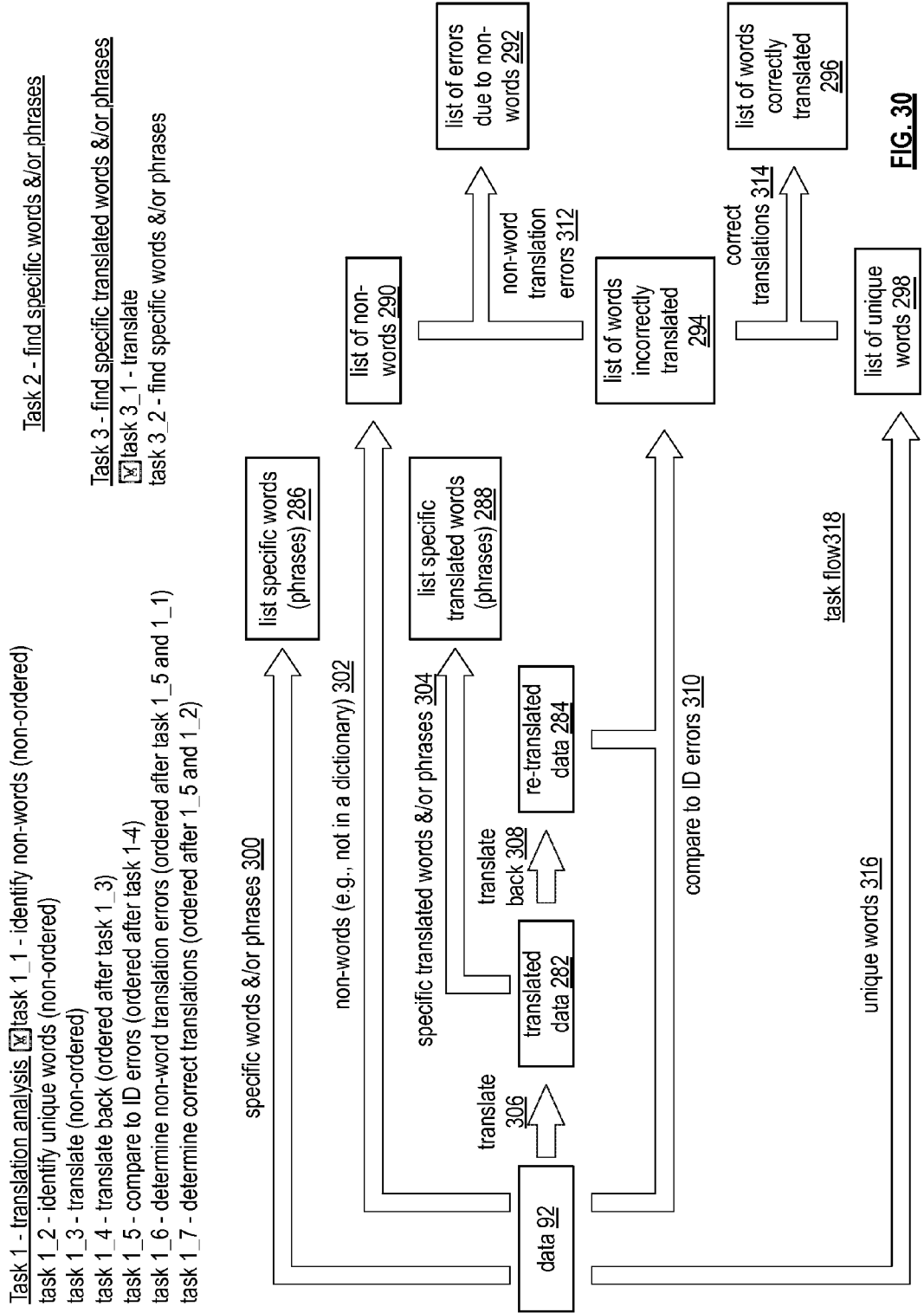
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
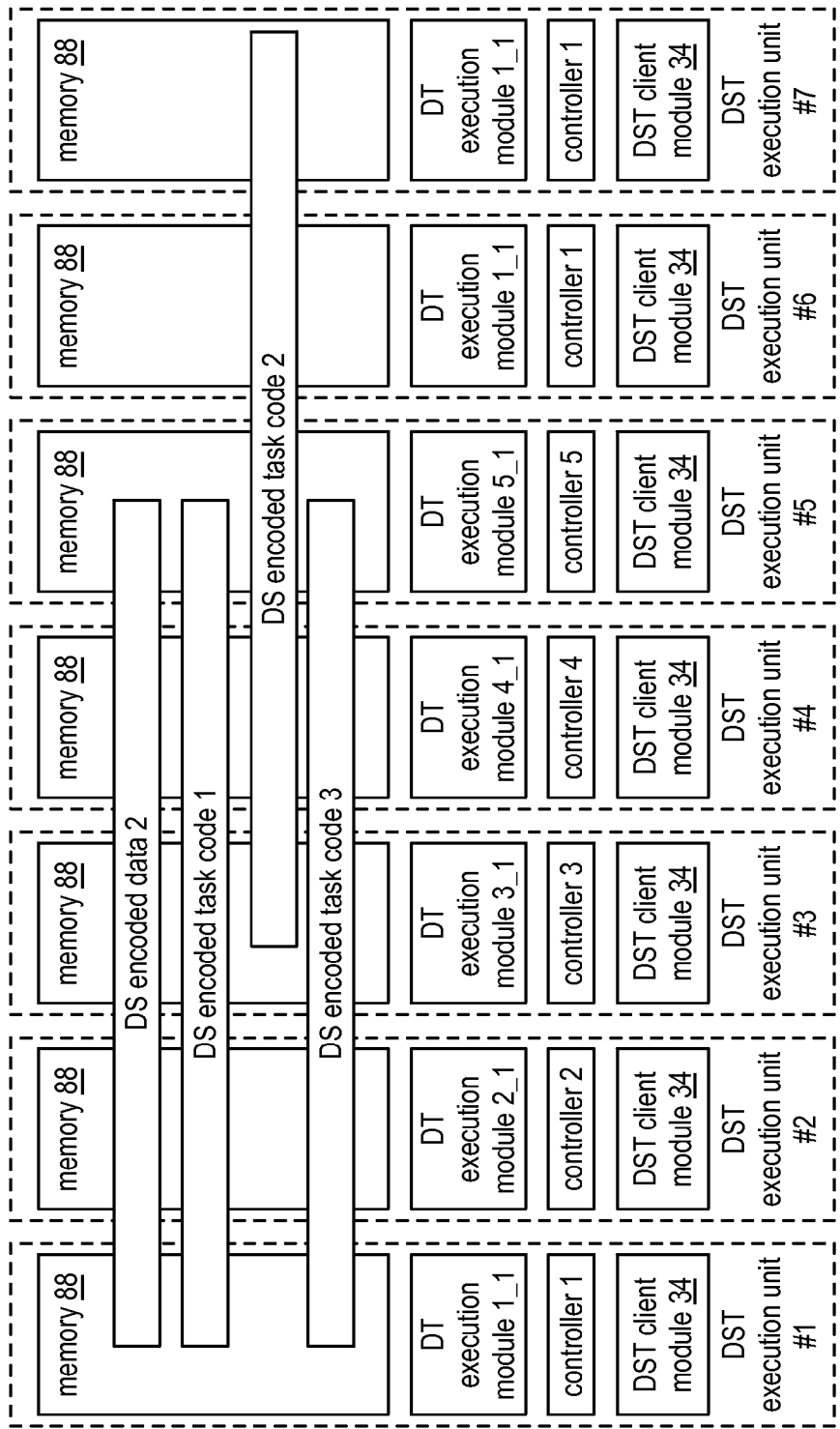
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
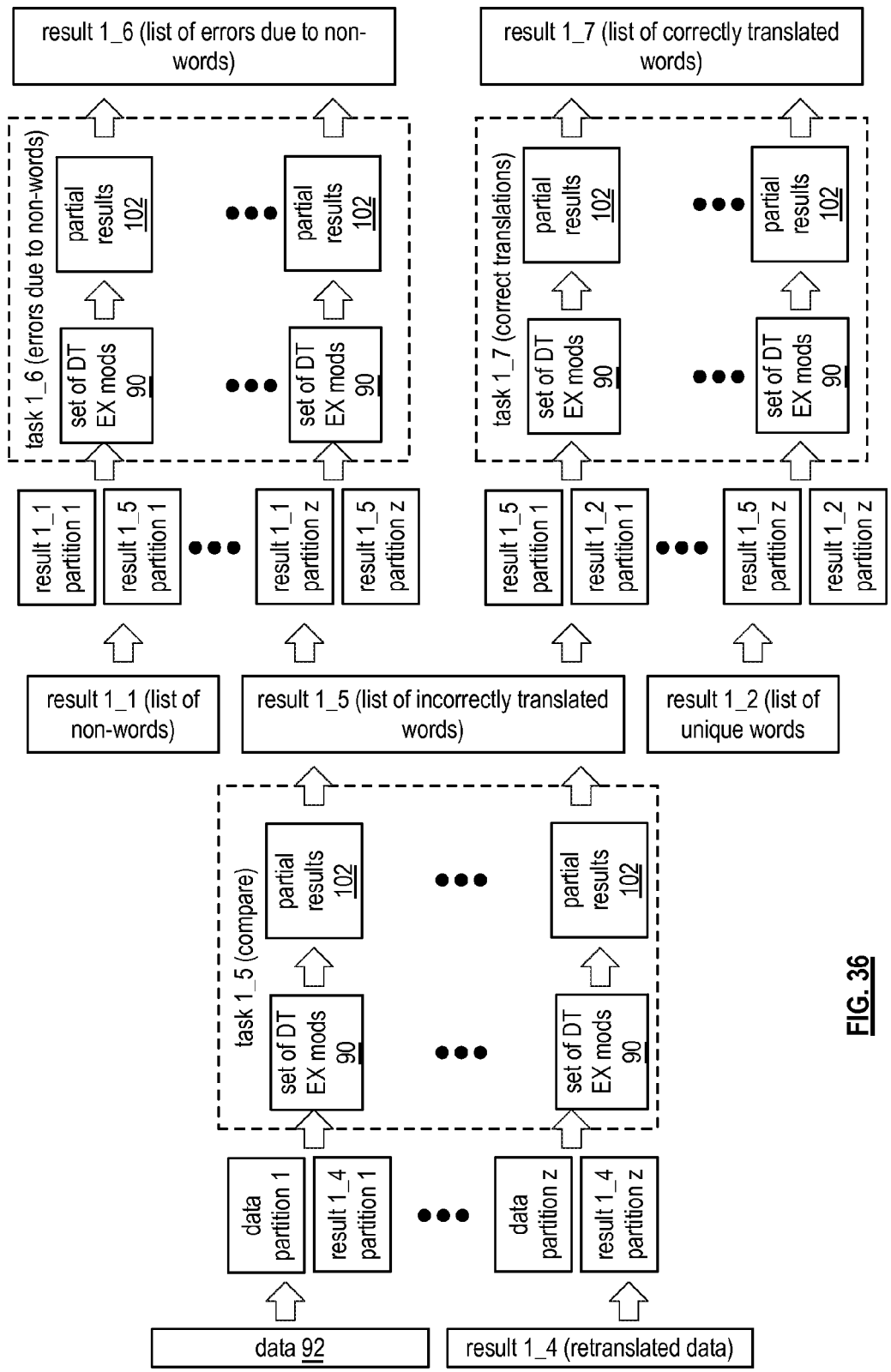

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
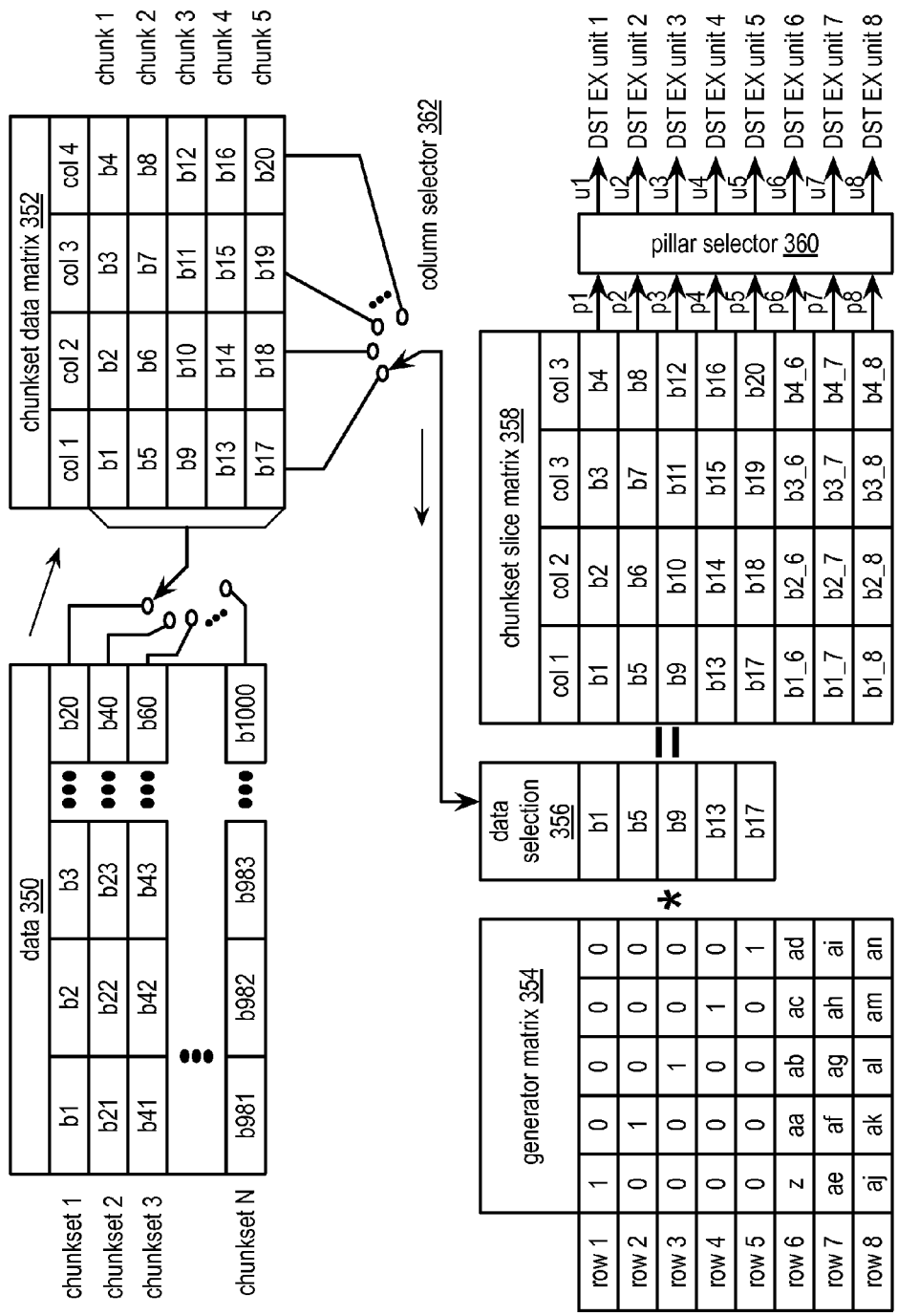
FIG. 40A is a diagram illustrating encoding of data in accordance with the present invention.

FIG. 40A is a diagram illustrating encoding of data 350 that includes data 350 organized as a plurality of chunksets 1-N (e.g., a data partition, or portion thereof), a chunkset data matrix 352 for each of the plurality of chunksets 1-N that includes a row for each chunk, a generator matrix 354 to encode each chunkset, one data selection 356 at a time selected by a column selector 362, to produce a corresponding chunkset matrix 358 of slices, and a pillar selector 360 to route slices of each chunkset to a corresponding distributed storage and task execution (DST EX) unit for task processing. A number of chunks per chunkset may be determined as a number of required parallel DST execution units to process parallel task processing to complete an overall task within a desired task execution time period. A decode threshold of an information dispersal algorithm (IDA) is determined as the number of chunks. A pillar width number of the IDA is determined based on one or more of the decode threshold, a number of available DST EX units, an availability requirement, and a reliability requirement. For example, the decode threshold is set at 5 when the number of chunks is 5 and the pillar width is set at 8 in accordance with a reliability requirement.

A chunk size of each chunkset is determined to match a chunk size requirement for task processing. For example, a chunk size is determined as 4 bytes when a DST EX unit indicates that a task processing data size limit is 4 bytes. A chunkset size is the number of chunks multiplied by the chunk size. For example, the chunkset is 20 bytes when the chunk size is 4 bytes and the number of chunks is 5. A number of chunksets N is determined as a size of the data divided by the size of the chunkset. For example, there are 50 chunksets (e.g., N=50) when the chunks that are 20 bytes and the size of the data is 1000 bytes.

The generator matrix 354 is determined in accordance with the IDA and includes a decode threshold number of columns and a width (e.g., pillar width) number of rows. A unity matrix may be utilized in a top square matrix to facilitate generation of contiguous data slices that match contiguous data of chunks. Other rows of the generator matrix 354 facilitate generating error coded slices (e.g., encoded data slices) for remaining rows of the chunkset slice matrix 358.

For each chunkset, the generator matrix 354 is matrix multiplied by a column of the corresponding chunkset data matrix (e.g., data selection 356 as selected by column selector 362) to generate a column of the chunkset slice matrix 358 for the corresponding chunkset. For example, row 1 of the generator matrix 354 is multiplied by column 1 of the chunkset data matrix 352 to produce a row 1 byte of column 1 of the chunkset slice matrix 358, row 2 of the generator matrix 354 is multiplied by column 1 of the chunkset data matrix 352 to produce a row 2 byte of column 1 of the chunkset slice matrix 358, etc. As another example, row 1 of the generator matrix 354 is multiplied by column 2 of the chunkset data matrix 352 to produce a row 1 byte of column 2 of the chunkset slice matrix 358, row 2 of the generator matrix 354 is multiplied by column 2 of the chunkset data matrix 352 to produce a row 2 byte of column 2 of the chunkset slice matrix 358, etc.

A segment may be considered as one or more columns of the chunkset data matrix 352 and slices that correspond to the segment are the rows of the chunkset slice matrix 358 that correspond to the one or more columns of the chunkset data matrix 352. For example, row 1 column 1 of the chunkset slice matrix 358 forms slice 1 when column 1 of the chunkset data matrix 352 is considered as a corresponding segment. Slices of a common row of the chunkset slice matrix 358 are of a chunk of contiguous data of the data and share a common pillar number and may be stored in a common DST EX unit to facilitate a distributed task.

The pillar selector 360 routes slices of each pillar to a DST EX unit in accordance with a pillar selection scheme. For example, four slices of row 1 (e.g., bytes from columns 1-4) of the chunkset slice matrix 358 are sent to DST EX unit 1 as a contiguous chunk of data that includes 4 bytes when the pillar selection scheme maps pillars 1-5 (e.g., associated with slices of contiguous data), to DST EX units 1-5 and maps pillars 6-8 (e.g., associated with error coded slices) to DST EX units 6-8 for a first chunkset.

To facilitate load leveling of tasks executed by the DST EX units, the pillar selection scheme may include rotating assignments of pillars to different DST EX units for each chunkset. For example, four slices of row 8 of the chunkset slice matrix 358 are sent to DST EX unit 1 as error coded data slices that includes 4 bytes when the pillar selection scheme maps pillar 8 (e.g., associated with error coded slices), to DST EX units 1 and maps pillars 1 (e.g., associated with slices of contiguous data) to DST EX units 8 for another chunkset.

To facilitate execution options of partial tasks associated with the slices, the pillar selection scheme may include sending a slice to two or more DST execution units. For example, four slices of row 1 of the chunkset slice matrix 358 are sent to DST execution unit 1, a fourth slice of the first row of the chunkset slice matrix 358 is sent to DST execution unit 2, four slices of row 2 of the chunkset slice matrix 358 are sent to DST execution unit 2, and a first slice of row 2 of the chunkset slice matrix 358 is sent to DST execution unit 1. As such, DST execution unit 1 may process partial tasks on the first slice of row 2 when DST execution unit 2 is not able to execute those tasks in a timely manner. In addition, DST execution unit 2 may process partial tasks on the fourth slice of row 1 when DST execution unit 1 is not able to execute those tasks in a timely manner.

Figure 40B:
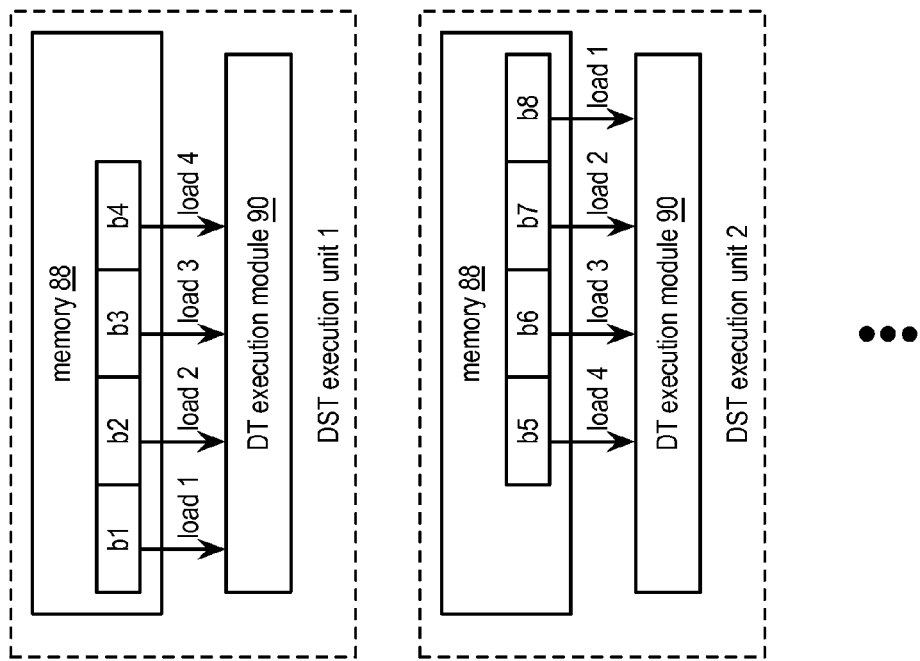
FIG. 40B is a schematic block diagram of a set of DST execution units processing slice groupings in accordance with the present invention.

FIG. 40B is a schematic block diagram of a set of distributed storage and task (DST) execution units processing slice groupings. Each DST execution unit of the set of DST execution units includes a memory 88 and a distributed task (DT) execution module 90. The set of DST execution units may include a pillar width number of DST execution units utilized to store one or more sets of slices of the slice groupings. The memory 88 functions to store one or more slices of each slice grouping. For example, DST execution unit 1 receives a slice grouping that includes bytes b1-b4 as slices 1-4 and stores bytes b1-b4 in memory 88 of DST execution unit 1. As another example, DST execution unit 2 receives a slice grouping that includes bytes b5-b8 as slices 5-8 and stores bytes b5-b8 in memory 88 of DST execution unit 2.

Each DST execution unit receives partial tasks associated with a slice grouping and executes the partial tasks on the slice grouping to produce partial results. The partial tasks may include execution ordering information. The execution ordering information may include information with regards to which partial task to execute first, second, etc. and may include information with regards to which slice to process first, second, etc. For example, the DT execution module 90 of DST execution unit 1 loads b1 first to execute a partial task on b1 to produce a partial result corresponding to b1 and loads b2 second to execute a partial task on b2 to produce a partial result corresponding to b2 when the execution ordering information indicates to start with byte b1 and then process b2. As another example, the DT execution module 90 of DST execution unit 2 loads b8 first to execute a partial task on b8 to produce a partial result corresponding to b8 and loads b7 second to execute a partial task on b7 to produce a partial result corresponding to b7 when the execution ordering information indicates to start with byte b8 and then process b7.

FIG. 40C is a flowchart illustrating an example of generating a slice grouping, which include similar steps to FIG. 5. The method begins with step 126 FIG. 5 where a processing module (e.g., of a distributed storage and task (DST) client module) receives data and a corresponding task. The method continues at step 364 where the processing module selects one or more DST execution units for the task based on a capability level associated with each of the DST execution units. The selecting includes one or more of determining a number of DST execution units and selecting the number of DST execution units based on one or more of an estimated distributed computing loading level, a DST execution unit capability indicator, a DST execution unit performance indicator, a DST execution unit availability level indicator, a task schedule, and a DST execution unit threshold computing capability indicator. For example, the processing module selects DST execution units 1-8 when DST execution unit availability level indicators for DST execution units 1-8 compares favorably to an estimated distributed computing loading level. The method continues with steps 130, 132, 134, and 136 of FIG. 5 where the processing module determines processing parameters of the data based on a number of DST execution units, determines task partitioning based on the DST execution units (e.g., capabilities) and the processing parameters, processes the data in accordance with the processing parameters to produce slice groupings, and partitions the task based on the task partitioning to produce partial tasks.

The method continues at step 366 where the processing module determines partial task execution ordering for pairs of DST execution units (e.g., a DST execution unit execution pair) such that slices near a boundary between two slice groupings are processed last. For example, the processing module determines partial task execution ordering for a DST execution unit 1 and a DST execution unit 2 to be executed as partial tasks in order on slices 1, 2, 3 and 4 by DST execution unit 1 and to execute partial tasks in order on slices 8, 7, 6, 5 by DST execution unit 2 when a first slice grouping includes slices 1-4 and a second slice grouping includes slices 5-8 such that a border between the two slice groupings includes a boundary between slices 4 and 5.

The method continues at step 368 where the processing module sends the slice groupings and corresponding partial tasks to the selected DST execution units in accordance with the task execution ordering. For example, the processing module sends slice 1 to DST execution unit 1 followed by sending slice 2 to the DST execution 1 etc. As another example, the processing module sends slice 8 to DST execution unit to be followed by sending slice 7 to DST execution unit 2 etc.

FIG. 40D is a flowchart illustrating an example of transferring a slice. The method begins at step 370 where a processing module (e.g., of a distributed storage and task (DST) client module) detects a DST execution unit execution pair with an unfavorable partial task execution level. The detection may be based on one or more of receiving a message, an error, a query, receiving one or more partial task responses, and comparing a number of slices that have been processed by each DST execution unit of the pair. The processing module detects the unfavorable partial task execution level when a slower DST execution unit is executing partial tasks on slices far behind execution of partial tasks by a faster DST execution unit by more than an execution gap threshold. For example, the processing module detects the unfavorable partial task execution level when the slower DST execution unit has completed executing partial tasks on one slice in the same time that the faster DST execution unit has completed executing partial tasks on three slices and when the execution gap threshold is two slices.

The method continues at step 372 where the processing module selects one or more slices stored at the slower DST execution unit of the pair for transfer to the faster DST execution unit. The selecting includes determining a number of the one or more slices based on one or more of a level of unfavorable partial task execution level by the slower DST execution unit and identifying the one or more slices stored in the slower DST execution unit starting nearest a boundary between slice groupings associated with the DST execution unit pair. For example, the processing module determines the number to be one slice when a level of unfavorability is two slices and processing module identifies slice 4 stored in the slower DST execution unit as a boundary slice for transfer to the faster DST execution unit.

The method continues at step 374 where the processing module facilitates transferring the one or more slices and associated partial tasks from the slower DST execution unit to the faster DST execution unit. The facilitating includes sending a transfer request for the one of more slices to the slower DST execution unit or retrieving one or more slices from the slower DST execution unit and sending the one or more slices to the faster DST execution unit for storage therein. The method continues at step 376 where the processing module updates a directory to indicate where each slice groupings stored. For example, the processing module updates a dispersed storage task pillar mapping to indicate that the one more slices and associated tasks have been transferred from the slower DST execution unit to the faster DST execution unit. The processing module may update encoded data slices stored in still other DST execution units (e.g. that store encoded data slices) with regards to transfer of the one or more slices.

Figure 41A:
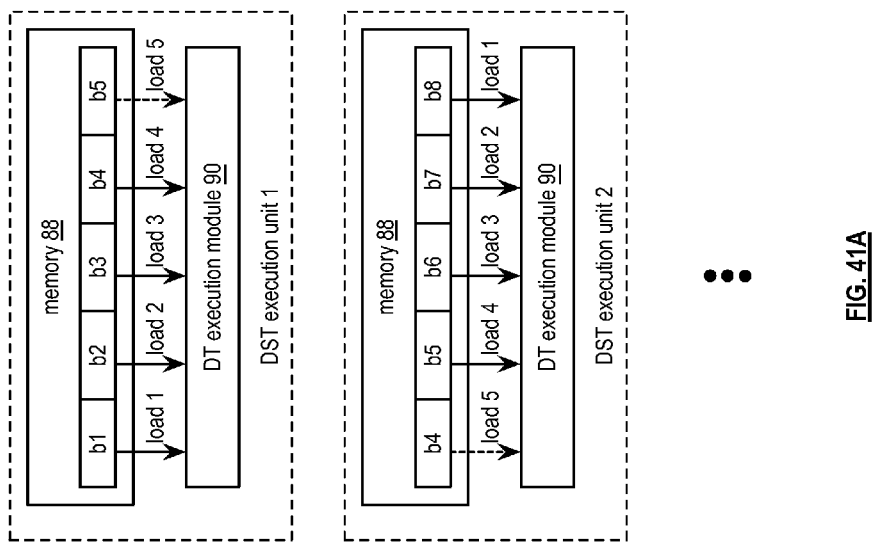
FIG. 41A is a schematic block diagram of another set of DST execution units processing slice groupings in accordance with the present invention.

FIG. 41A is a schematic block diagram of another set of DST execution units processing slice groupings. Each DST execution unit of the set of DST execution units includes a memory 88 and a distributed task (DT) execution module 90. The set of DST execution units may include a pillar width number of DST execution units utilized to store one or more sets of slices of the slice groupings. The memory 88 functions to store one or more slices of one or more slice groupings. For example, DST execution unit 1 receives slices of a first slice grouping and one more overlapping slices of a second slice grouping for storage in the memory 88 of DST execution unit 1, wherein the first slice grouping includes bytes b1-b4 as slices 1-4 and the second slice grouping includes an overlapping slice byte b5. As another example, DST execution unit 2 receives slices of the second slice grouping and one more overlapping slices of the first slice grouping for storage in the memory 88 of DST execution unit 2, wherein the second slice grouping includes bytes b5-b8 as slices 5-8 and the first slice grouping includes another overlapping slice byte b4.

Each DST execution unit receives partial tasks associated with one or more slice groupings and executes the partial tasks on the slice groupings to produce partial results. The partial tasks may include execution ordering information. The execution ordering information may include information with regards to which partial task to execute first, second, etc. and may include information with regards to which slice to process first, second, etc. For example, the DT execution module 90 of DST execution unit 1 loads b1 first to execute a partial task on b1 to produce a partial result corresponding to b1 and loads b2 second to execute a partial task on b2 to produce a partial result corresponding to b2 when the execution ordering information indicates to start with byte b1 and then process b2. As another example, the DT execution module 90 of DST execution unit 2 loads b8 first to execute a partial task on b8 to produce a partial result corresponding to b8 and loads b7 second to execute a partial task on b7 to produce a partial result corresponding to b7 when the execution ordering information indicates to start with byte b8 and then process b7.

Performance of the DST execution units with respect to execution of partial tasks on the slices may be monitored to enable reselection of a DST execution unit to execute one or more partial tasks on one or more overlapping slices associated with another DST execution unit. For example, the DT execution module 90 of DST execution unit 1 loads b4 to execute a partial task associated with b4, determines that DST execution unit 2 is slow to execute partial tasks and has not started the execution of tasks associated with b5, indicates that DST execution unit 1 will execute one or more partial tasks associated with b5, loads b5 to execute the one or more partial tasks associated with b5 to produce partial results regarding b5, and outputs the partial results regarding b5. As another example, the DT execution module 90 of DST execution unit 2 loads b5 to execute a partial task associated with b5, determines that DST execution unit 1 is slow to execute partial tasks and has not started the execution of tasks associated with b4, indicates that DST execution unit 2 will execute one or more partial tasks associated with b4, loads b4 to execute the one or more partial tasks associated with b4 to produce partial results regarding b4, and outputs the partial results regarding b4.

Figure 41B:
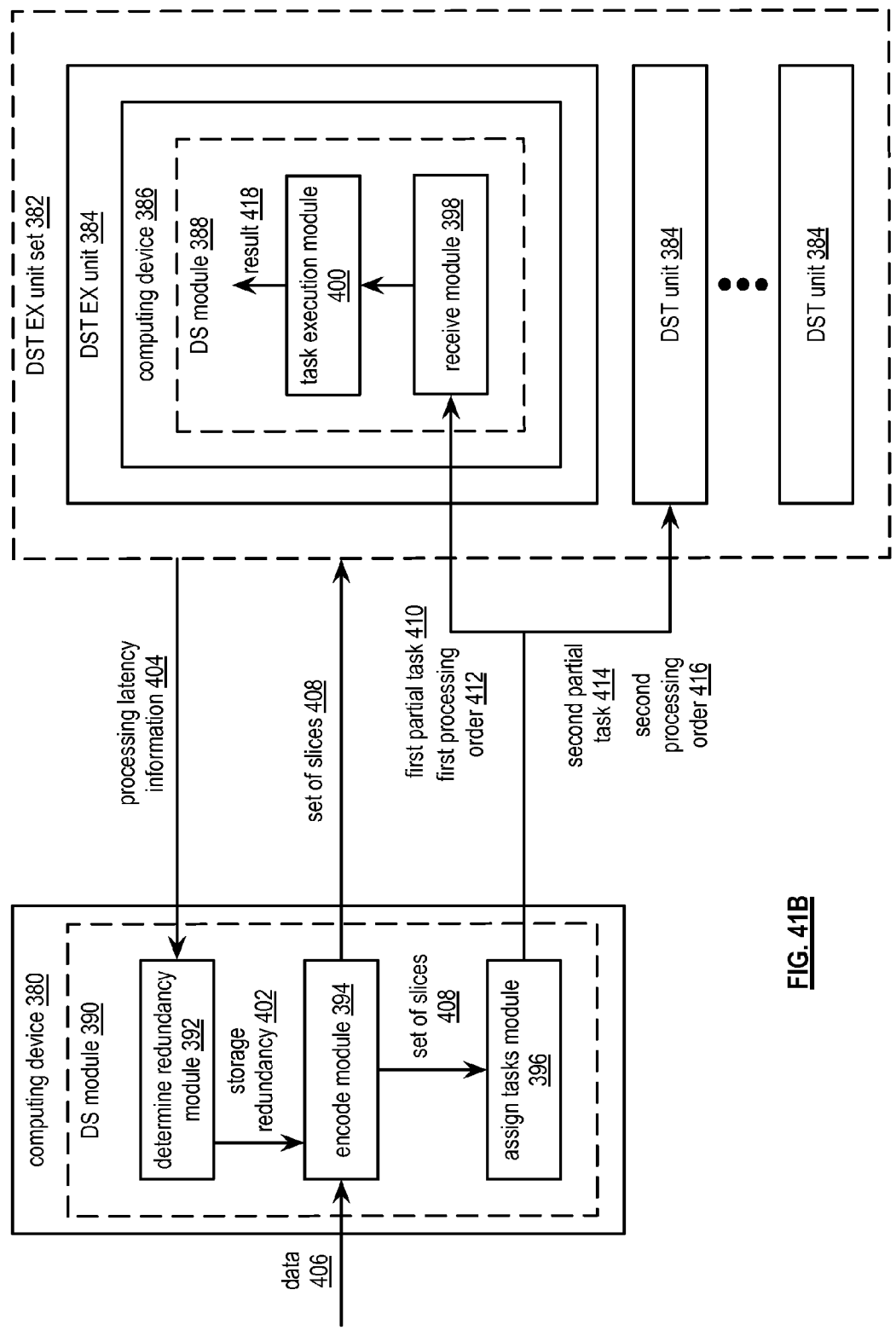
FIG. 41B is a schematic block diagram of another embodiment of a distributed computing system in accordance with the present invention.

FIG. 41B is a schematic block diagram of another embodiment of a distributed computing system that includes a computing device 380 and a distributed storage and task (DST) execution (EX) unit set 382. The DST EX unit set 382 may be implemented utilizing one or more of a dispersed storage network (DSN) memory, a distributed storage and task network (DSTN), a DSTN module, and a plurality of storage nodes. The DST execution unit set 382 includes a set of DST execution units 384. Each DST execution unit 384 may be implemented utilizing at least one of a storage server, a storage unit, a dispersed storage (DS) unit, a storage module, a memory device, a memory, a user device, a DST processing unit, a DST processing module, the computing device 380, and a computing device 386. The computing device 380 includes a dispersed storage (DS) module 390. The computing device 386 includes DS module 388. The computing devices 380 and 386 may be implemented utilizing at least one of a server, a storage unit, the DST execution unit 384, a DS unit, a storage server, a storage module, a DS processing unit, a DS unit, a user device, a DST processing unit, and a DST processing module. The DS module 390 includes a determine redundancy module 392, an encode module 394, and an assign tasks module 396. The DS module 388 includes a receive module 398 and a task execution module 400.

The DS module 390 is operable to manage distributed computing of a task by the DST execution unit set 382. The DS module 390 functions include determining data block storage redundancy 402, encoding data 406 to produce slices, and assigning tasks. The DS module 388 functions include receiving a partial task and executing the partial task. With regards to DS module 390 determining data block storage redundancy 402, the determine redundancy module 392 determines data block storage redundancy 402 among the set of DST execution units 382 based on processing latency information 404 of the set of DST execution units 382. The data block storage redundancy 402 includes at least one of a variety of indications. A first indication includes an indication of a number of encoded data blocks to include in at least one redundant encoded data block. A second indication includes an indication of which DST execution units 384 of the set of DST executions units 382 are to have overlapping redundant encoded data blocks. A third indication includes an indication as to whether a DST execution unit 384 of the set of DST execution units 382 is to have overlapping redundant encoded data blocks with multiple DST execution units 384 of the set of DST execution units 382.

The determine redundancy module 392 obtains the processing latency information 404 from at least one of the set of DST execution units 382, a lookup, a query, and initiating a test, and acquiring historical records. The processing latency information 404 of the set of DST execution units 382 includes at least one of queues for each of the set of DST execution units 382 regarding outstanding partial tasks for execution, historical processing times for each of the set of DST execution units 382 regarding processing various types of partial tasks, network connection capabilities of each of the set of DST execution units 382, processing resources of each of the set of DST execution units 382, and predicted task execution response time for each of the set of DST execution units 382.

With regards to DS module 390 encoding data 406 to produce slices, the encode module 394 dispersed storage error encodes, in accordance with the data block storage redundancy 402, a data segment of data 406 to produce a set of encoded data slices 408, where a first encoded data slice of the set of encoded data slices 408 includes the at least one redundant encoded data block in common with a second encoded data slice of the set of encoded data slices. The encode module 394 is operable to output the set of slices 408 including facilitating sending the set of slices 408 to the set of DST execution units 382 for storage therein. The encode module 394 functions to dispersed storage error encode the data segment by a series of encoding steps. A first encoding step includes the encode module 394 arranging the data segment into a data matrix of data blocks. A second encoding step includes the encode module 394 encoding the data matrix with an encoding matrix to produce an encoded matrix that includes a plurality of encoded data blocks.

A third encoding step to produce slices includes the encode module 394 creating an initial set of encoded data slices from the encoded matrix, where an encoded data slice of the set of encoded data slices 408 includes a set of encoded data blocks of the plurality of data blocks. A fourth encoding step includes the encode module 394 identifying a first encoded data block of a first initial encoded data slice of the initial set of encoded data slices. A fifth encoding step includes the encode module 394 identifying a second encoded data block of a second initial encoded data slice of the initial set of encoded data slices. A sixth encoding step includes the encode module 394 appending the second encoded data block to the first initial encoded data slice to produce the first encoded data slice. A seventh encoding step includes the encode module 394 appending the first encoded data block to the second initial encoded data slice to produce the second encoded data slice.

With regards to DS module 390 assigning tasks, the assign tasks module 396 performs a series of assignment steps. In a first assignment step, the assign tasks module 396 assigns a first partial task 410 (e.g., of the task) and a first encoded block processing order 412 to a first DST execution unit 384 of the set of DST execution units 382 regarding processing the first encoded data slice. The first encoded block processing order 412 includes prioritizing processing of other encoded data blocks of the first encoded data slice over the at least one redundant encoded data block. The first encoded block processing order 412 further includes determining whether the second DST execution unit 384 is likely to process the at least one redundant encoded data block before the first DST execution unit 384 and, when the second DST execution unit 384 is unlikely to process the at least one redundant encoded data block before the first DST execution unit 384, assuming, by the first DST execution unit 384, responsibility for performing the first partial task 410 on the at least one redundant encoded data block.

In a second assignment step, the assign tasks module 396 assigns a second partial task 414 (e.g., of the task) and a second encoded block processing order 416 to a second DST execution unit 384 of the set of DST execution units 382 regarding processing the second encoded data slice. The second encoded block processing order 416 includes prioritizing processing of other encoded data blocks of the second encoded data slice over the at least one redundant encoded data block. The second encoded block processing order 416 further includes determining whether the first DST execution unit 384 is likely to process the at least one redundant encoded data block before the second DST execution unit 384 and, when the first DST execution unit 384 is unlikely to process the at least one redundant encoded data block before the second DST execution unit 384, assuming, by the second DST execution unit 384, responsibility for performing the second partial task 414 on the at least one redundant encoded data block.

The first encoded block processing order 412 causes the first DST execution unit 384 to execute the first partial task 410 on the at least one redundant encoded data block when the processing latency of the second DST execution unit 384 is unfavorable (e.g., slower) to the processing latency of the first DST execution unit 384. The second encoded block processing order 416 causes the second DST execution unit 384 to execute the second partial task 414 on the at least one redundant encoded data block when the processing latency of the first DST execution unit 384 is unfavorable (e.g., slower) to the processing latency of the second DST execution unit.

The DS module 388 functions include receiving a partial task (e.g., the first partial task 410) and executing the partial task. With regards to the DS module 388 receiving the partial task, the receive module 398 receives an assigned partial task and an encoded block processing order (e.g., the first encoded data block processing order 412) regarding processing an encoded data slice (e.g., the first encoded data slice), where the data segment of data 406 is dispersed storage error encoded in accordance with a data block storage redundancy policy to produce the set of encoded data slices 408. The first encoded data slice includes the at least one redundant encoded data block in common with another encoded data slice of the set of encoded data slices. The data block storage redundancy policy includes at least one of a variety of indicators. A first indicator includes an indication of a number of encoded data blocks to include in the at least one redundant encoded data block. A second indicator includes an indication of which DST execution units 384 of the set of DST executions units 382 are to have overlapping redundant encoded data blocks. A third indicator includes an indication as to whether a DST execution unit 384 of the set of DST execution units 382 is to have overlapping redundant encoded data blocks with multiple DST execution units 384 of the set of DST execution units 382.

With regards to the DS module 388 executing the partial task, the task execution module 400 performs a series of execution steps. In a first execution step, the task execution module 400 commences execution of the assigned partial task on encoded data blocks of the encoded data slice in accordance with the encoded block processing order to produce a result 418. The execution in accordance with the encoded block processing order includes prioritizing, by the task execution module 400, processing of other encoded data blocks of the first encoded data slice over the at least one redundant encoded data block. The execution in accordance with encoded block processing order further includes determining, by the task execution module 400, whether another DST execution unit 384 is likely to process the at least one redundant encoded data block before the DST execution unit 384 and, when the other DST execution unit 384 is unlikely to process the at least one redundant encoded data block before the DST execution unit 384, assuming, by the DST execution unit 384, responsibility for performing the partial task on the at least one redundant encoded data block.

In a second execution step of the series of execution steps, the task execution module 400 executes the partial task on the at least one redundant encoded data block when latency of processing the other encoded data slice is unfavorable (e.g. slower) to latency of processing the encoded data slice. The latency of processing the encoded data slice and of the other encoded data slice includes at least one of processing queues for first and second DST execution units regarding outstanding partial tasks for execution, where the first DST execution unit 384 receives the encoded data slice and the second DST execution unit 384 receives the other encoded data slice, historical processing times for each of the first and second execution units regarding processing various types of partial tasks, network connection capabilities of each of the first and second DST execution units, processing resources of each of the first and second DST execution units, and predicted task execution response time for each of the first and second DST execution units. Alternatively, in the second execution step, the task execution module 400 skips execution of the partial task on the at least one redundant encoded data block when the latency of processing the other encoded data slice is favorable to the latency of processing the encoded data slice.

FIG. 41C is a flowchart illustrating an example of executing redundant tasks. The method begins at step 420 where a processing module (e.g., of a computer to manage distributed computing of a task) determines data block storage redundancy among a set of distributed storage and task (DST) execution units based on processing latency information of the set of DST execution units. The data block storage redundancy includes at least one of a variety of indicators. A first indicator includes an indication of a number of encoded data blocks to include in at least one redundant encoded data block. A second indicator includes an indication of which DST execution units of the set of DST executions units are to have overlapping redundant encoded data blocks. A third indicator includes an indication as to whether a DST execution unit of the set of DST execution units is to have overlapping redundant encoded data blocks with multiple DST execution units of the set of DST execution units. The processing latency information of the set of DST execution units includes at least one of queues for each of the set of DST execution units regarding outstanding partial tasks for execution, historical processing times for each of the set of DST execution units regarding processing various types of partial tasks, network connection capabilities of each of the set of DST execution units, processing resources of each of the set of DST execution units, and predicted task execution response time for each of the set of DST execution units.

The method continues at step 422 where the processing module dispersed storage error encodes, in accordance with the data block storage redundancy, a data segment of data to produce a set of encoded data slices, where a first encoded data slice of the set of encoded data slices includes the at least one redundant encoded data block in common with a second encoded data slice of the set of encoded data slices. The dispersed storage error encoding the data segment includes a series of encoding steps. A first encoding step includes arranging the data segment into a data matrix of data blocks. A second encoding step includes encoding the data matrix with an encoding matrix to produce an encoded matrix that includes a plurality of encoded data blocks. A third encoding step includes creating an initial set of encoded data slices from the encoded matrix, where an encoded data slice of the set of encoded data slices includes a set of encoded data blocks of the plurality of data blocks. A fourth encoding step includes identifying a first encoded data block of a first initial encoded data slice of the initial set of encoded data slices. A fifth encoding step includes identifying a second encoded data block of a second initial encoded data slice of the initial set of encoded data slices. A sixth encoding step includes appending the second encoded data block to the first initial encoded data slice to produce the first encoded data slice. A seventh encoding step includes appending the first encoded data block to the second initial encoded data slice to produce the second encoded data slice.

The method continues at step 424 where the processing module assigns a first partial task and a first encoded block processing order to a first DST execution unit of the set of DST execution units regarding processing the first encoded data slice. The first encoded block processing order includes prioritizing processing of other encoded data blocks of the first encoded data slice over the at least one redundant encoded data block. The first encoded block processing order further includes determining whether the second DST execution unit is likely to process the at least one redundant encoded data block before the first DST execution unit and, when the second DST execution unit is unlikely to process the at least one redundant encoded data block before the first DST execution unit, assuming, by the first DST execution unit, responsibility for performing the first partial task on the at least one redundant encoded data block.

The method continues at step 426 where the processing module assigns a second partial task and a second encoded block processing order to a second DST execution unit of the set of DST execution units regarding processing the second encoded data slice. The first encoded block processing order causes the first DST execution unit to execute the first partial task on the at least one redundant encoded data block when the processing latency of the second DST execution unit is unfavorable to the processing latency of the first DST execution unit. The second encoded block processing order causes the second DST execution unit to execute the second partial task on the at least one redundant encoded data block when the processing latency of the first DST execution unit is unfavorable to the processing latency of the second DST execution unit. The second encoded block processing order includes prioritizing processing of other encoded data blocks of the second encoded data slice over the at least one redundant encoded data block. The second encoded block processing order further includes determining whether the first DST execution unit is likely to process the at least one redundant encoded data block before the second DST execution unit and, when the first DST execution unit is unlikely to process the at least one redundant encoded data block before the second DST execution unit, assuming, by the second DST execution unit, responsibility for performing the second partial task on the at least one redundant encoded data block.

FIG. 41D is a flowchart illustrating an example of executing redundant tasks. The method begins at step 428 where a processing module (e.g., of a distributed storage and task (DST) execution unit) receives an assigned partial task and an encoded block processing order regarding processing an encoded data slice, where a data segment of data is dispersed storage error encoded in accordance with a data block storage redundancy policy to produce a set of encoded data slices. The dispersed storage error encoding the data segment includes a series of encoding steps. A first encoding step includes arranging the data segment into a data matrix of data blocks. A second encoding step includes encoding the data matrix with an encoding matrix to produce an encoded matrix that includes a plurality of encoded data blocks. A third encoding step includes creating an initial set of encoded data slices from the encoded matrix, where one of the set of encoded data slices includes a set of encoded data blocks of the plurality of data blocks. A fourth encoding step includes identifying a first encoded data block of a first initial encoded data slice of the initial set of encoded data slices. A fifth encoding step includes identifying a second encoded data block of a second initial encoded data slice of the initial set of encoded data slices. A sixth encoding step includes appending the second encoded data block to the first initial encoded data slice to produce the encoded data slice. A seventh encoding step includes appending the first encoded data block to the second initial encoded data slice to produce the other encoded data slice.

The encoded data slice includes at least one redundant encoded data block in common with another encoded data slice of the set of encoded data slices. The data block storage redundancy policy includes at least one of a variety of indicators. A first indicator includes an indication of a number of encoded data blocks to include in the at least one redundant encoded data block. A second indicator includes an indication of which DST execution units of a set of DST executions units are to have overlapping redundant encoded data blocks. A third indicator includes an indication as to whether a DST execution unit of the set of DST execution units is to have overlapping redundant encoded data blocks with multiple DST execution units of the set of DST execution units.

The method continues at step 430 where the processing module commences execution of the assigned partial task on encoded data blocks of the encoded data slice in accordance with the encoded block processing order. The encoded block processing order includes prioritizing, by the processing module, processing of other encoded data blocks of the first encoded data slice over the at least one redundant encoded data block. The encoded block processing order further includes determining, by the processing module, whether another DST execution unit is likely to process the at least one redundant encoded data block before the DST execution unit and, when the other DST execution unit is unlikely to process the at least one redundant encoded data block before the DST execution unit, assuming, by the DST execution unit, responsibility for performing the partial task on the at least one redundant encoded data block.

The method continues at step 432 where the processing module executes the partial task on the at least one redundant encoded data block when latency of processing the other encoded data slice is unfavorable to latency of processing the encoded data slice. The latency of processing the encoded data slice and of the other encoded data slice includes at least one of processing queues for first and second DST execution units regarding outstanding partial tasks for execution, where the first DST execution unit receives the encoded data slice and the second DST execution unit receives the other encoded data slice, historical processing times for each of the first and second execution units regarding processing various types of partial tasks, network connection capabilities of each of the first and second DST execution units, processing resources of each of the first and second DST execution units, and predicted task execution response time for each of the first and second DST execution units. The method continues at step 434 where the processing module skips execution of the partial task on the at least one redundant encoded data block when the latency of processing the other encoded data slice is favorable to the latency of processing the encoded data slice.

Figure 42A:
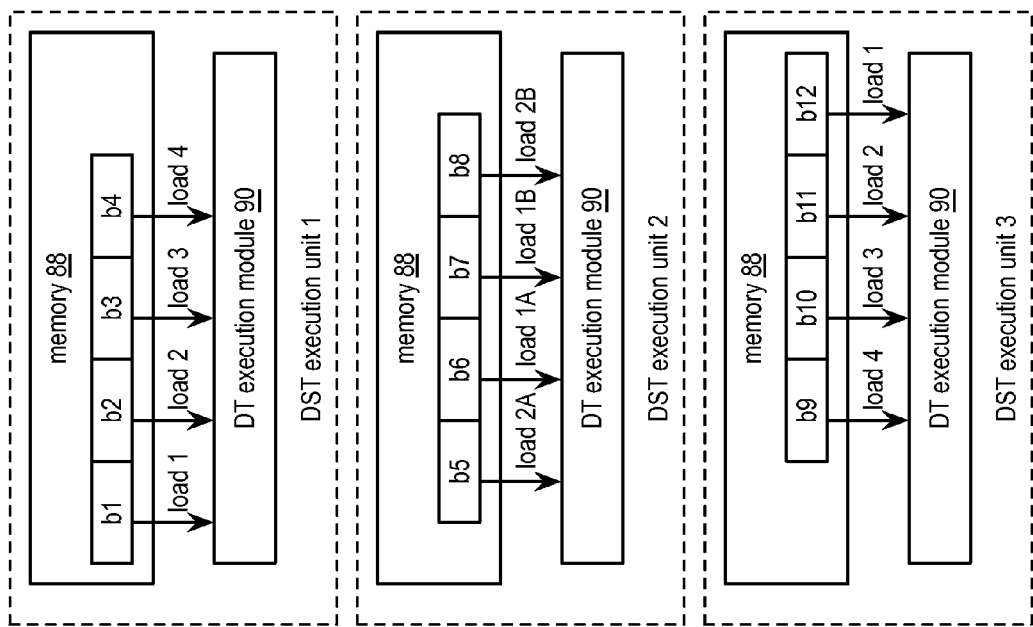
FIG. 42A is a schematic block diagram of another set of DST execution units processing slice groupings in accordance with the present invention.

FIG. 42A is a schematic block diagram of another set of distributed storage and task (DST) execution units processing slice groupings. Each DST execution unit of the set of DST execution units includes a memory 88 and a distributed task (DT) execution module 90. The set of DST execution units may include a pillar width number of DST execution units utilized to store one or more sets of a pillar width number of slices of the slice groupings. The memory 88 functions to store one or more slices of one or more slice groupings. For example, DST execution unit 1 receives slices of a first slice grouping for storage in memory 88 of DST execution unit 1, where the first slice grouping includes bytes b1-b4 as slices 1-4. As another example, DST execution unit 2 receives slices of a second slice grouping for storage in memory 88 of DST execution unit 2, where the second slice grouping includes bytes b5-b8 as slices 5-8. As yet another example, DST execution unit 3 receives slices of a third slice grouping for storage in memory 88 of DST execution unit 3, wherein the third slice grouping includes bytes b9-b12 as slices 9-12.

Each DST execution unit receives partial tasks associated with one or more slice groupings and executes the partial tasks on the slice groupings to produce partial results. The partial tasks may include execution ordering information. The execution ordering information may include information with regards to which one or more partial tasks to execute first, second, etc. and may include information with regards to which one or more slices to process first, second, etc. For example, the DT execution module 90 of DST execution unit 1 loads b1 first to execute a partial task on b1 to produce a partial result corresponding to b1 and loads b2 second to execute a partial task on b2 to produce a partial result corresponding to b2 when the execution ordering information indicates to start with byte b1 and then process b2. As another example, the DT execution module 90 of DST execution unit 3 loads b12 first to execute a partial task on b12 to produce a partial result corresponding to b12 and loads b11 second to execute a partial task on b11 to produce a partial result corresponding to 11 when the execution ordering information indicates to start with byte b12 and then process b11 etc. As yet another example, the DT execution module 90 of DST execution unit 2 loads slices b6 an b7 substantially simultaneously first to execute partial tasks on b6 and b7 to produce partial results corresponding to b6 and b7 and loads slices b5 an b8 second to execute partial tasks on b5 and b8 to produce partial results corresponding to b5 and b8.

Performance of the DST execution units with respect to execution of partial tasks on the slices may be monitored to enable reselection of a DST execution unit to execute one or more partial tasks on one or more boundary slices associated with another DST execution unit. For example, the DT execution module 90 of DST execution unit 2 loads b8 to execute the partial task associated with b8, determines that DST execution unit 3 is slow to execute partial tasks and has not started the execution of tasks associated with b9, indicates that DST execution unit 2 will execute one or more partial tasks associated with b9, obtains b9 to execute the one or more partial tasks associated with b9 to produce partial results regarding b9, and outputs the partial results regarding b9. As another example, the DT execution module 90 of DST execution unit 2 loads b5 to execute a partial task associated with b5, determines that DST execution unit 1 is slow to execute partial tasks and has not started the execution of tasks associated with b4, indicates that DST execution unit 2 will execute one or more partial tasks associated with b4, obtains b4 to execute the one or more partial tasks associated with b4 to produce partial results regarding b4, and outputs the partial results regarding b4.

Figure 42B:
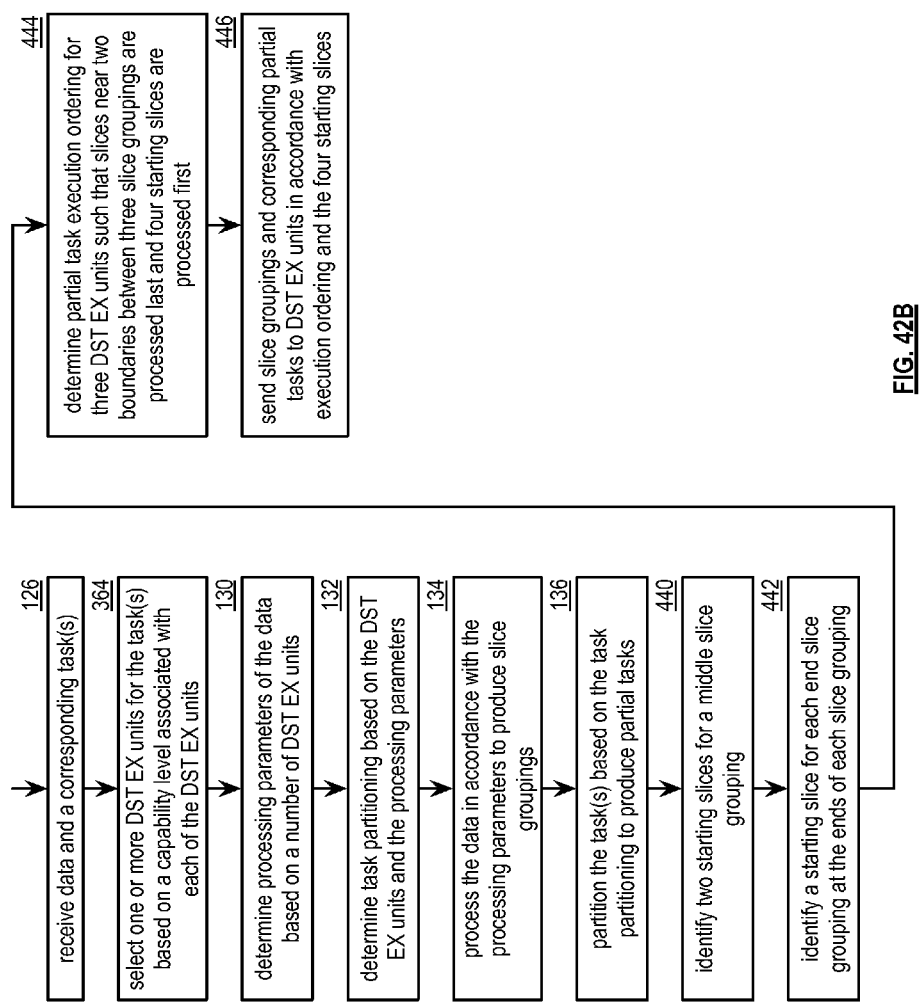
FIG. 42B is a flowchart illustrating another example of generating a slice grouping in accordance with the present invention.

FIG. 42B is a flowchart illustrating another example of generating a slice grouping, which include similar steps to FIGS. 5 and 40C. The method begins with step 126 of FIG. 5 where a processing module (e.g., of a distributed storage and task (DST) client module) receives data and a corresponding task. The method continues with step 364 of FIG. 40C where the processing module selects one or more DST execution units for the task based on a capability level associated with each of the DST execution units. The method continues with steps 130-136 of FIG. 5 where the processing module determines processing parameters of the data based on a number of DST execution units, determines task partitioning based on the DST execution units (e.g., capabilities) and the processing parameters, processes the data in accordance with the processing parameters to produce slice groupings, and partitions the task based on the task partitioning to produce partial tasks.

The method continues at step 440 where the processing module identifies two starting slices of a middle slice grouping of three adjacent slice groupings. The identifying includes one or more of selecting three DST execution units corresponding to the three adjacent slice groupings and selecting the two starting slices from the middle slice grouping associated with three DST execution units. The selecting of the three DST execution units includes one or more of identifying three DST execution units assigned to adjacent slice groupings, a lookup, and a DST execution unit capability level indicator. The selecting for two starting slices may be based on one or more of a predetermination, the capability levels associated with one or more of the three DST execution units, performance levels associated with one or more of the three DST execution units, a task loading level associated with one or more of the three DST execution units, a lookup, and a message. For example, the processing module selects slices 6 and 7 as the starting slices when the little slice grouping includes slices 5-8.

The method continues at step 442 where the processing module identifies a starting slice for each end slice grouping at the ends of each and slice grouping. For example, the processing module identifies slice 1 of a first slice grouping as a starting slice for the first slice grouping and the processing module identifies slice 12 of a third slice grouping as a starting slice for the third slice grouping. The method continues at step 444 where the processing module determines partial task execution ordering for the three DST execution units such that slices near two boundaries between the three slice groupings are processed last and four starting slices are processed first. For example, processing module determines partial task execution ordering to execute partial tasks in order on slices 1, 2, 3, and 4 by a first DST execution unit, to execute partial tasks in order on slices 12, 11, 10, and 9 by a third DST execution unit, and to execute partial tasks in order on slices 6 and 7, and then 5 and 8 by a second DST execution unit.

The method continues at step 446 where the processing module sends the slice groupings and corresponding partial tasks to the selected DST execution units in accordance with the task execution ordering and the four starting slices. For example, the processing module sends slice 1 to the first DST execution unit followed by sending slice 2 to the first DST execution etc. through slice 4. As another example, the processing module sends slice 12 to the third DST execution unit followed by sending slice 11 to the third DST execution unit etc. through slice 9. As yet another example, the processing module sends slice 6 to the second DST execution unit followed by sending slice 7 to the second DST execution unit followed by sending slice 5 to the second DST execution unit followed by sending slice 8 to the second DST execution unit.

Figure 43A:
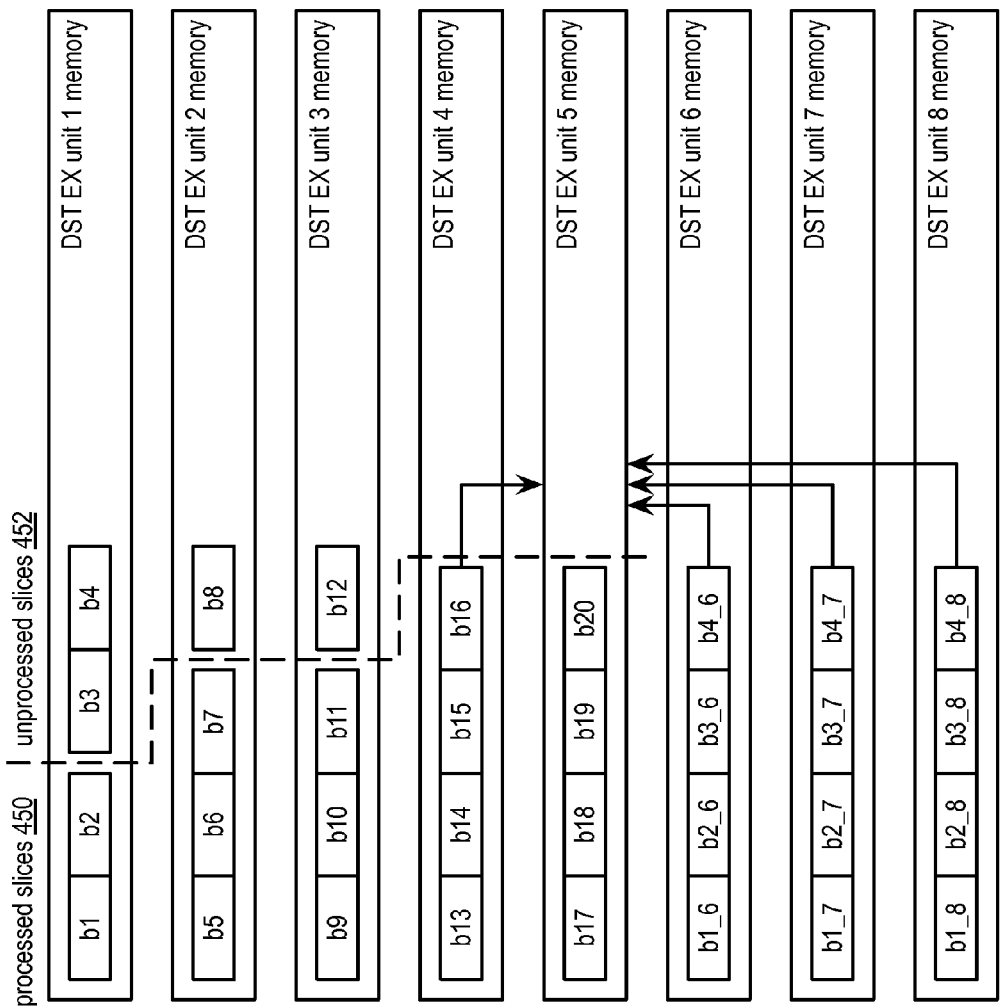
FIG. 43A is a schematic block diagram of a set of DST execution unit memories in accordance with the present invention.

FIG. 43A is a schematic block diagram of a set of distributed storage and task (DST) execution unit memories 1-8. Each DST execution unit memory of the set of DST execution units memories 1-8 is associated with a corresponding DST execution unit of a pillar width number of DST execution units that includes at least a decode threshold number of distributed task (DT) execution modules. Each DT execution module functions to execute one or more partial tasks that correspond to one or more data slices stored in a corresponding DST execution unit memory of the set of DST execution unit memories 1-8. For example, a first DT execution module of a DST execution unit 1 executes partial tasks associated with slices b1-b4 stored in DST execution unit 1 memory, a second DT execution module of a DST execution unit 2 executes partial tasks associated with slices b5-b8 stored in DST execution unit 2 memory etc. As such, DST execution units 1-5 memories store a decode threshold number of slice groupings for execution of partial tasks and DST execution units 6-8 store encoded data slices (e.g., slices b1_6 through b4_6 in DST execution unit 6 memory, slices b1_7 through b4_7 in DST execution unit 7 memory,) slices b1_8 through b4_8 in DST execution unit 8 memory) of remaining slices of a pillar width number of slices when the decode threshold number is 5 and the pillar width number is 8.

The DT execution modules may execute one or more corresponding partial tasks on slices of a corresponding DST execution unit memory at varying rates of execution such that one DT execution module may substantially finish execution of partial tasks assigned to the DT execution module ahead of other DT execution modules. For example, at time t1 processed slices 450 includes slices b1 and b2 that result from execution of partial tasks by a DT execution module associated with the DST execution unit 1 memory, a DT execution module associated with DST execution unit 2 memory has completed execution of partial tasks associated with slices b5, b6, and b7, a DT execution module associated with DST execution unit 3 memory has completed execution of partial tasks associated with slices b9, b10, and b11, a DT execution module associated with DST execution unit 4 memory has completed execution of partial tasks associated with slices b13-b16, and a DT execution module associated with DST execution unit 5 memory has completed execution of partial tasks associated with slices b17-b20. In such an example, unprocessed slices 452 that remain to be processed includes slices b3 and b4 that are associated with the DST execution unit 1 memory, slice b8 associated with the DST execution unit 2 memory, slice b12 associated with the DST execution unit 3 memory, and no slices remain to be processed associated with DST execution unit 4 memory and DST execution unit 5 memory.

Processing of unprocessed slices 452 with respect to execution of partial tasks on the slices may be monitored to enable reselection of a DT execution module (e.g., a favorably executing DT execution module) to execute one or more partial tasks on one or more unprocessed slices 452 associated with an unfavorably executing DT execution module. For example, a DT execution module 5 associated with DST execution unit 5 memory obtains unprocessed slice b4 for processing by executing partial tasks associated with unprocessed slice b4 (e.g., rather than waiting for a DT execution module associated with the DST execution unit 1 memory to execute the partial tasks associated with slice b4). In the example, DT execution module 5 may obtain the unprocessed slice b4 by rebuilding unprocessed slice b4 based on obtaining at least a decode threshold number of partial slices associated with unprocessed slice b4 from at least a decode threshold number of DST execution units (e.g., rather than burdening DST execution unit 1 with transferring slice b4). For instance, DT execution module 5 obtains the decode threshold number of partial slices from DST execution units 4, 5, 6, 7, and 8, decodes the decode threshold number of partial slices to reproduce unprocessed slice b4, executes the partial tasks associated with unprocessed slice b4 to produce partial results with regards to slice b4, and outputs the partial results with regards to slice b4.

Figure 43B:
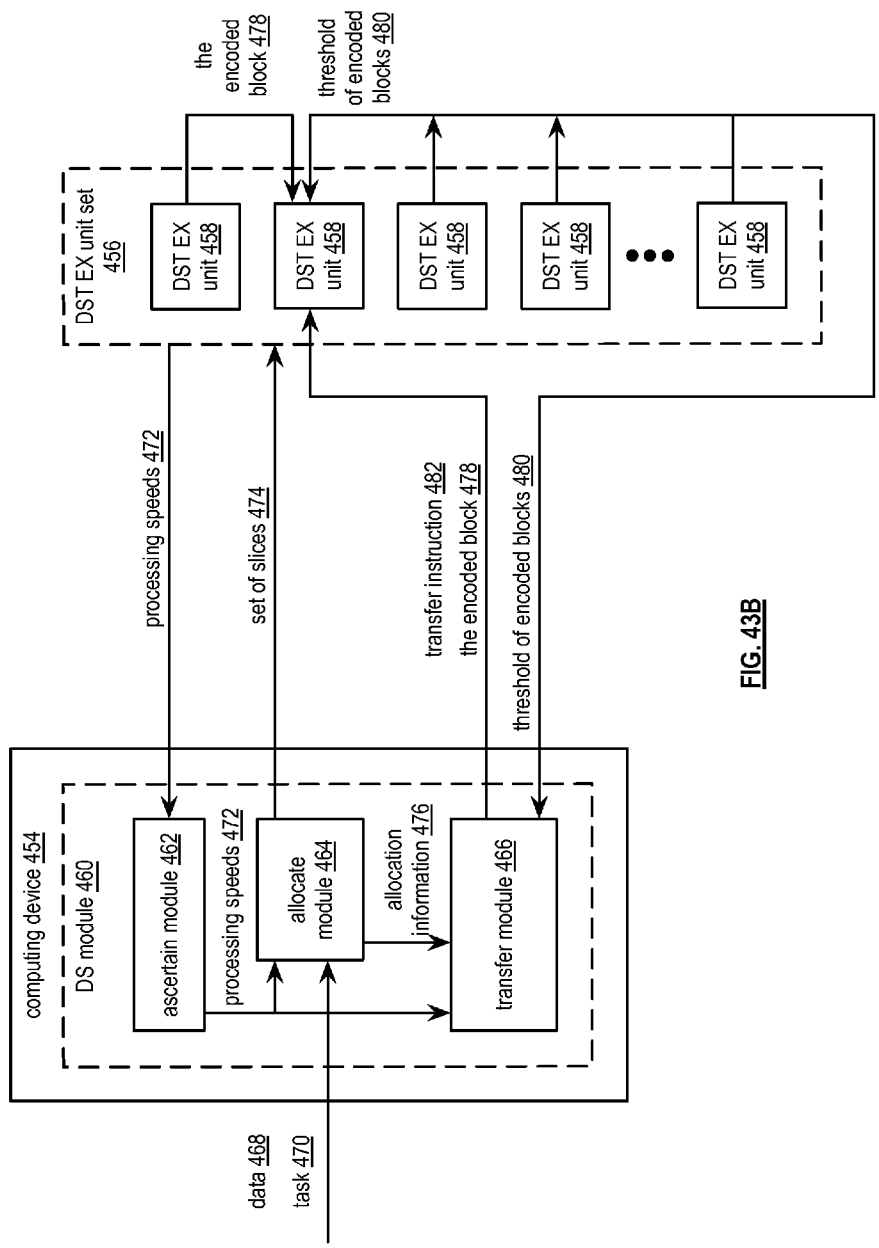
FIG. 43B is a schematic block diagram of another embodiment of a distributed computing system in accordance with the present invention.

FIG. 43B is a schematic block diagram of another embodiment of a distributed computing system that includes a computing device 454 and a distributed storage and task (DST) execution (EX) unit set 456. The DST EX unit set 456 may be implemented utilizing one or more of a dispersed storage network (DSN) memory, a distributed storage and task network (DSTN), a DSTN module, and a plurality of storage nodes. The DST execution unit set 456 includes a set of DST execution units 458. Each DST execution unit 458 may be implemented utilizing at least one of a storage server, a storage unit, a dispersed storage (DS) unit, a storage module, a memory device, a memory, a user device, a DST processing unit, a DST processing module, and the computing device 454. The computing device 454 includes a dispersed storage (DS) module 460. The computing device 454 may be implemented utilizing at least one of a computer, a server, a storage unit, the DST execution unit 458, a DS unit, a storage server, a storage module, a DS processing unit, a DS unit, a user device, a DST processing unit, and a DST processing module. The DS module 460 includes an ascertain module 462, an allocate module 464, and a transfer module 466.

The DS module 460 is operable to manage distributed computing of a task 470 by the DST execution unit set 456 on data 468. The DS module 460 functions include ascertaining processing speeds, allocating performance of the task, and transferring processing responsibilities. With regards to the DS module 460 ascertaining processing speeds, the ascertain module 462 ascertains processing speeds 472 of the DST execution units 458 of the set of DST execution units 456 performing like tasks (e.g., similar to the task 470, the task 470) on like data 468 (e.g., similar to the data 468, a portion of the data 468). The ascertain module 462 functions to ascertain processing speeds 472 by at least one of determining a number of encoded blocks processed in a given time frame on a per DST execution unit basis and determining, on the per DST execution unit basis, a speed at which an encoded block for a given task is processed. For example, the ascertain module 464 receives processing speeds 472 from each DST execution unit 458 of the DST execution unit set 456.

With regards to the DS module 460 allocating performance of the task 470, the allocate module 464 allocates performance of the task 470 on a sub-set of data-based data slices to a sub-set of the set of DST execution units 456, where a first DST execution unit 458 of the sub-set of DST execution units is allocated to perform a first partial task of the task 470 on a first data-based data slice of the sub-set of data-based data slices on an encoded block by encoded block basis. The allocation performance may be based on one or more of a DST execution unit capability level, a DST execution unit availability level, a DST execution unit processing speed 472, utilization of a round-robin approach, and using a predetermined mapping. The allocate module 464 may provide allocation information 476 to indicate partial task allocation.

The set of DST execution units 456 receives a set of encoded data slices 474 that includes the sub-set of data-based data slices and a sub-set of redundancy-based data slices. For example, the allocate module 464 generates the set of encoded data slices 474 and outputs the set of encoded data slices 474 to the DST execution unit set 456. For instance, the allocate module 464 outputs the sub-set of data-based data slices to the sub-set of the set of DST execution units 456 that includes a first through a fifth DST execution unit 458 and outputs the sub-set of redundancy-based data slices to a remaining sixth through an eighth DST execution unit 458 when a decode threshold number is five and a pillar width is eight.

The allocate module 464 is further operable to encode the set of encoded data slices 474 by a series of encoding steps. In a first encoding step, the allocate module 464 converts a data segment of the data 468 into a data matrix that includes a plurality of data blocks. In a second encoding step, the allocate module 464 encodes the data matrix with an encoding matrix to produce encoded blocks that includes a plurality of data-based data blocks and a plurality of redundancy-based data blocks. In a third encoding step, the allocate module 464 arranges the plurality of data-based data blocks into the sub-set of data-based data slices. In a fourth encoding step, the allocate module 464 arranges the plurality of redundancy-based data blocks into the sub-set of redundancy-based data slices.

With regards to the DS module 460 transferring processing responsibilities, when, based on the ascertained processing speeds 472, a second DST execution unit 458 of the set of DST execution units 456 has a processing speed that is a threshold speed greater than a processing speed 472 of the first DST execution unit 458, the transfer module 466 performs a series of transferring steps. For instance, the second DST execution unit 458 has completed execution of all assigned partial tasks ahead of the first DST execution unit 458. The second DST execution unit 458 is within the sub-set of the set of DST execution units or the second DST execution unit 458 is a DST execution unit of the set of DST execution units 456 storing one of the sub-set of redundancy-based data slices. The transfer module 466 functions to determine that the second DST execution unit 458 has the processing speed that is the threshold speed greater than the processing speed of the first DST execution unit 458 by determining that the second DST execution 458 can complete performance of the second partial task on the second partial task on encoded blocks of a second data-based data slice of the sub-set of data-based data slices and on the on the at least one encoded block before the first DST execution 458 can commence performing the first partial task on the at least one encoded block.

In a first transferring step of the series of transferring steps, the transfer module 466 identifies at least one encoded block 478 of the first data-based data slice for transferring processing responsibilities from the first DST execution unit 458 to the second DST execution unit 458. The transfer module 466 functions to identify the at least one encoded block 478 by, after the second DST execution 458 has completed performance of the second partial task on encoded blocks of a second data-based data slice of the sub-set of data-based data slices, determining how many potentially transferred encoded blocks the second DST execution unit 458 can complete performance of the second partial task on before the first DST execution 458 can commence performing the first partial task on the potentially transferred encoded blocks.

In a second transferring step, the transfer module 466 facilitates obtaining the at least one encoded block 478 by the second DST execution unit 458 and performing, by the second DST execution unit 458, a second partial task (e.g., may include the first partial task) of the task 470 on the at least one encoded block 478. The transfer module 466 functions to facilitate the obtaining of the at least one encoded block 478 by a series of decoding steps. A first decoding step includes the transfer module 466 retrieving a threshold number of encoded blocks 480 of an encoded matrix (e.g., from a decode threshold number of DST execution units 458). A second decoding step includes the transfer module 466 rebuilding a grouping of data blocks of a data matrix from the threshold number of encoded data blocks 480. A third decoding step includes the transfer module 466 dispersed storage error encoding the grouping of data blocks of the data matrix to produce a partial rebuilt first data-based data slice. A fourth decoding step includes the transfer module 466 selecting the at least one encoded block 478 from the partial rebuild first data-based data slice. In addition, the transfer module outputs the at least one encoded block 478 to the second DST execution unit 458.

Alternatively, the transfer module 466 instructs the second DST execution unit 458 to execute the decoding steps by outputting a transfer instruction 482 to the second DST execution unit 458 (e.g., transfer instruction includes identification of the threshold number of DST execution units 458). The transfer module 466 further functions to facilitate the obtaining of the at least one encoded block 478 by instructing the second DST execution unit to send, by the second DST execution unit 458, a request to the first DST execution unit 458 for the at least one encoded block 478 and receive, in response to the request, the at least one encoded block 478 from the first DST execution unit 458. For example, the transfer module 466 determines that the first DST execution unit 458 has sufficient processing capability to output the at least one encoded block 478 and the transfer module 466 outputs a transfer instruction 42 that includes instructions for the first DST execution unit 458 to obtain the at least one encoded block 478 directly from the first DST execution unit 458.

The transfer module 466 further functions to, when, based on the ascertained processing speeds 472, a third DST execution unit 458 of the set of DST execution units 456 has a processing speed 472 that is the threshold speed greater than the processing speed of the first DST execution unit 458, identify at least two encoded blocks of the first data-based data slice for transferring processing responsibilities from the first DST execution unit 458 to the second DST execution unit 458 and to the third DST execution unit 458 and to facilitate operations of the second and third DST execution units. The operations of the second and third DST execution units includes obtaining a first one of the at least two encoded blocks by the second DST execution unit 458, obtaining a second one of the at least two encoded blocks by the third DST execution unit 458, performing, by the second DST execution unit 458, the second partial task on the first one of the at least two encoded blocks, and performing, by the third DST execution unit 458, a third partial task (e.g., may be the same as the first partial task) of the task 470 on the second one of the at least two encoded blocks.

Figure 43C:
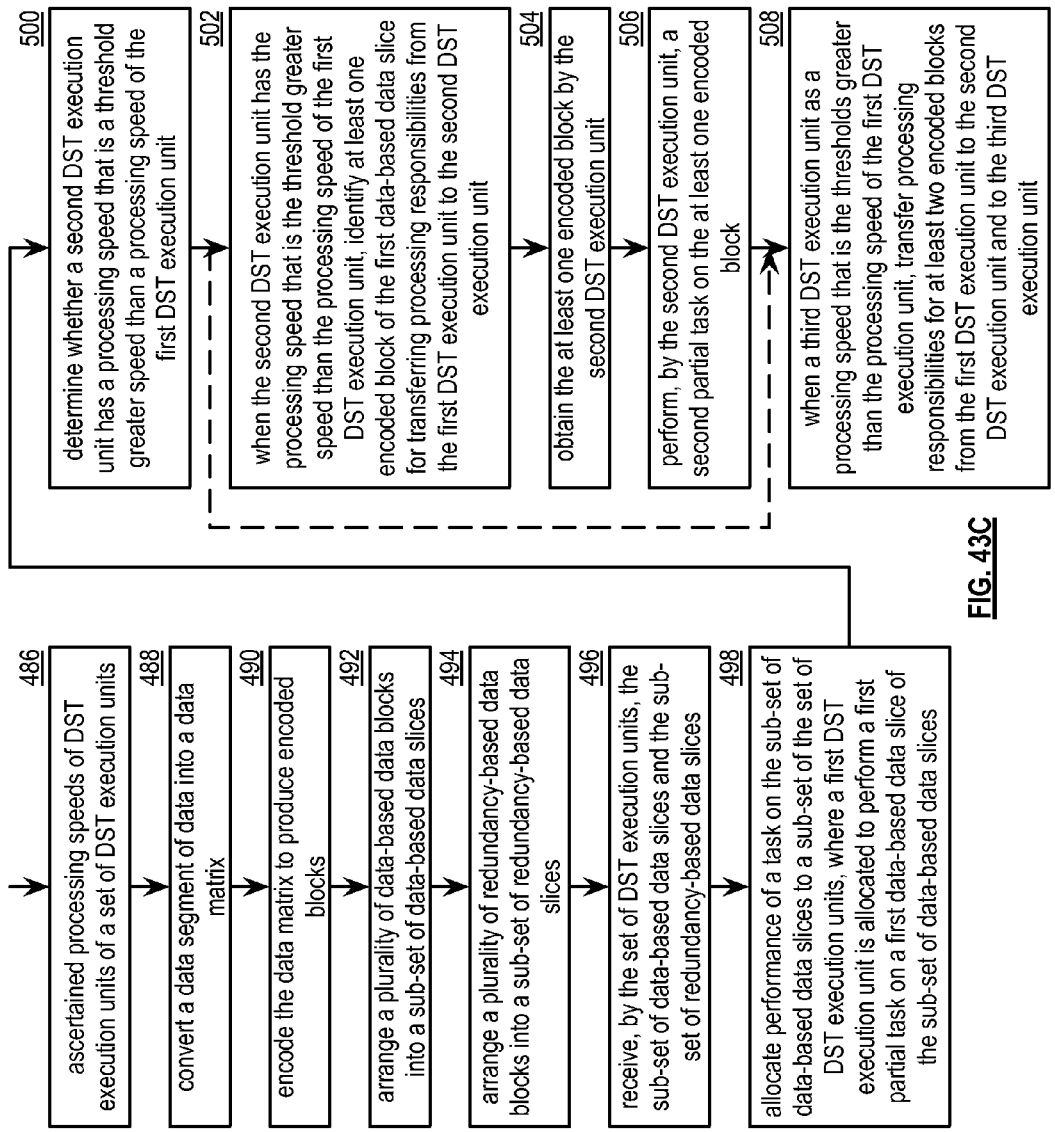
FIG. 43C is a flowchart illustrating another example of processing a slice grouping in accordance with the present invention.

FIG. 43C is a flowchart illustrating another example of processing a slice grouping. The method begins at step 486 where a processing module (e.g., a computer to manage distributed computing of a task on data) ascertains processing speeds of distributed storage and task (DST) execution units of a set of DST execution units performing like tasks on like data. The ascertaining processing speeds includes at least one of determining a number of encoded blocks processed in a given time frame on a per DST execution unit basis and determining, on the per DST execution unit basis, a speed at which an encoded block for a given task is processed. The method continues at step 488 where the processing module converts a data segment of the data into a data matrix that includes a plurality of data blocks. The method continues at step 490 where the processing module encodes the data matrix with an encoding matrix to produce encoded blocks that includes a plurality of data-based data blocks and a plurality of redundancy-based data blocks. The method continues at step 492 where the processing module arranges the plurality of data-based data blocks into the sub-set of data-based data slices. The method continues at step 494 where the processing module arranges the plurality of redundancy-based data blocks into the sub-set of redundancy-based data slices. In addition, the processing module may output the sub-set of data-based data slices and the sub-set of redundancy-based data slices to the set of DST execution units. The method continues at step 496 where the set of DST execution units receives a set of encoded data slices that includes the sub-set of data-based data slices and the sub-set of redundancy-based data slices.

The method continues at step 498 where the processing module allocates performance of the task on the sub-set of data-based data slices to a sub-set of the set of DST execution units, where a first DST execution unit of the sub-set of DST execution units is allocated to perform a first partial task of the task on a first data-based data slice of the sub-set of data-based data slices on an encoded block by encoded block basis. The method continues at step 500 where the processing module determines whether a second DST execution unit has a processing speed that is a threshold speed greater than a processing speed of the first DST execution unit by determining that the second DST execution can complete performance of the second partial task on the second partial task on encoded blocks of a second data-based data slice of the sub-set of data-based data slices and on the at least one encoded block before the first DST execution can commence performing the first partial task on the at least one encoded block. The second DST execution unit is within the sub-set of the set DST execution units or the second DST execution unit is a DST execution unit of the set of DST execution units storing one of the sub-set of redundancy-based data slices. Alternatively, the method branches to step 508 to identify a third DST execution unit to assist in the execution of the task. For example, the processing module determines to utilize the third DST execution unit when the processing speed of the second DST execution unit is less than an upper threshold greater than the processing speed of the first DST execution unit (e.g., more help required).

When, based on the ascertained processing speeds, the second DST execution unit of the set of DST execution units has the processing speed that is the threshold speed greater than the processing speed of the first DST execution unit, the method continues at step 502 where the processing module identifies at least one encoded block of the first data-based data slice for transferring processing responsibilities from the first DST execution unit to the second DST execution unit.

The identifying the at least one encoded block includes, after the second DST execution has completed performance of the second partial task on encoded blocks of a second data-based data slice of the sub-set of data-based data slices, determining how many potentially transferred encoded blocks the second DST execution unit can complete performance on the second partial task before the first DST execution can commence performing the first partial task on the potentially transferred encoded blocks.

The method continues at step 504 where the second DST execution unit obtains the at least one encoded block. The obtaining of the at least one encoded block includes a series of obtaining steps. A first obtaining step includes retrieving a threshold number of encoded blocks of an encoded matrix. A second obtaining step includes rebuilding a grouping of data blocks of a data matrix from the threshold number of encoded data blocks. A third obtaining step includes dispersed storage error encoding the grouping of data blocks of the data matrix to produce a partially rebuilt first data-based data slice. A fourth obtaining step includes selecting the at least one encoded block from the partially rebuilt first data-based data slice. Alternatively, or in addition to, the obtaining of the at least one encoded block includes sending, by the second DST execution unit, a request to the first DST execution unit for the at least one encoded block and receiving, in response to the request, the at least one encoded block from the first DST execution unit. The method continues at step 506 where the second DST execution unit performs a second partial task of the task on the at least one encoded block.

When, based on the ascertained processing speeds, a third DST execution unit of the set of DST execution units has a processing speed that is the threshold speed greater than the processing speed of the first DST execution unit, the method continues at step 508 where the processing module transfers processing responsibilities for at least two encoded blocks from the first DST execution unit to the second DST execution unit and to the third DST execution unit. The transferring of the processing responsibilities includes a series of transferring steps. A first transferring step includes the processing module identifying the at least two encoded blocks of the first data-based data slice for transferring processing responsibilities from the first DST execution unit to the second DST execution unit and to the third DST execution unit. A second transferring step includes the second DST execution unit obtaining a first one of the at least two encoded blocks. A third transferring step includes the third DST execution unit obtaining a second one of the at least two encoded blocks. A fourth transferring step includes the second DST execution unit performing the second partial task on the first one of the at least two encoded blocks. A fifth transferring step includes the third DST execution unit performing a third partial task of the task on the second one of the at least two encoded blocks.

Figure 44A:
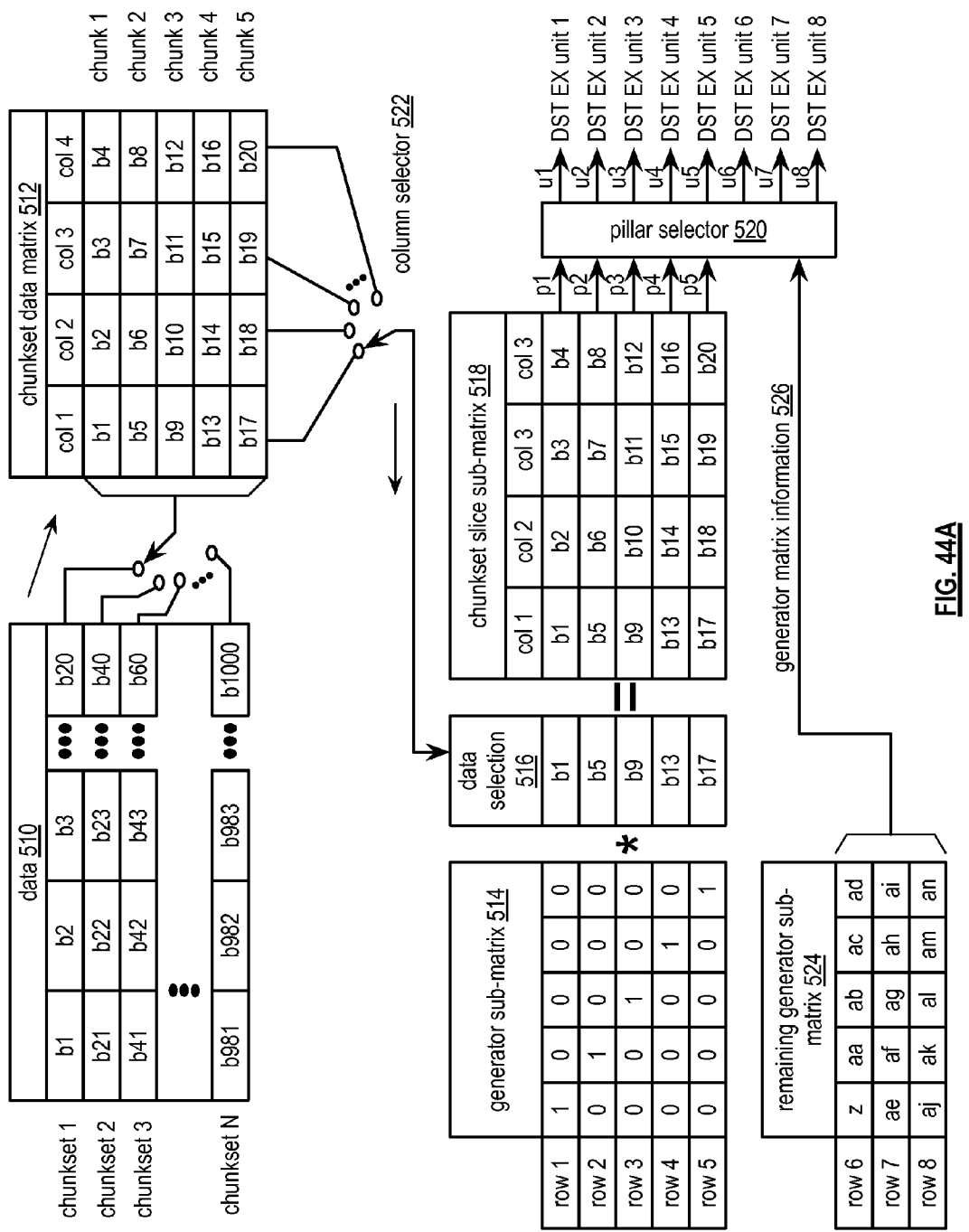
FIG. 44A is another diagram illustrating encoding of data in accordance with the present invention.

FIG. 44A is another diagram illustrating encoding of data that includes data 510 organized as a plurality of chunksets 1-N (e.g., a data partition, or portion thereof), a chunkset data matrix 512 for each of the plurality of chunksets 1-N that includes a row for each chunk, a generator sub-matrix 514 to encode each chunkset via a column selector 522 as a data selection 516 to produce a corresponding chunkset slice sub-matrix 518 of slices, a remaining generator sub-matrix 524, and a pillar selector 520 to route generator matrix information 526 and the slices of each chunkset to a corresponding distributed storage and task execution (DST EX) unit for task processing.

A number of chunks per chunkset is determined as a number of required parallel DST execution units to process parallel task processing to complete an overall task within a desired task execution time period. A decode threshold of an information dispersal algorithm (IDA) is determined as the number of chunks. A pillar width number of the IDA is determined based on one or more of the decode threshold, a number of available DST EX units, an availability requirement, and a reliability requirement. For example, the decode threshold is set at 5 when the number of chunks is 5 and the pillar width is set at 8 in accordance with a reliability requirement.

A chunk size of each chunkset is determined to match a chunk size requirement for task processing. For example, a chunk size is determined as 4 bytes when a DST EX unit indicates that a task processing data size limit is 4 bytes. A chunkset size is the number of chunks multiplied by the chunk size. For example, the chunkset is 20 bytes when the chunk size is 4 bytes and the number of chunks is 5. A number of chunksets N is determined as a size of the data divided by the size of the chunkset. For example, there are 50 chunksets (e.g., N=50) when the chunkset is 20 bytes and the size of the data is 1000 bytes.

The generator sub-matrix 514 and remaining generator sub-matrix 524 are determined in accordance with the IDA, where each matrix includes a decode threshold number of columns, the generator sub-matrix 514 includes a decode threshold number of rows and the remaining generator sub-matrix 524 includes the pillar width number minus the decode threshold number of rows. A unity matrix is utilized as the generator sub-matrix to facilitate generation of contiguous data slices that match contiguous data of chunks. The remaining generator sub-matrix 524 facilitates generating error coded slices (e.g., encoded data slices) for additional pillars to pillars of the chunkset slice sub-matrix 518.

For each chunkset, the generator sub-matrix 514 is matrix multiplied by a column of the corresponding chunkset data matrix 512 (e.g., data selection 516 as selected by the column selector 522) to generate a column of the chunkset slice sub-matrix 518 for the corresponding chunkset. For example, row 1 of the generator sub-matrix 514 is multiplied by column 1 of the chunkset data matrix 512 to produce a row 1 byte of column 1 of the chunkset slice sub-matrix 518, row 2 of the generator sub-matrix 514 is multiplied by column 1 of the chunkset data matrix 512 to produce a row 2 byte of column 1 of the chunkset slice sub-matrix 518, etc. As another example, row 1 of the generator sub-matrix 514 is multiplied by column 2 of the chunkset data matrix 512 to produce a row 1 byte of column 2 of the chunkset slice sub-matrix 518, row 2 of the generator sub-matrix 514 is multiplied by column 2 of the chunkset data matrix 512 to produce a row 2 byte of column 2 of the chunkset slice sub-matrix 518, etc.

A segment may be considered as one or more columns of the chunkset data matrix 512 and slices that correspond to the segment are the rows of the chunkset slice sub-matrix 518 that correspond to the one or more columns of the chunkset data matrix 512. For example, row 1 column 1 of the chunkset slice sub-matrix 518 forms slice 1 when column 1 of the chunkset data matrix 512 is considered as a corresponding segment. Slices of a common row of the chunkset slice sub-matrix 518 are of a chunk of contiguous data of the data and share a common pillar number and may be stored in a common DST EX unit to facilitate a distributed task.

The pillar selector 520 routes slices of each pillar to a DST EX unit in accordance with a pillar selection scheme. For example, four slices of row 1 (e.g., bytes from columns 1-4) of the chunkset slice sub-matrix 518 are sent to DST EX unit 1 as a contiguous chunk of data that includes 4 bytes when the pillar selection scheme maps pillars 1-5 (e.g., associated with slices of contiguous data), to DST EX units 1-5 and maps pillars 6-8 (e.g., associated with error coded slices/encoded data slices) to DST EX units 6-8 for a first chunkset (e.g., to be generated later as discussed with reference to FIGS. 44B and 44C).

The pillar selector 520 further functions to route the generator matrix information 526 to DST execution units associated with error coded slices. For example, the pillar selector 520 routes the generator matrix information 526 to DST execution units 6-8 when DST execution units 6-8 are associated with storing the error coded slices (e.g. pillars 5-8, when the pillar width is 8 and the decode threshold is 5). The generator matrix information 526 includes one or more of the remaining generator sub-matrix 524, the generator sub-matrix 514, a partial slice identifier, a locally stored slice identifier, pillar numbers associated with the decode threshold number of DST execution units, pillar numbers associated with the error coded slices, and DST execution unit identifiers associated with the error coded slices.

FIG. 44B is a flowchart illustrating another example of generating a slice grouping, which include similar steps to FIGS. 5 and 40C. The method begins with step 126 of FIG. 5 where a processing module (e.g., of a distributed storage and task (DST) client module) receives data and a corresponding task. The method continues with step 364 of FIG. 40C where the processing module selects one or more DST execution units for the task based on a capability level associated with each of the DST execution units. The method continues with steps 130 and 132 of FIG. 5 where the processing module determines processing parameters of the data based on a number of DST execution units and determines task partitioning based on the DST execution units (e.g., capabilities) and the processing parameters.

The method continues at step 528 where the processing module partitions the data in accordance with the processing parameters to produce a decode threshold number of slice groupings. For example, the processing module partitions the data into five slice groupings when the decode threshold number is five. The method continues with step 136 of FIG. 5 where the processing module partitions the task based on the task partitioning to produce partial tasks.

The method continues at step 530 where the processing module contains generator matrix information. The obtaining includes one or more of retrieving from a local memory, retreating from a distributed storage and task network (DSTN) module, sending a query, receiving information, lookup, decoding a message, and a predetermination. The method continues at step 532 where the processing module sends the slice groupings, corresponding partial tasks, and generator matrix to the selected DST execution.

FIG. 44C is a flowchart illustrating an example of generating a partially encoded data slice. The method begins at step 534 where a processing module (e.g., of a distributed storage and task (DST) execution unit) receives at least one slice grouping, corresponding partial tasks, and generator matrix information. The method continues at step 536 where the processing module stores the at least one slice grouping, the corresponding partial tasks, and the generator matrix information in a local memory. The storing may further include initiation of execution of the corresponding partial tasks on the at least one slice grouping. The method continues at step 538 where the processing module identifies error control DST execution units associated with error coded slices that correspond to a slice grouping of the one more slice groupings. The identifying may be based on at least one of the generator matrix information, a query, lookup, and receiving the identities of the error control DST execution units.

The method continues at step 540 where, for each error control DST execution unit, the processing module generates a partially encoded data slice corresponding to each slice of each slice grouping. The generating the partially encoded data slice includes one or more of extracting a generator matrix from the generator matrix information (e.g., aggregating a received generator sub-matrix and a received remaining generator sub-matrix to produce the generator matrix), reducing the generator matrix to produce a square matrix that exclusively includes rows identified in the generator matrix information (e.g., slice pillars associated with participating DST execution units of a decode threshold number of units), inverting the square matrix to produce an inverted matrix (e.g. alternatively, may extract the inverted matrix from the generator matrix information), matrix multiplying the inverted matrix by a corresponding slice of a slice group to produce a vector, and matrix multiply the vector by a row of the generator matrix corresponding to the desired encoded data slice to be partial encoded (e.g. alternatively, may extract the row from the request), to produce the partial encoded data slice.

The method continues at step 542 where the processing module, for each error control DST execution unit, sends the partial encoded data slice to the error control DST execution unit where the error control DST execution unit performs an exclusive function on a decode threshold number of partial encoded data slices to produce a corresponding error coded slice for storage in memory of the error control DST execution unit.

Figure 45:
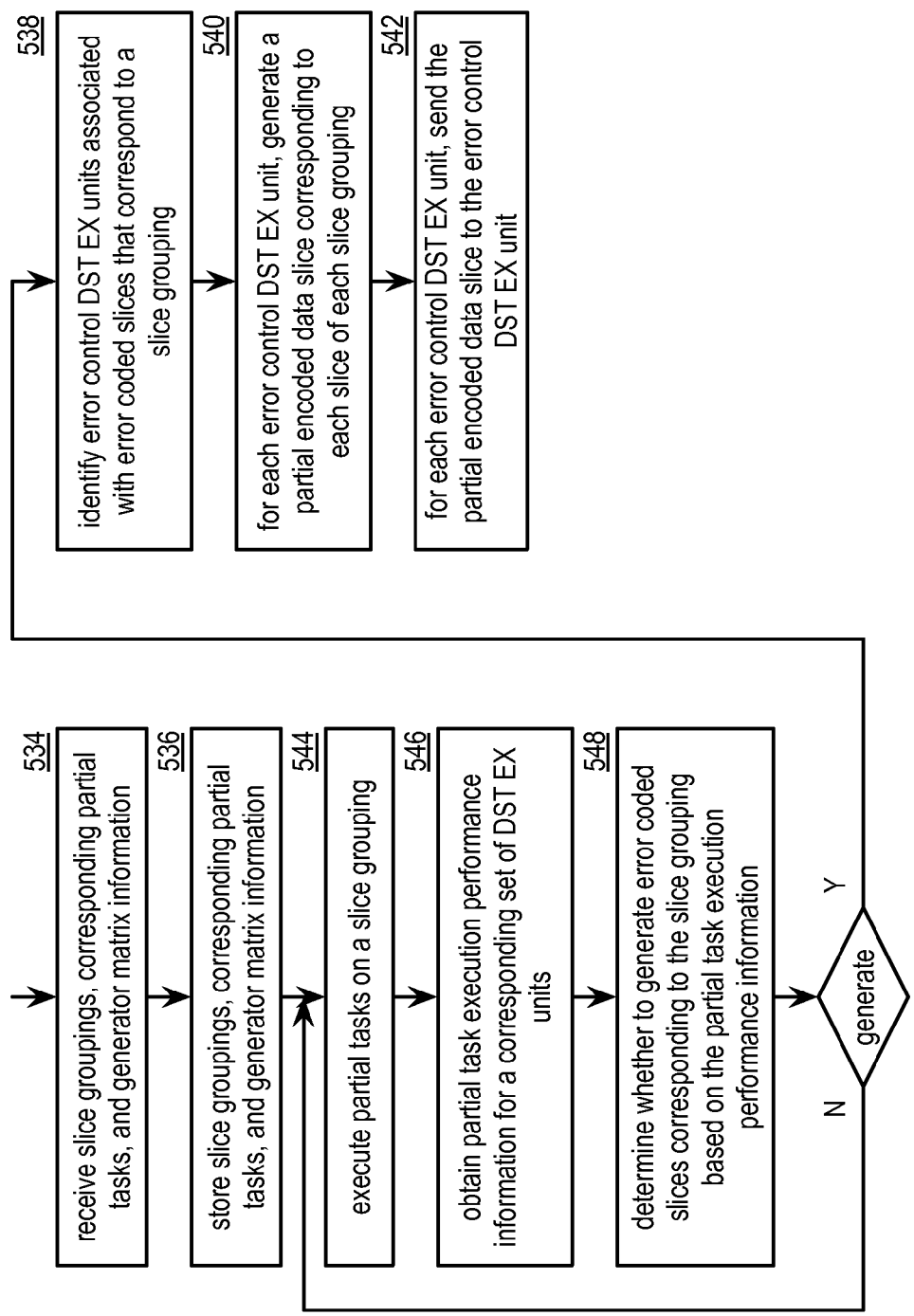
FIG. 45 is a flowchart illustrating another example of generating a partially encoded data slice in accordance with the present invention.

FIG. 45 is a flowchart illustrating another example of generating a partially encoded data slice, which includes similar steps to FIG. 44C. The method begins with steps 534 and 536 of FIG. 44C where a processing module (e.g., of a distributed storage and task (DST) execution unit) receives at least one slice grouping, corresponding partial tasks, and generator matrix information and stores the at least one slice grouping, the corresponding partial tasks, and the generator matrix information in a local memory. The method continues at step 544 where the processing module executes partial tasks of the corresponding partial tasks on a slice of the at least one slice grouping.

The method continues at step 546 where the processing module obtains partial task execution performance information for a corresponding set of DST execution units. The obtaining includes one or more of initiating a query, lookup, an error message, and receiving the performance information. The partial task execution performance information includes one or more of execution progress versus a goal, an error level indicator, and a storage priority level indicator (e.g., always store the error coded slices, never store the error coded slices, store the error coded slices when performance is favorable).

The method continues at step 548 where the processing module determines whether to generate error coded slices corresponding to the slice grouping based on the partial task execution performance information. For example, the processing module determines not to generate error coded slices when the partial task execution performance information is below a performance threshold and the storage priority level indicator indicates to store the error coded slices only when performance is favorable. The method loops back to step 544 when the processing module determines not to generate the error coded slices. The method continues to step 538 of FIG. 44C when the processing module determines to generate the error coded slices.

The method continues with steps 538, 540, and 542 of FIG. 44C where the processing module identifies error control DST execution units associated with error coded slices that correspond to a slice grouping of the one more slice groupings, generates, for each error control DST execution unit, a partial encoded data slice corresponding to each slice of each slice grouping, and sends, for each error control DST execution unit, the partial encoded data slice to the error control DST execution unit where the error control DST execution unit performs an exclusive function on a decode threshold number of partial encoded data slices to produce a corresponding error coded slice for storage in memory of the error control DST execution unit.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computer to manage distributed computing of a task, the method comprises:
   determining a data block storage redundancy policy among a set of distributed storage and task (DST) execution units based on processing latency information of the set of DST execution units;
   dispersed storage error encoding, in accordance with the data block storage redundancy, a data segment of data to produce a set of encoded data slices, wherein a first encoded data slice of the set of encoded data slices includes a first set of encoded data blocks, a second encoded data slice of the set of encoded data slices includes a second set of encoded data blocks, and at least one redundant encoded data block is included in both of the first and second sets of encoded data blocks;
   assigning a set of partial tasks to the set of DST execution units regarding the set of encoded data slices;
   assigning a first partial task of the set of partial tasks and a first encoded data block processing order to a first DST execution unit of the set of DST execution units regarding processing the first set of encoded data blocks of the first encoded data slice; and
   assigning a second partial task of the set of partial tasks and a second encoded data block processing order to a second DST execution unit of the set of DST execution units regarding processing the second set of encoded data blocks of the second encoded data slice, wherein the first encoded data block processing order causes the first DST execution unit to execute the first partial task on the at least one redundant encoded data block when processing latency of the second DST execution unit is unfavorable to processing latency of the first DST execution unit and wherein the second encoded data block processing order causes the second DST execution unit to execute the second partial task on the at least one redundant encoded data block when the processing latency of the first DST execution unit is unfavorable to the processing latency of the second DST execution unit.

2. The method of claim 1, wherein the data block storage redundancy policy comprises at least one of:
   an indication of a number of encoded data blocks to include in the at least one redundant encoded data block;
   an indication of which DST execution units of the set of DST executions units are to have overlapping redundant encoded data blocks; and
   an indication as to whether a DST execution unit of the set of DST execution units is to have overlapping redundant encoded data blocks with multiple DST execution units of the set of DST execution units.

3. The method of claim 1, wherein the processing latency information of the set of DST execution units comprises at least one of:
   queues for each of the set of DST execution units regarding outstanding partial tasks for execution;
   historical processing times for each of the set of DST execution units regarding processing various types of partial tasks;
   network connection capabilities of each of the set of DST execution units;
   processing resources of each of the set of DST execution units; and
   predicted task execution response time for each of the set of DST execution units.

4. The method of claim 1, wherein the dispersed storage error encoding the data segment comprises:
   arranging the data segment into a data matrix of data blocks;
   encoding the data matrix with an encoding matrix to produce an encoded matrix that includes a plurality of encoded data blocks;
   creating an initial set of encoded data slices from the encoded matrix, wherein an encoded data slice of the set of encoded data slices includes a set of encoded data blocks of the plurality of encoded data blocks;
   identifying a first encoded data block of a first initial encoded data slice of the initial set of encoded data slices;
   identifying a second encoded data block of a second initial encoded data slice of the initial set of encoded data slices;
   appending the second encoded data block to the first initial encoded data slice to produce the first encoded data slice; and
   appending the first encoded data block to the second initial encoded data slice to produce the second encoded data slice.

5. The method of claim 1 further comprises:
   the first encoded data block processing order including prioritizing processing of other encoded data blocks of the first encoded data slice over the at least one redundant encoded data block;
   the second encoded data block processing order including prioritizing processing of other encoded data blocks of the second encoded data slice over the at least one redundant encoded data block;
   the first encoded data block processing order further including determining whether the second DST execution unit is likely to process the at least one redundant encoded data block before the first DST execution unit and, when the second DST execution unit is unlikely to process the at least one redundant encoded data block before the first DST execution unit, assuming, by the first DST execution unit responsibility for performing the first partial task on the at least one redundant encoded data block; and the second encoded data block processing order further including determining whether the first DST execution unit is likely to process the at least one redundant encoded data block before the second DST execution unit and, when the first DST execution unit is unlikely to process the at least one redundant encoded data block before the second DST execution unit, assuming, by the second DST execution unit responsibility for performing the second partial task on the at least one redundant encoded data block.

6. A method for execution by a distributed storage and task (DST) execution unit, the method comprises:
receiving an assigned partial task and an encoded data block processing order regarding processing an encoded data slice, wherein a data segment of data is dispersed storage error encoded in accordance with a data block storage redundancy policy to produce a set of encoded data slices, wherein a first encoded data slice of the set of encoded data slices includes a first set of encoded data blocks, a second encoded data slice of the set of encoded data slices includes a second set of encoded data blocks, and at least one redundant encoded data block is included in both of the first and second sets of encoded data blocks;
commencing execution of the assigned partial task on the first set of encoded data blocks in accordance with the encoded data block processing order;
executing the assigned partial task on the at least one redundant encoded data block when latency of processing the first set of encoded data blocks is favorable to another DST execution unit latency of processing the second set of encoded data blocks; and
skipping execution of the assigned partial task on the at least one redundant encoded data block when the latency of processing the first set of encoded data blocks is unfavorable to the other DST execution unit latency of processing the second set of encoded data blocks.

7. The method of claim 6, wherein the data block storage redundancy policy comprises at least one of:
an indication of a number of encoded data blocks to include in the at least one redundant encoded data block;
an indication of which DST execution units of a set of DST executions units are to have overlapping redundant encoded data blocks; and
an indication as to whether a DST execution unit of the set of DST execution units is to have the overlapping redundant encoded data blocks with multiple DST execution units of the set of DST execution units.

8. The method of claim 6, wherein the latency of processing the first set of encoded data blocks and the second set of encoded data blocks comprises at least one of:
processing queues for first and second DST execution units regarding outstanding partial tasks for execution, wherein the first DST execution unit receives the first set of encoded data blocks and the second DST execution unit receives the second set of encoded data blocks;
historical processing times for each of the first and second DST execution units regarding processing various types of partial tasks;
network connection capabilities of each of the first and second DST execution units;
processing resources of each of the first and second DST execution units; and
predicted task execution response time for each of the first and second DST execution units.

9. The method of claim 6, wherein the dispersed storage error encoding the data segment comprises:

arranging the data segment into a data matrix of data blocks;
encoding the data matrix with an encoding matrix to produce an encoded matrix that includes a plurality of encoded data blocks;
creating an initial set of encoded data slices from the encoded matrix, wherein one of the set of encoded data slices includes a set of encoded data blocks of the plurality of encoded data blocks;
identifying a first encoded data block of a first initial encoded data slice of the initial set of encoded data slices;
identifying a second encoded data block of a second initial encoded data slice of the initial set of encoded data slices;
appending the second encoded data block to the first initial encoded data slice to produce the first encoded data slice; and
appending the first encoded data block to the second initial encoded data slice to produce the second encoded data slice.

10. The method of claim 6 further comprises:
the encoded data block processing order including prioritizing processing of other encoded data blocks of the first encoded data slice over the at least one redundant encoded data block; and
the encoded data block processing order further including determining whether another DST execution unit is likely to process the at least one redundant encoded data block before the DST execution unit and, when the other DST execution unit is unlikely to process the at least one redundant encoded data block before the DST execution unit, assuming, by the DST execution unit responsibility for performing the partial task on the at least one redundant encoded data block.

11. A dispersed storage (DS) module of a computing device to manage distributed computing of a task, the DS module comprises:
a first module, when operable within the computing device, causes the computing device to:
determine a data block storage redundancy policy among a set of distributed storage and task (DST) execution units based on processing latency information of the set of DST execution units;
a second module, when operable within the computing device, causes the computing device to:
dispersed storage error encode, in accordance with the data block storage redundancy policy, a data segment of data to produce a set of encoded data slices, wherein a first encoded data slice of the set of encoded data slices includes a first set of encoded data blocks, a second encoded data slice of the set of encoded data slices includes a second set of encoded data blocks, and at least one redundant encoded data block is included in both of the first and second sets of encoded data blocks; and
a third module, when operable within the computing device, causes the computing device to:
assign a set of partial tasks to the set of DST execution units regarding the set of encoded data slices;
assign a first partial task of the set of partial tasks and a first encoded data block processing order to a first DST execution unit of the set of DST execution units regarding processing the first set of encoded data blocks of the first encoded data slice; and
assign a second partial task of the set of partial tasks and a second encoded data block processing order to a second DST execution unit of the set of DST execution units regarding processing the second set of encoded data blocks of the second encoded data slice, wherein the first encoded data block processing order causes the first DST execution unit to execute the first partial task on the at least one redundant encoded data block when processing latency of the second DST execution unit is unfavorable to processing latency of the first DST execution unit and wherein the second encoded data block processing order causes the second DST execution unit to execute the second partial task on the at least one redundant encoded data block when the processing latency of the first DST execution unit is unfavorable to the processing latency of the second DST execution unit.

12. The DS module of claim 11, wherein the data block storage redundancy policy comprises at least one of:
an indication of a number of encoded data blocks to include in the at least one redundant encoded data block;
an indication of which DST execution units of the set of DST executions units are to have overlapping redundant encoded data blocks; and
an indication as to whether a DST execution unit of the set of DST execution units is to have the overlapping redundant encoded data blocks with multiple DST execution units of the set of DST execution units.

13. The DS module of claim 11, wherein the processing latency information of the set of DST execution units comprises at least one of:
queues for each of the set of DST execution units regarding outstanding partial tasks for execution;
historical processing times for each of the set of DST execution units regarding processing various types of partial tasks;
network connection capabilities of each of the set of DST execution units;
processing resources of each of the set of DST execution units; and
predicted task execution response time for each of the set of DST execution units.

14. The DS module of claim 11, wherein the second module functions to dispersed storage error encode the data segment by:
arranging the data segment into a data matrix of data blocks;
encoding the data matrix with an encoding matrix to produce an encoded matrix that includes a plurality of encoded data blocks;
creating an initial set of encoded data slices from the encoded matrix, wherein an encoded data slice of the set of encoded data slices includes a set of encoded data blocks of the plurality of data blocks;
identifying a first encoded data block of a first initial encoded data slice of the initial set of encoded data slices;
identifying a second encoded data block of a second initial encoded data slice of the initial set of encoded data slices;
appending the second encoded data block to the first initial encoded data slice to produce the first encoded data slice; and
appending the first encoded data block to the second initial encoded data slice to produce the second encoded data slice.

15. The DS module of claim 11 further comprises:
the first encoded data block processing order including prioritizing processing of other encoded data blocks of the first encoded data slice over the at least one redundant encoded data block;
the second data encoded block processing order including prioritizing processing of other encoded data blocks of the second encoded data slice over the at least one redundant encoded data block;
the first encoded data block processing order further including determining whether the second DST execution unit is likely to process the at least one redundant encoded data block before the first DST execution unit and, when the second DST execution unit is unlikely to process the at least one redundant encoded data block before the first DST execution unit, assuming, by the first DST execution unit responsibility for performing the first partial task on the at least one redundant encoded data block; and
the second encoded data block processing order further including determining whether the first DST execution unit is likely to process the at least one redundant encoded data block before the second DST execution unit and, when the first DST execution unit is unlikely to process the at least one redundant encoded data block before the second DST execution unit, assuming, by the second DST execution unit responsibility for performing the second partial task on the at least one redundant encoded data block.

16. A dispersed storage (DS) module of a distributed storage and task (DST) execution unit, the DS module comprises:
a first module, when operable within a computing device, causes the computing device to:
receive an assigned partial task and an encoded data block processing order regarding processing an encoded data slice, wherein a data segment of data is dispersed storage error encoded in accordance with a data block storage redundancy policy to produce a set of encoded data slices, wherein a first encoded data slice of the set of encoded data slices includes a first set of encoded data blocks, a second encoded data slice of the set of encoded data slices includes a second set of encoded data blocks, and at least one redundant encoded data block is included in both of the first and second sets of encoded data blocks; and
a second module, when operable within the computing device, causes the computing device to:
commence execution of the assigned partial task on the first set of encoded data blocks in accordance with the encoded data block processing order;
execute the partial task on the at least one redundant encoded data block when latency of processing the first set of encoded data blocks is favorable to another DST execution unit latency of processing the second set of encoded data blocks;
skip execution of the partial task on the at least one redundant encoded data block when the latency of processing the first set of encoded data blocks is unfavorable to the other DST execution unit latency of processing the second set of encoded data blocks.

17. The DS module of claim 16, wherein the data block storage redundancy policy comprises at least one of:
an indication of a number of encoded data blocks to include in the at least one redundant encoded data block;
an indication of which DST execution units of a set of DST executions units are to have overlapping redundant encoded data blocks; and an indication as to whether a DST execution unit of the set of DST execution units is to have the overlapping redundant encoded data blocks with multiple DST execution units of the set of DST execution units.

18. The DS module of claim 16, wherein the latency of processing the first set of encoded data blocks and of the second set of encoded data blocks comprises at least one of:
processing queues for first and second DST execution units regarding outstanding partial tasks for execution, wherein the first DST execution unit receives the first set of encoded data blocks and the second DST execution unit receives the second set of encoded data blocks;
historical processing times for each of the first and second DST execution units regarding processing various types of partial tasks;
network connection capabilities of each of the first and second DST execution units;
processing resources of each of the first and second DST execution units; and
predicted task execution response time for each of the first and second DST execution units.

19. The DS module of claim 16, wherein the dispersed storage error encoding the data segment comprises:
arranging the data segment into a data matrix of data blocks;
encoding the data matrix with an encoding matrix to produce an encoded matrix that includes a plurality of encoded data blocks;
creating an initial set of encoded data slices from the encoded matrix, wherein one of the set of encoded data slices includes a set of encoded data blocks of the plurality of encoded data blocks;
identifying a first encoded data block of a first initial encoded data slice of the initial set of encoded data slices;
identifying a second encoded data block of a second initial encoded data slice of the initial set of encoded data slices;
appending the second encoded data block to the first initial encoded data slice to produce the first encoded data slice; and
appending the first encoded data block to the second initial encoded data slice to produce the second encoded data slice.

20. The DS module of claim 16 further comprises:
the encoded data block processing order including prioritizing, by the second module, processing of other encoded data blocks of the first encoded data slice over the at least one redundant encoded data block; and
the encoded data block processing order further including determining, by the second module, whether another DST execution unit is likely to process the at least one redundant encoded data block before the DST execution unit and, when the other DST execution unit is unlikely to process the at least one redundant encoded data block before the DST execution unit, assuming, by the DST execution unit responsibility for performing the partial task on the at least one redundant encoded data block.

* * * * *